(12) United States Patent
Yong

(10) Patent No.: US 11,788,308 B2
(45) Date of Patent: Oct. 17, 2023

(54) SOUNDPROOF ENCLOSURE

(71) Applicant: Yoke Keong Yong, Kuala Lumpur (MY)

(72) Inventor: Yoke Keong Yong, Kuala Lumpur (MY)

( * ) Notice: Subject to any disclaimer, the term of this patent is extended or adjusted under 35 U.S.C. 154(b) by 0 days.

(21) Appl. No.: 17/789,973

(22) PCT Filed: Nov. 23, 2020

(86) PCT No.: PCT/MY2020/050163
§ 371 (c)(1),
(2) Date: Jun. 29, 2022

(87) PCT Pub. No.: WO2021/145758
PCT Pub. Date: Jul. 22, 2021

(65) Prior Publication Data
US 2023/0029778 A1      Feb. 2, 2023

(30) Foreign Application Priority Data

Jan. 17, 2020   (MY) .......................... PI 2020000305

(51) Int. Cl.
*G09F 7/18*      (2006.01)
*E04H 1/12*      (2006.01)
(Continued)

(52) U.S. Cl.
CPC .............. *E04H 1/1205* (2013.01); *B32B 3/06* (2013.01); *B32B 3/28* (2013.01); *B32B 15/04* (2013.01);
(Continued)

(58) Field of Classification Search
CPC ............ E04H 1/1205; B32B 3/06; B32B 3/28
See application file for complete search history.

(56) References Cited

U.S. PATENT DOCUMENTS

| 1,772,589 | A |   | 8/1930 | Beamer |
| 3,031,862 | A | * | 5/1962 | Sherron ................... E04H 1/14 62/298 |

(Continued)

OTHER PUBLICATIONS

International Search Report, dated Jan. 3, 2021, pp. 1-3.
International Preliminary Report on Patentability, dated Apr. 22, 2022, pp. 1-6.

*Primary Examiner* — Basil S Katcheves
(74) *Attorney, Agent, or Firm* — Renner, Kenner, Greive, Bobak, Taylor & Weber

(57) ABSTRACT

A method for building a soundproof enclosure (10) in the form of an independent structure with acoustic properties for isolating noise and vibration is disclosed. The soundproof enclosure (10) comprised a plurality of acoustical wall panels (12) interconnectable each to another at opposing sides for enclosing an interior space (41) of various sizes. The soundproof enclosure (10) further comprised one or more modular multilayer ceiling unit(s) (13) assembled onto the top edges of the acoustical wall panels (12) to form the enclosure. The ceiling unit (13) comprised a plurality of ceiling layers (17), each ceiling layer (17) being vertically spaced apart with one another by brackets to topographically form the multiple guided spaces necessary for air flow circulation within the enclosure (10). These guided spaces can also house multiple implements such as circulation fan, air filter and sound silencer. Sound insulating material layer(s) are interposed between the contacting surfaces of the ceiling unit (13) and the acoustical wall panels (12) and/or all around the surfaces to isolate and decouple the ceiling unit (13) from the acoustical wall panels (12) from vibrations. A sound barrier cover (16a or 79) is interposed at the openings (25) of the air passages (24) to further reduce the sound level emitted into and exiting from the enclosure. In addition, a construction method by elevating the heavy (Continued)

acoustical wall panels (12) and the ceiling units (13) until they fall into precise assembly location for ease of assembly of the components of the enclosure (10) and a floor base unit 11 that enabled the enclosure (10) to about easily in whole is also disclosed. Furthermore, a method to ease assembly of the enclosure (10) by use of removable heavy-duty handles (87) is disclosed.

27 Claims, 51 Drawing Sheets

(51) Int. Cl.
    *B32B 3/06*     (2006.01)
    *B32B 3/28*     (2006.01)
    *B32B 15/04*     (2006.01)
    *G10K 11/02*     (2006.01)
    *G10K 11/168*     (2006.01)
    *F24F 8/10*     (2021.01)
    *F24F 7/00*     (2021.01)
    *F24F 7/08*     (2006.01)

(52) U.S. Cl.
    CPC .............. *E04H 1/125* (2013.01); *G10K 11/02* (2013.01); *G10K 11/168* (2013.01); *B32B 2307/102* (2013.01); *F24F 7/08* (2013.01); *F24F 8/10* (2021.01); *F24F 2007/0025* (2021.01)

(56) References Cited

U.S. PATENT DOCUMENTS

| | | | |
|---|---|---|---|
| 3,110,357 A | 11/1963 | Louis | |
| 3,302,547 A | 2/1967 | Wasserman | |
| 3,611,907 A * | 10/1971 | Wasserman | E04B 1/8218 D25/16 |
| 4,732,012 A * | 3/1988 | Thorpe | F24F 6/04 62/304 |
| 4,835,983 A | 6/1989 | Chandler, Jr. | |
| 5,060,752 A * | 10/1991 | Heiberger | E04B 1/8218 181/291 |
| 5,123,874 A * | 6/1992 | White, III | E04B 1/34321 181/290 |
| 5,923,002 A * | 7/1999 | McGrath | E04B 1/82 181/290 |
| 6,109,049 A * | 8/2000 | Wetherell | F24F 3/044 454/253 |
| 8,535,064 B2 * | 9/2013 | Linton | A61G 10/026 434/372 |
| 2007/0000198 A1 * | 1/2007 | Payne, Jr. | E04B 5/40 52/414 |
| 2009/0200285 A1 * | 8/2009 | Raidt | H05B 3/36 29/611 |
| 2010/0146874 A1 * | 6/2010 | Brown | E04B 2/7453 52/145 |
| 2014/0305736 A1 * | 10/2014 | Gates | E04B 1/84 181/284 |
| 2018/0066429 A1 * | 3/2018 | Yau | E04C 2/523 |

* cited by examiner

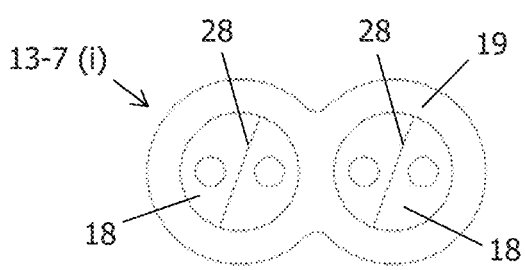
Figure 7(i)
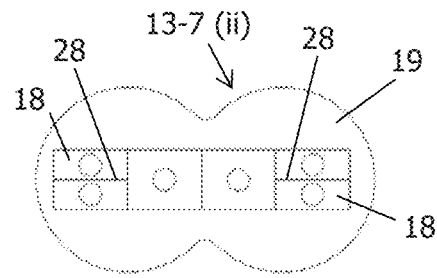
Figure 7(ii)
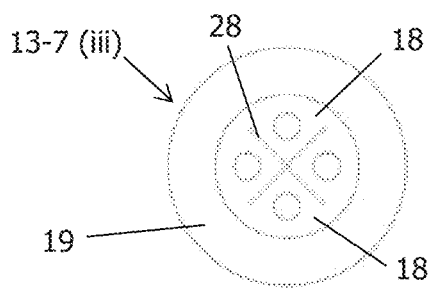
Figure 7(iii)
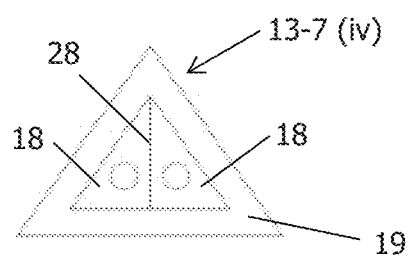
Figure 7(iv)
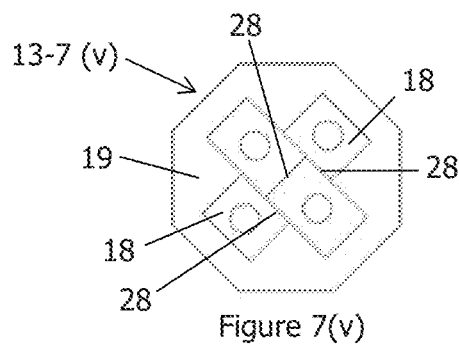
Figure 7(v)
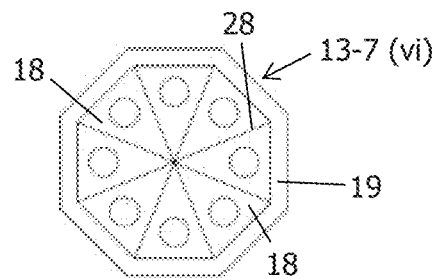
Figure 7(vi)
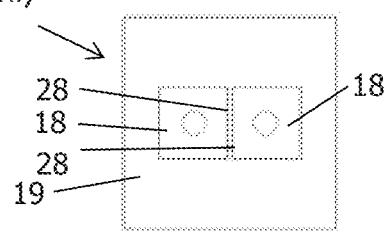
Figure 7(vii)
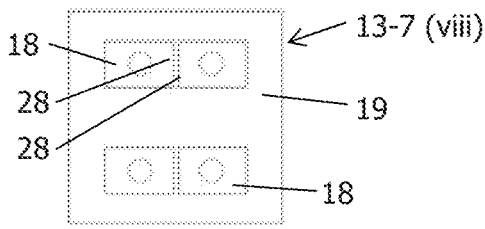
Figure 7(viii)
- Legend for Figure 7(i) to Figure 7(viii):
   represents air passage aperture 42 of intermediate core layer 19.

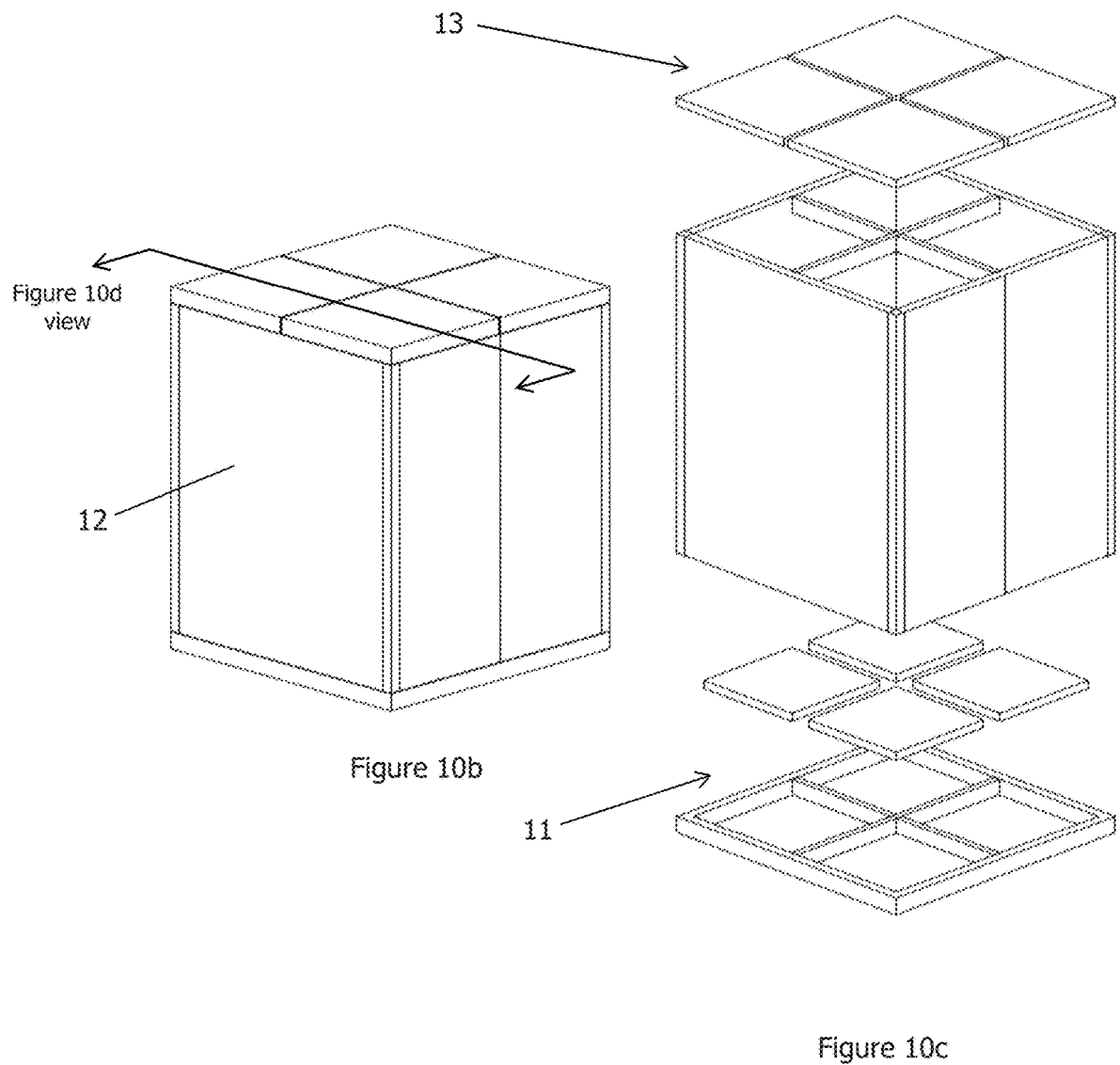

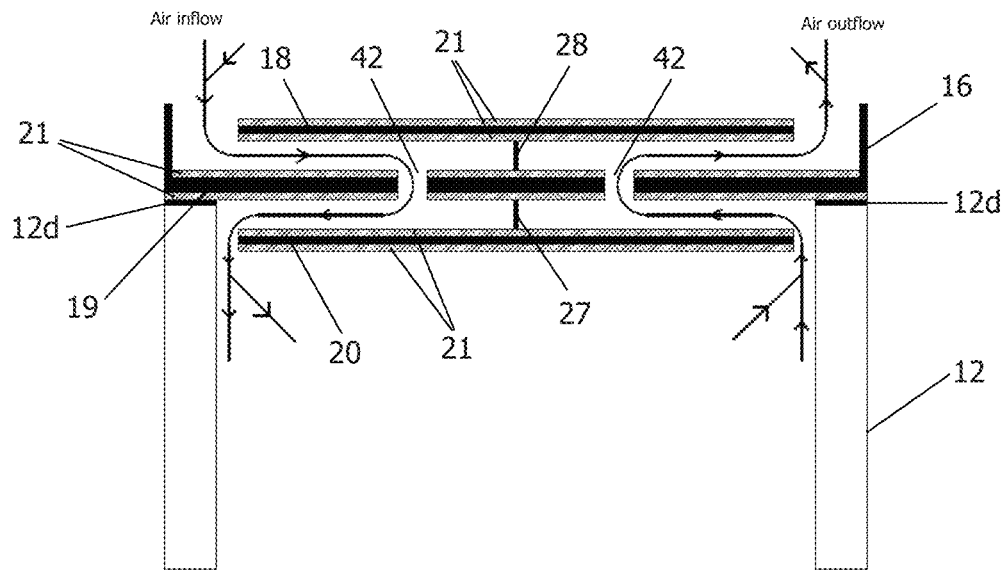
Figure 11
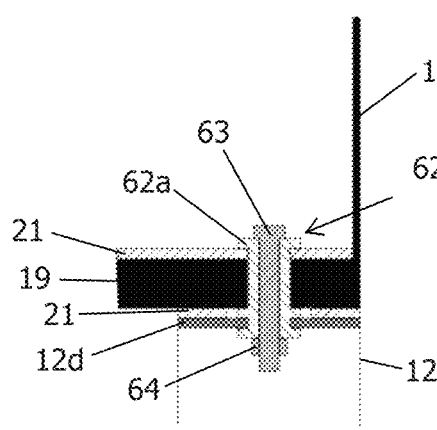
Figure 11a(i)
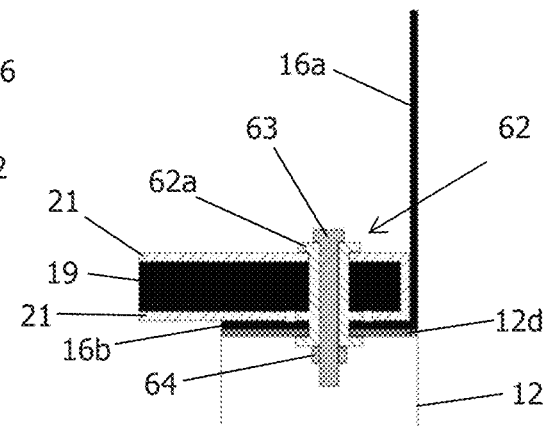
Figure 11b(i)
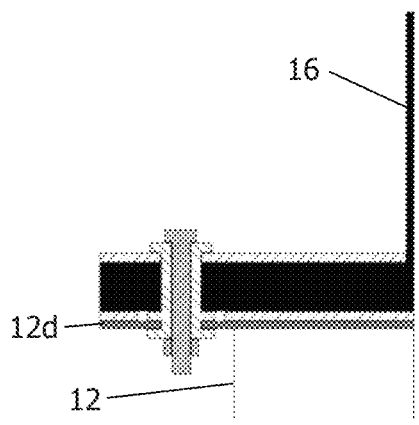
Figure 11a(ii)
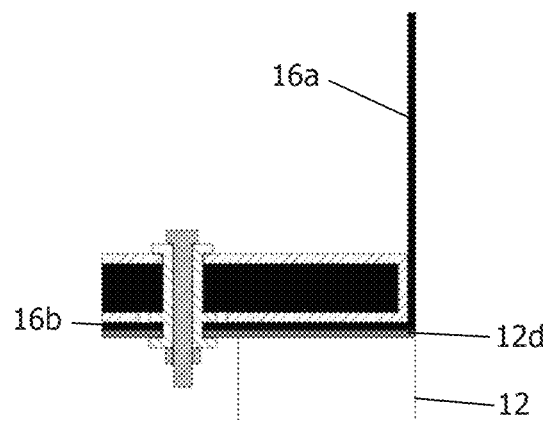
Figure 11b(ii)

SOUNDPROOF ENCLOSURE

FIELD OF INVENTION

The present invention relates generally to soundproof enclosures, and more particularly, to a soundproof enclosure having modular multilayer ceiling unit(s), modular floor base(s), and modular wall panel(s) with sound absorbing and sound insulating properties that can be easily assembled, disassembled, and relocated to other locations.

BACKGROUND OF THE INVENTION

Considering the current levels of mobile electronic devices usage and the movement of people seeking activity-based workplaces, there is a need for soundproof enclosures that provides quiet space for social interaction, privacy and comfort. Existing soundproof enclosures are relatively complicated in designs, and may be difficult to assemble, disassemble or relocate.

Typically, existing soundproof enclosures that have mechanical ventilations have air channels within the walls or within the ceiling with air ducts or hoses; therefore, the construction methods are more complicated. The natural ventilated type soundproof enclosures allow for air gaps within wherever convenient in the enclosure for air movements, however, these conventional air gaps compromise the sound isolation qualities and may admit external air impurities.

Therefore there is a need for a simple construction method to effectively build soundproof enclosures to address the increased focused on green environmental protection and reuse sustainability concept that has the ability to deploy and reuse, and is easy to assemble, disassemble and relocate to conserve consumption of materials and resources to provide soundproof enclosures within an outdoor public spaces such as stadiums, parks, and walkways; and indoor spaces such as airports, train stations, banks, exhibition halls or hospitals as well as at working environments such as offices or factories, and also at homes.

In addition, commercially available split-system air conditioners including ceiling concealed type and wall mounted type, are provided with indoor air blower units, which do not provide fresh air inflow to the soundproof enclosure.

For example, German patent publication no. 10 2017 124 464 A1 discloses a sound insulation cabin for use within a building. The cabin has a ceiling panel with a multilayer structure is provided on top of the wall structure. The ceiling panel comprises a rigid panel which forms the base surface of the ceiling panel and an electrical insulating panel that completely covered the rigid panel and may have mufflers and heat exchangers for air conditioning. However, this construction method consists of various additional air hoses.

In addition, Japanese patent publication no. 2017-210827 A discloses a ceiling panel and an assembly of a soundproof room. The soundproof room is constructed by assembling a plurality of wall panels, which forms the room peripheral wall, and mounted on at least one floor base and covered by at least one ceiling panel. The ceiling panel comprises an outer edge part having a main opening and a cover part fitted to the main opening for sealing the main opening. A support structure is provided at both the inner edge of the main opening and the outer edge of the cover part for preventing the cover part from falling into an insertion part between the main opening and the cover part. The support structure of the main opening includes a flange part with increasing diameter as it extends upward and the support structure of the cover part includes a tapered plane with increasing diameter as it extends upward in conjunction with the flange part. This prior art does not address the need for ease of assembly/disassembled and ease of relocation.

In another prior art example, Korean patent no 101178111 B1 discloses a soundproof telephone booth which is equipped with an air conditioner. The telephone booth comprises a floor base having three vertical walls and an access frame fitted with an access door and mounted on the floor base. A roof panel is mounted on the upper surfaces of the vertical walls and the access frame. The air conditioner is installed on the upper surface of the roof panel for providing cooling air through an air outlet into the telephone booth and a communication means is provided inside a vertical wall and connected with a telephone. The vertical walls and the access door comprise glass fibre reinforced materials for soundproofing the telephone booth. This prior art is specific in design and may not be desirable for general purposes.

Today's new technologies of 5G communication standard and block chain encryption have entrusted the world into an era of fast-pace changes and disruption of past mainstay business processes; hence people's behaviours and activities are fast changing and often unpredictable.

Consequently, for the management and administration of spaces such as but not limited to indoor/outdoor public spaces, office spaces, and factories, the usage of soundproof enclosures are desirable to be environmentally friendly by concept of durable reuse and are desirable to be easy to administer the assets in terms of durability, ease of assembly/disassembly, and ease of relocation.

Based on the foregoing, there is a need for soundproof enclosure that can be easily assembled, disassembled and relocated; and hence can be reused and re-deployed with ease with the purpose to conserve materials and resources and enhance sustainability, and improve the administration of these soundproof enclosure assets. Furthermore, there is a need for a method to easily construct a soundproof enclosure.

This invention has the improved capability to bring in fresh air flows that is filtered and silenced all within one modular ceiling unit to accommodate a phone booth or larger enclosed spaces with larger airflow requirements without having to use air ducts or to integrate or incorporate other parts of the soundproof enclosures. In addition, this invention has a floor base to easily relocate the enclosure in whole or in parts.

This invention thus aims to alleviate some or all of the problems of the prior art.

SUMMARY OF THE INVENTION

In accordance with an aspect of the invention, there is provided a soundproof enclosure, comprising a plurality of acoustical wall panels interconnectable each to another at opposing vertical side edges for enclosing an interior space, each of the acoustical wall panels having a bottom edge provided with a bottom flange adapted to be supported on a floor base unit or on a floor, and a top edge provided with a top flange, wherein at least a portion of a front wall panel is movably connected at one vertical side edge between an open position and a closed position for providing and covering an access opening in which the portion forms at least one access door panel of rigid material, and a multilayer decoupling ceiling unit disposed on the top edges of the acoustical wall panels for forming the enclosure. The multilayer decoupling ceiling unit comprising a plurality of ceiling layers having an intermediate core layer supported by the top flanges at the top edges of the acoustical wall panels, the ceiling layers are vertically spaced apart from one another, and a vertical wall member upwardly extending from an outer periphery end of the intermediate core layer, wherein the intermediate core layer of the multilayer decoupling ceiling unit which is disposed on the top flanges at the top edges of the acoustical wall panels, includes a decoupling element interposed between contacting surfaces of the intermediate core layer and the top flanges for isolating and decoupling the ceiling unit from the acoustical wall panels to provide the soundproof enclosure with a desired sound impedance, and to enhance the sound absorption and insulation characteristics of the soundproof enclosure.

In an embodiment, the plurality of ceiling layers of the ceiling unit comprises at least one upper covering layer raised and suspended over the intermediate core layer by bracket means for defining at least one air flow passages therebetween, and at least one lower suspended layer disposed suspended beneath the intermediate core layer by bracket means for defining at least one air flow passage therebetween, wherein the ceiling unit includes an open exterior space within the vertical wall member and the upper covering layer, which is divided into an air flow passage for intake at one side and an air flow passage for exhaust at the other side, for accommodating one or more air ventilation units within the air passages to circulate the exterior air into the enclosure and to exhaust the interior air out from the enclosure, and wherein the ceiling unit includes an interior space in between the at least one lower suspended layer and the intermediate core layer which is divided into an air flow passage for intake at one side and an air flow passage for exhaust at the other side, for accommodating one or more air ventilation units within the air passages to circulate the exterior air into the enclosure and to exhaust the interior air out from the enclosure.

In one embodiment of the invention, the ceiling unit includes more than one upper covering layer and more than one lower suspended layer which are spaced apart from one another to provide sufficient surfaces for installation of various implements such as air circulation fans, split system air conditioner components, air-filters and sound silencers within the air passages.

In another embodiment of the invention, the lower suspended layer of the ceiling unit provides a corresponding gap in between an inner wall layer of the acoustical wall panel and inner corners of the lower suspended layer for trapping sound waves and reducing sound reflection properties within the interior space, and wherein the inner corners are formed with any surface topological treatment, such as jagged edges or rounded edges.

In yet another embodiment of the invention, the ceiling unit comprises a plurality of ceiling units disposed on top of the plurality of acoustical wall panels or a ceiling beam for forming a whole ceiling unit of larger diameter.

In still yet another embodiment, the ceiling unit having the intermediate core layer formed with an extended diameter portion extending over and larger than the diameter of the constructed acoustical wall panels and wherein the ceiling unit provides additional sound proofing features, weather protection features or aesthetic features.

In an embodiment, the vertical wall member of the ceiling unit is formed with its height being at least substantially the same as that of the height of the upper covering layer and located at an appropriate distance from the openings of the air flow passages in the exterior space to form a sound barrier to the openings.

In another embodiment, when the vertical wall member of the ceiling unit is not at an appropriate distance to the openings, additional vertical wall members are constructed at the openings to form additional sound barriers to the openings.

In yet another embodiment, the ceiling unit comprises an intersecting locking member with sound and electrical insulating material provided in between the intermediate core layer of the ceiling unit and the top flange at the top edge of the acoustical wall panel or a horizontal wall member extended from the vertical wall member, and having the intersecting locking member partially extended into the acoustical wall panel, and whereby the intersecting locking member can also be partially extended into the interior space of the soundproof enclosure.

In still another embodiment, the ceiling unit comprises a layer of acoustic impedance material and electrical insulating material on a portion surface or all of the surfaces of the intermediate core layer such that the entire ceiling unit is completely sound and electricity isolated from the entire soundproof enclosure by having all the contact surfaces between the top edge and the bottom contacting surface of ceiling unit to be isolated accordingly, and whereby the edge of the intermediate core layer further comprises of a layer sound and electrical isolating material when the retaining wall is attached to the top edge of the acoustical wall panel.

In yet still another embodiment, each of the ceiling layers of the ceiling unit further comprises a layer of low acoustic impedance material or sound insulating material on a portion surface or all of the surfaces of the ceiling layer.

In one embodiment, the multilayer decoupling ceiling unit is constructed into a portion or the whole of an acoustical wall to obtain any or all the performance features of the ceiling unit.

In another embodiment, the intermediate core layer comprises peripheral wall or additional vertical flanges of at least the same height added at locations of appropriate distance from the openings of the air flow passages in the exterior space to further enhance the sound barrier performance, whereby the vertical flanges are extended downwardly from the upper covering layer and may be curved inwardly or outwardly.

In still another embodiment, the air flow passage for intake includes an intake opening and the air flow passage for exhaust includes an exhaust opening in the exterior space which are on the opposite sides or substantially far apart from one another to allow for effective disposal of stale exhaust air from the interior space and provide the fresh air intake into the interior space, and wherein the air flow passage for intake includes an intake opening and the air flow passage for exhaust includes an exhaust opening in the interior space which are on the opposite sides or substantially far apart from one another to allow for effective air circulation within the interior space by allowing fresh air intake to be spaced apart from the air exhaust outflow.

In yet another embodiment, the various implements may be disposed on top of the surface of the upper covering layer in the open exterior space within the vertical wall member of the ceiling unit.

In still another embodiment, the implements of the air-filters and sound silencers within the ceiling unit are sufficiently porous to allow convectional air flow through such implements so that it does not require mechanical air circulation unit for air circulation.

In yet another embodiment, the floor base unit comprises a floor base plate formed of rigid material, at least one base frame for supporting the floor base plate and to allow for insertion of lifting arms of a pallet truck or forklift-vehicle below the floor base plate for elevating the floor base unit to a level above the floor level, and a decoupling element to acoustically isolate and decouple the acoustical wall panels from the floor base unit, and one or more layers of flooring material provided on a top surface of the base frame.

In one embodiment, the floor base unit may comprise a plurality of floor levellers and a set of peripheral side covers which can be disassembled and removed.

In another embodiment, the floor base unit further comprises a set of castors attached to the floor base frame at an elevated level above the floor level to allow the soundproof enclosure to be easily moved, and wherein the soundproof enclosure comprises of a plurality of floor levellers which adjusted to raise the floor base above the caster levels such that the floor base is subsequently resting solely on the set of casters and hence the floor base is secured from moving about, and wherein in replacement of the set of casters, a plurality of lifting devices such as car jacks or lifting actuators may perform the similar functions of the set of floor levellers, and whereby lifting actuators may also be installed in the acoustical wall panels or coupling poles.

In yet another embodiment, the decoupling element of the floor base unit includes a set sound insulating gaskets and a set of plurality of protruding rigid material attached to the floor base of thicknesses which are above the height level of the sound insulating gaskets to elevate the acoustical wall panel bottom edge to allow for easy and smooth movement of the acoustical wall panel by opposing the weight of the acoustical wall panel using the reduced friction of the two opposing rigid materials of the acoustical wall panel bottom edge and the protruding rigid material until the precise assembly position between the acoustical wall panel and the floor base is arrived, and the two assembly components will then lodge into precise position of protruding rigid material matched to corresponding matching cavity in the acoustical wall panel bottom edge, and whereby instead the set sound insulating gaskets and the set of plurality of protruding rigid materials are attached to the acoustical wall panel bottom edge and the matching cavity is found on the decoupling surface of the floor base unit to achieve the same purpose, and whereby instead of the set of plurality of protruding rigid materials, the same purpose is achieved by a set of plurality of upstanding rounded tip pins of rigid material, and wherein the decoupling element of the ceiling unit includes a set sound insulating gaskets and a set of plurality of rigid materials protruding attached to the ceiling unit of thicknesses which are below the height level of the sound insulating gaskets to elevate the ceiling unit coupling surface to allow for easy and smooth movement of the ceiling unit by opposing the weight of the ceiling unit using the reduced friction of the two opposing rigid materials of the acoustical wall panel top edge and the protruding rigid material until the precise assembly position between the acoustical wall panel and the ceiling unit is arrived, and thereby the two assembly components will lodge into precise position of protruding rigid material matched to corresponding matching cavity in the ceiling unit coupling surface, and whereby instead the set sound insulating gaskets and the set of plurality of protruding rigid materials are attached instead to the acoustical wall panel top edge and the matching cavity is found on the decoupling surface of the ceiling unit to achieve the same purpose, and whereby instead of the set of plurality of protruding rigid materials, the same purpose is achieved by a set of plurality of upstanding rounded tip pins of rigid material.

In accordance with another aspect of the invention, there is provided a multilayer decoupling ceiling unit comprises a plurality of ceiling layers having an intermediate core layer, at least one upper covering layer raised and suspended over the intermediate core layer by bracket means, and at least one lower suspended layer disposed suspended beneath the intermediate core layer by bracket means, wherein the ceiling layers are vertically spaced apart from one another to form air passages therebetween, a vertical wall member upwardly extending from an outer periphery end of the intermediate core layer, and a decoupling element disposed at a bottom surface of the intermediate core layer for isolating and decoupling the ceiling unit from a contacting area of an enclosed space for the ceiling unit to be supported thereon.

In an embodiment, the ceiling unit comprises an open exterior space within the vertical wall member and the upper covering layer, which is divided into an air flow passage for intake at one side and an air flow passage for exhaust at the other side, for accommodating one or more air ventilation units within the air passages to circulate the exterior air into the enclosed space and to exhaust the interior air out from the space, and an interior space in between the at least one lower suspended layer and the intermediate core layer which is divided into an air flow passage for intake at one side and an air flow passage for exhaust at the other side, for accommodating one or more air ventilation units within the air passages to circulate the exterior air into the space and to exhaust the interior air out from the space.

In another embodiment, the ceiling unit comprises a drainage trough provided along at least one of the edges of the intermediate core layer and an outlet extended outwards through the vertical wall member for draining and channeling rain water out from the ceiling unit.

In still another embodiment, the ceiling unit includes more than one upper covering layer and more than one lower suspended layer which are spaced apart from one another to provide sufficient surfaces for installation of various implements such as air circulation fans, split system air conditioner units, air-filters and sound silencers within the air passages.

In yet another embodiment, the lower suspended layer of the ceiling unit provides a corresponding gap in between a wall of the enclosed space and inner corners of the lower suspended layer for trapping sound waves and reducing sound reflection properties within the enclosed space, and wherein the inner corners are formed with any surface topological treatment, such as jagged edges or rounded edges.

In still another embodiment, the ceiling unit further comprises one or more ceiling units in a form of modular ceiling units disposed on top of the enclosed space or a ceiling beam for forming a whole ceiling unit of larger diameter.

In still yet another embodiment, the ceiling unit having the intermediate core layer formed with an extended diameter portion extending over and larger than the diameter of the enclosed space and wherein the ceiling unit provides additional sound proofing features, weather protection features or aesthetic features.

In an embodiment, the vertical wall member of the ceiling unit is formed with its height being at least substantially the same as that of the height of the upper covering layer and located at a minimum distance from the openings of the air flow passages in the exterior space to form a sound barrier to the openings.

In another embodiment, when the vertical wall member of the ceiling unit is not at an appropriate distance to the openings, additional vertical flanges are constructed at the openings to form additional sound barriers to the openings, and whereby the vertical wall member and the additional vertical flanges are extended downwardly from the upper covering layer and can be curved inwardly or outwardly to further enhance the sound barrier performance.

In yet another embodiment, the ceiling unit further comprises an intersecting locking member with sound and electrical insulating material provided in between the intermediate core layer of the ceiling unit and the contacting area of the enclosed space or a horizontal wall member, and having the intersecting locking member partially extended into the contacting area, and whereby the intersecting locking member can also be partially extended into the interior space of the enclosed space.

In still another embodiment, the ceiling layers of the ceiling unit further comprises one or more layer(s) of low acoustic impedance material or sound insulating material on a portion surface or all of the surfaces of each of the ceiling layers.

In an embodiment, the decoupling element is a layer of low acoustic impedance material or a sound insulating material on a portion surface or all of the surfaces of the intermediate core layer of the ceiling unit.

In another embodiment, the various implements may be disposed on the upper covering layer in the open exterior space within the vertical wall member of the ceiling unit.

In still another embodiment, the implements of the air-filters and sound silencers within the ceiling unit are sufficiently porous to allow convectional air flow through such implements so that it does not require mechanical air circulation unit within the enclosure.

In yet another embodiment, the ceiling unit may be constructed in a portion or the whole of a wall panel of an enclosure.

In yet still another embodiment, the ceiling unit further comprises one or more sound mufflers to regulate sound exiting and entering the soundproof enclosure at the air flow passages between the exterior and the interior of the soundproof enclosure that provide external fresh external air circulation.

In accordance with another aspect of the invention, there is provided a method of constructing a soundproof enclosure, the method comprising the steps of prefabricating a peripheral wall by interconnecting a plurality of acoustical wall panels each to another at opposing vertical side edges to form an assembly of interconnected acoustical wall panels for enclosing an interior space, where each of the acoustical wall panels having a bottom edge and a top edge opposite the bottom edge, providing at least a portion of one acoustical wall panel movably connected at one vertical side edge between an open position and a closed position for providing and covering an access opening, and positioning the assembly of interconnected acoustical wall panels at the bottom edge on a floor or floor base unit, prefabricating a multilayer decoupling ceiling unit by providing a vertical wall member extending upwardly from an outer periphery end of an intermediate core layer of the ceiling unit, and abuttingly supporting a plurality of ceiling layers on top flanges at the top edges of the acoustical wall panels, the ceiling layers are vertically spaced apart from one another, and disposing the multilayer decoupling ceiling unit on the whole or portion of top edges of the acoustical wall panels, and attaching the ceiling unit to the peripheral wall by a decoupling element interposed between the contacting surfaces and the peripheral wall for isolating and decoupling the ceiling unit from the peripheral wall.

In an embodiment, the acoustical wall panel having one or both the vertical side edges coupled to the coupling pole to form a single unit of acoustical wall panel to replace the need of use of one or both the coupling poles.

In another embodiment, the acoustical wall panels are formed of varying sizes and shapes which may comprise of curved shape on one vertical side edge or both vertical side edges to form different typological top views profiles such as rectangular, hexagonal or octagonal that can be formed by flat shaped acoustical wall panels.

In yet another embodiment, the method further comprises the step of providing at least a piece of handles which can be releasably secured to components in the sequence of assembly needing to be carried, positioned, and assembled to form the soundproof enclosure starting with releasably securing the set of handles to the first component to assembly on to the floor base unit, and in the sequence to assemble the soundproof enclosure begins with placing the floor base unit onto a floor space, then installing all the acoustical wall panels, and finally placing the ceiling unit on the top whereby the handles will then be left on the ceiling unit for future use.

In still another embodiment, the method includes the step of providing a piece of interlocking shape plate of rigid and strong material to be releasably secured onto a matching cavity on a top edge of each of the two interconnected acoustical wall panels to lock the two wall panels together.

In yet still another embodiment, the acoustical wall panels with the vertical side edges releasably coupled to one another or to a coupling pole by conventional tongue and groove joining method or by conventional overlapping flanges joining method.

In one embodiment, the acoustical wall panels comprise of varying sizes, and bended on the vertical axis to form varying curved shapes, are interconnected to one another on the vertical side edge or to a coupling pole, to form a soundproof enclosure of different typological top views profiles.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

Embodiments of the invention will now be described by way of example only, and with reference to the accompanying drawings in which:

FIG. 7(i) is an illustrative top view of the soundproof enclosure ceiling unit with the intermediate core layer of double donut shape and with two round upper covering layer and have the features and designs illustrated in FIG. 7 to 7l, in accordance with certain embodiments of the present invention;

FIG. 7(ii) is an illustrative top view of the soundproof enclosure ceiling unit with the intermediate core layer of double donut shape and with two rectangular upper covering layer of the same size and a larger size upper covering layer in the middle of the double donut shape and having the features and designs illustrated in FIG. 7 to 7l, in accordance with certain embodiments of the present invention;

FIG. 7(iii) is an illustrative top view of the soundproof enclosure ceiling unit with the intermediate core layer of round shape and with a round upper covering layer and having four air flow apertures in the intermediate core layer and having the features and designs illustrated in FIG. 7 to 7l, in accordance with certain embodiments of the present invention;

FIG. 7(iv) is an illustrative top view of the soundproof enclosure ceiling unit with the intermediate core layer of triangular shape and with a triangular upper covering layer and having the features and designs illustrated in FIG. 7 to 7l, in accordance with certain embodiments of the present invention;

FIG. 7(v) is an illustrative top view of the soundproof enclosure ceiling unit with the intermediate core layer of octagonal shape and with the upper covering layers of rectangular shape and having four air flow apertures in the intermediate core layer and having the features and designs illustrated in FIG. 7 to 7l, in accordance with certain embodiments of the present invention;

FIG. 7(vi) is an illustrative top view of the soundproof enclosure ceiling unit with the intermediate core layer of octagonal shape and with the upper covering layer of octagonal shape and having eight air flow apertures in the intermediate core layer and having the features and designs illustrated in FIG. 7 to 7l, in accordance with certain embodiments of the present invention;

FIG. 7(vii) is an illustrative top view of the soundproof enclosure ceiling unit with the intermediate core layer of rectangular shape and having two separated upper covering layers and having two air flow apertures in the intermediate core layer and having the features and designs illustrated in FIG. 7 to 7l, in accordance with certain embodiments of the present invention;

FIG. 7(viii) is an illustrative top view of the soundproof enclosure ceiling unit with the intermediate core layer of rectangular shape and having four separated upper covering layers and having four air flow apertures in the intermediate core layer and having the features and designs illustrated in FIG. 7 to 7l, in accordance with certain embodiments of the present invention;

FIG. 10b is an illustrative perspective view of an example of a soundproof enclosure configured with four modular ceiling units and four modular floor base units, in accordance with certain embodiments of the present invention;

FIG. 10c is an illustrative perspective exploded view FIG. 10b showing an example of the construction of the ceiling frame by having cross-beams installed onto the acoustical wall panels by bracket means and the four sets of modular multilayer ceiling unit disposed onto the ceiling beams and on top of the whole or a portion of the top edges of the acoustical wall panels in accordance with certain embodiments of this present invention; and showing an example of the construction of the floor base frame by cross structural beams and peripheral perimeter structural beams mounted together by bracket means to support four units of modular floor base units, in accordance with certain embodiments of the present invention;

FIG. 11 is an illustrative partial cross-sectional view of an example of FIG. 1 with illustrative sound and electrical insulating materials, in accordance with certain embodiments of the present invention;

FIG. 11a(i) is an enlarged illustrative cross-sectional partial view of an example of FIG. 1 with illustrative sound and electrical insulating materials and with provision for an intersecting locking member with sound and electrical shield to releasably assemble the ceiling unit to the soundproof enclosure, in accordance with certain embodiments of the present invention;

FIG. 11a(ii) is an illustration of FIG. 11a(i) with the provision of the extended flange on the top edge of the acoustical wall panel, in accordance with certain embodiments of this present invention;

FIG. 11b(i) is an illustration of FIG. 11a with the provision of the peripheral ceiling unit wall attached to the acoustical wall panel top edge instead being attached to the ceiling unit, in accordance to certain embodiments of this present invention;

FIG. 11b(ii) is an illustration of FIG. 11b(i) with the provision of the extended flange on the top edge of the acoustical wall panel, in accordance with certain embodiments of this present invention;

FIG. 16b is an illustrative cross-sectional view of a soundproof enclosure with an extended ceiling unit and with water down pipes within the acoustical wall panels or within the poles in accordance to certain embodiments of the present invention;

FIG. 16c is an illustrative cross-sectional view of a soundproof enclosure with a flushed sized ceiling unit and with water down pipes within the acoustical wall panels or within the poles, in accordance to certain embodiments of the present invention;

FIG. 17 is a 3-dimensional illustrative view of an acoustical wall panel with two handles releasably secured to the exterior surface of the acoustical wall panel carrying during assembly to ease the assembly process, in accordance to certain embodiments of the present invention;

FIG. 17a is a 3-dimensional illustrative view of a handle as indicated in FIG. 17, and showing the two-bolt used to releasably secure it to the acoustical wall panel, in accordance to certain embodiments of the present invention;

FIG. 17b is a 3-dimensional illustrative view of a handle of a longer length and of stronger hold compared to FIG. 17a, and showing the four bolts used to releasably secure it to the acoustical wall panel, in accordance to certain embodiments of the present invention;

FIG. 17c is a 3-dimensional illustrative view of a portion of a ceiling unit with two handles, as shown in FIG. 17a, releasably secured to the top surface of the intermediate core layer to assist to carry the ceiling unit for assembly, in accordance to certain embodiments of the present invention;

Figure 1:
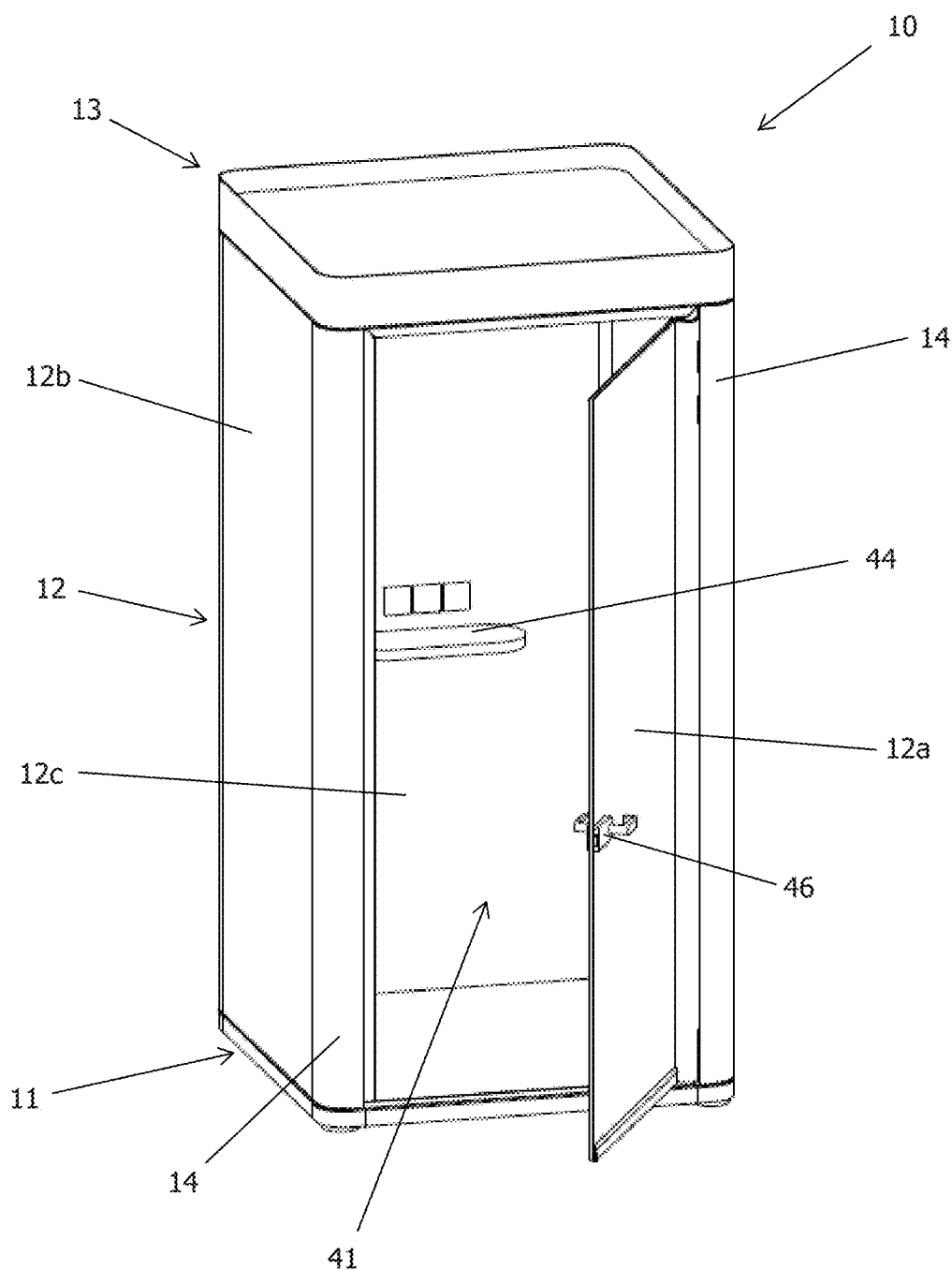
FIG. 1 is a perspective view of an example of a soundproof enclosure configured in accordance with certain embodiments of the present invention, with a front acoustical wall panel having an acoustical door panel member of the soundproof enclosure in open position.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

DETAILED DESCRIPTION OF THE EMBODIMENTS

Referring now to the drawings, there is shown a soundproof enclosure 10 constructed with sound absorbing and sound insulating material to insulate against internal and external noise, that can easily be assembled to form an enclosure which may be used as a quiet space for social interaction, privacy and comfort, and disassembled for easy relocation or relocated in whole, and there is shown a soundproofing air circulation unit with sound absorbing and sound insulating material to insulate against internal and external noise that may in installed in many applications, including external soundproof enclosures, elevator compartments, and to improve air conditioner systems.

FIG. 1 is an example of the embodiments of the present invention showing the soundproof enclosure 10 as prefabricated, assembled and disposed on the floor within an indoor or outdoor space such as walkway, park, airport, train station, exhibition hall, hospital or at working environment such as open office area, factory, as well as at home.

Figure 1A:
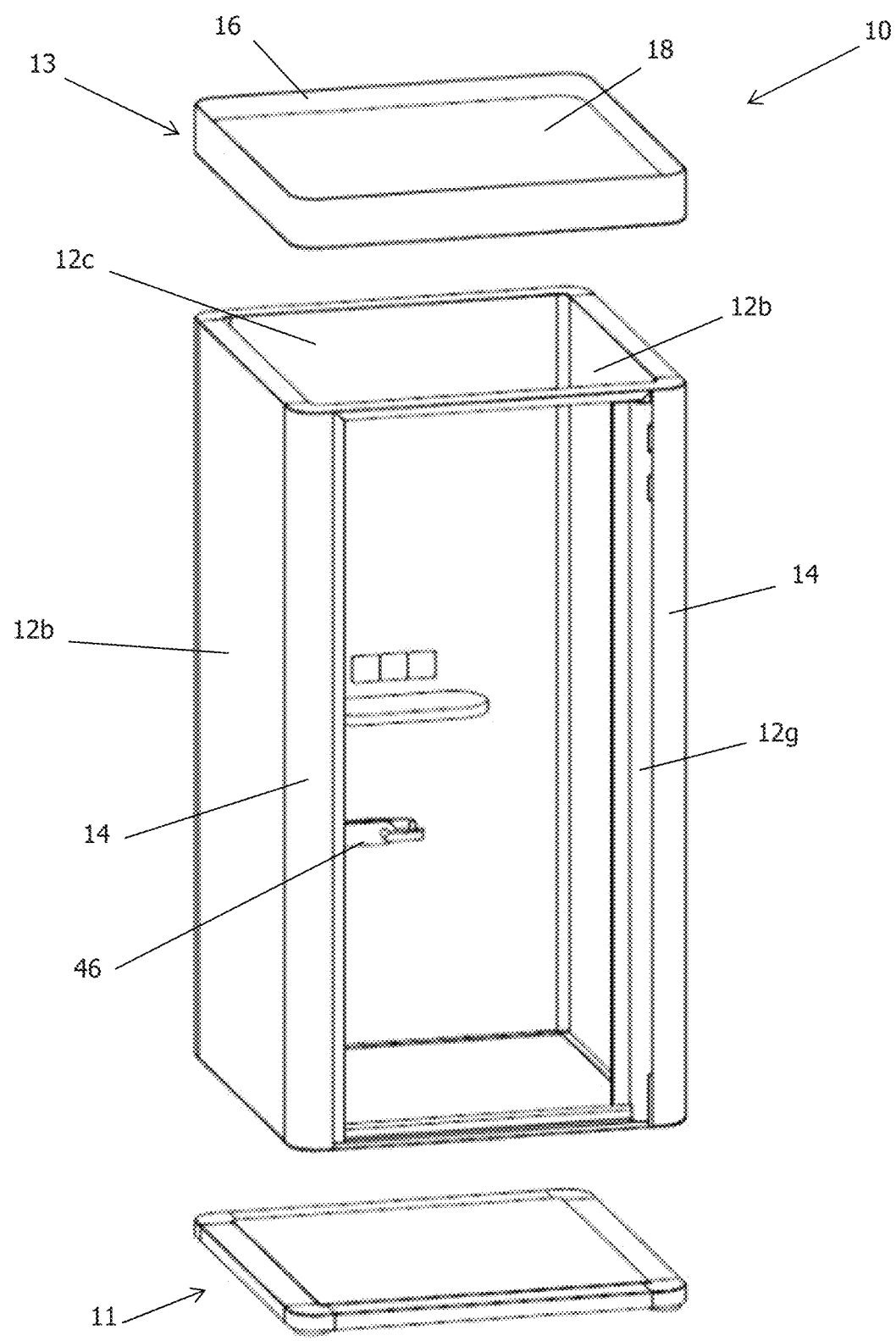
FIG. 1a is a perspective view of the example of the soundproof enclosure of FIG. 1 with the front acoustical wall panel that comprises the acoustical door panel member in closed position, and a modular ceiling unit and a floor base in disassembled position.

The soundproof enclosure 10, an example of the embodiments of the present invention, is constructed by a plurality of acoustical wall panels 12 interconnectable with one another at opposing vertical side edges for enclosing an interior space 41 as shown in FIGS. 1 and 1a. In an embodiment of the invention, each acoustical wall panel 12 is generally shaped to be able to interconnect to one another on the two vertical side edges 12f or to a coupling pole 14.

Figure 2A:
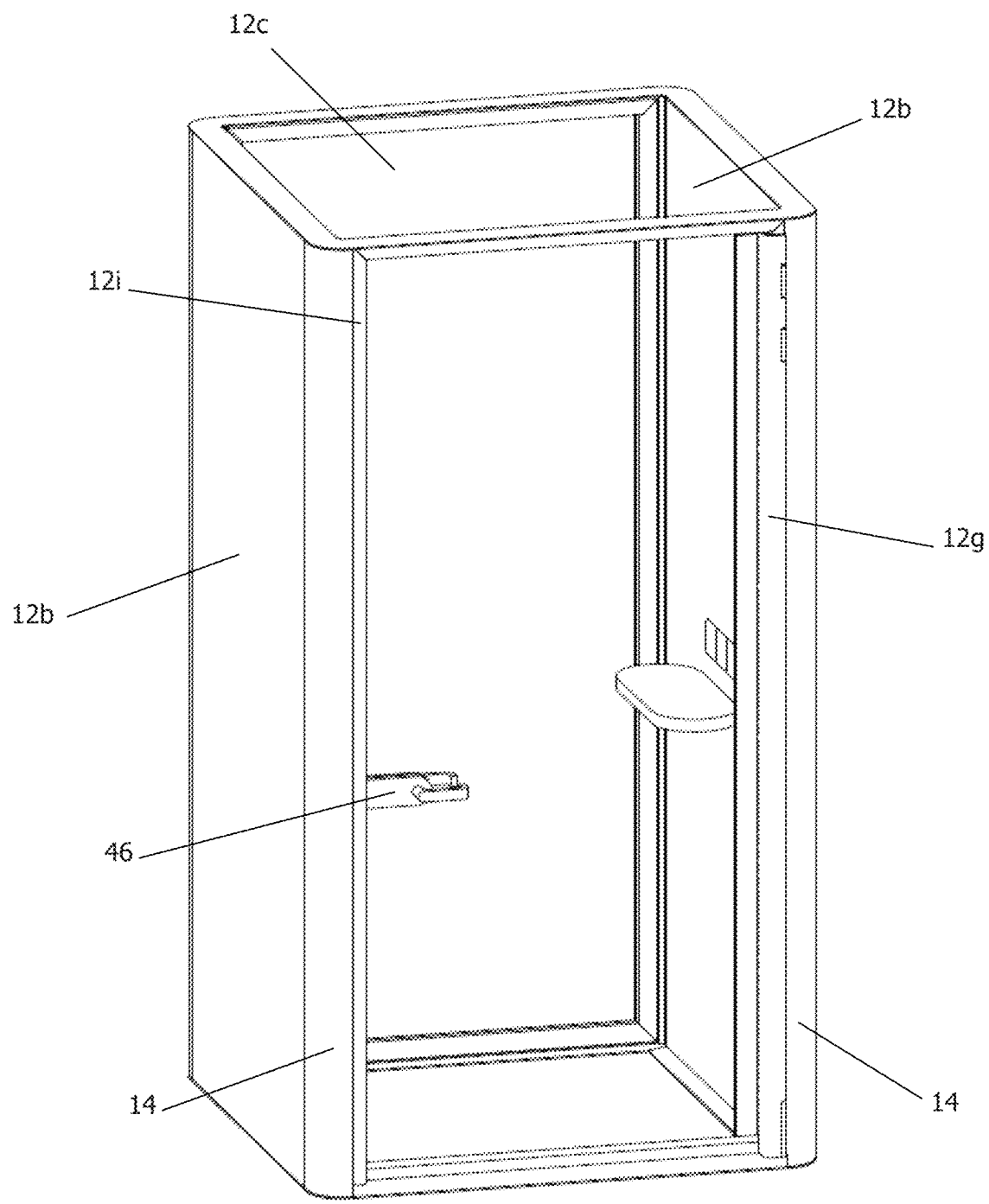
FIG. 2a is a perspective view of the example of the soundproof enclosure of FIG. 1 configured in accordance with certain embodiments of the present invention with the modular ceiling unit and the floor base removed for illustration, showing the front and back acoustical wall panels fabricated of translucent or transparent material, in accordance to certain embodiments of the present invention.
Figures 2B, 2C:
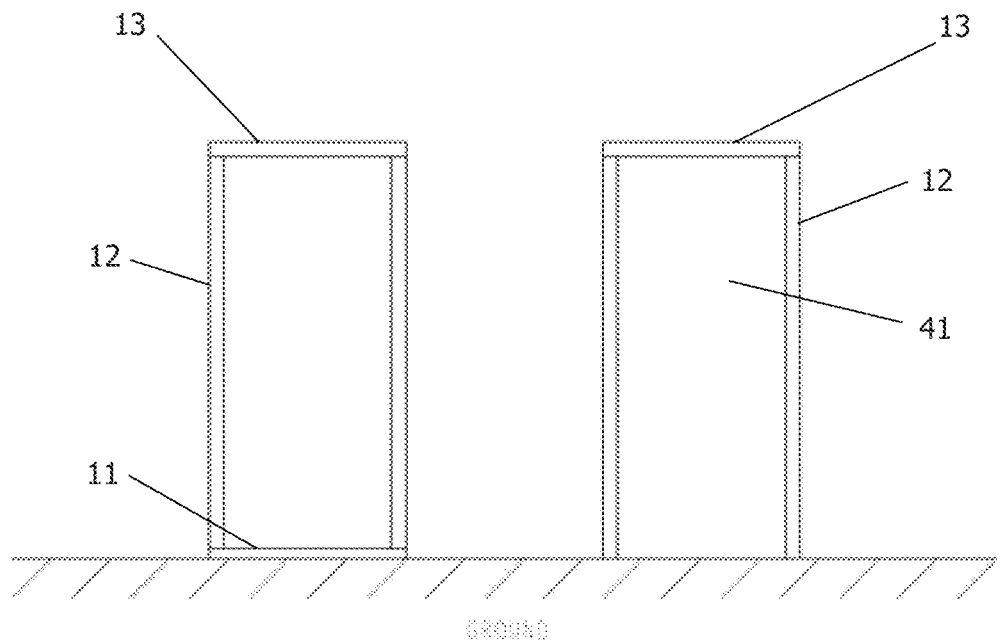
FIG. 2b is an illustrative cross-sectional view of an example of a soundproof enclosure such as shown in FIG. 1.
FIG. 2c is an illustrative cross-sectional view of an example of a soundproof enclosure such as shown in FIG. 1 that can be constructed onto a floor space without a floor base, in accordance to certain embodiments of the present invention.
Figures 2D, 2E:
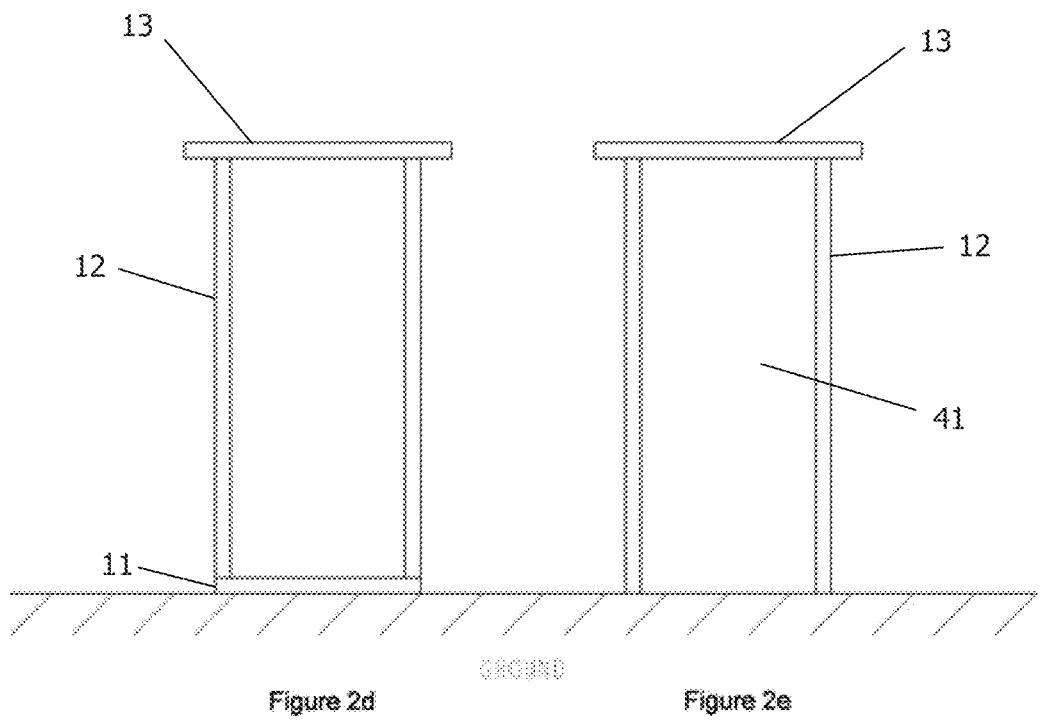
FIG. 2d is an illustrative cross-sectional view of an example of a soundproof enclosure configured with a modular ceiling unit in an extended diameter extending over the perimeter of the acoustical wall panels, in accordance to certain embodiments of the present invention.
FIG. 2e is an illustrative cross-sectional view of an example of a soundproof enclosure configured with the modular ceiling unit in an extended diameter extending over the perimeter of the acoustical wall panels that can be constructed onto a floor space without a floor base, in accordance to certain embodiments of the present invention.
Figure 2F:
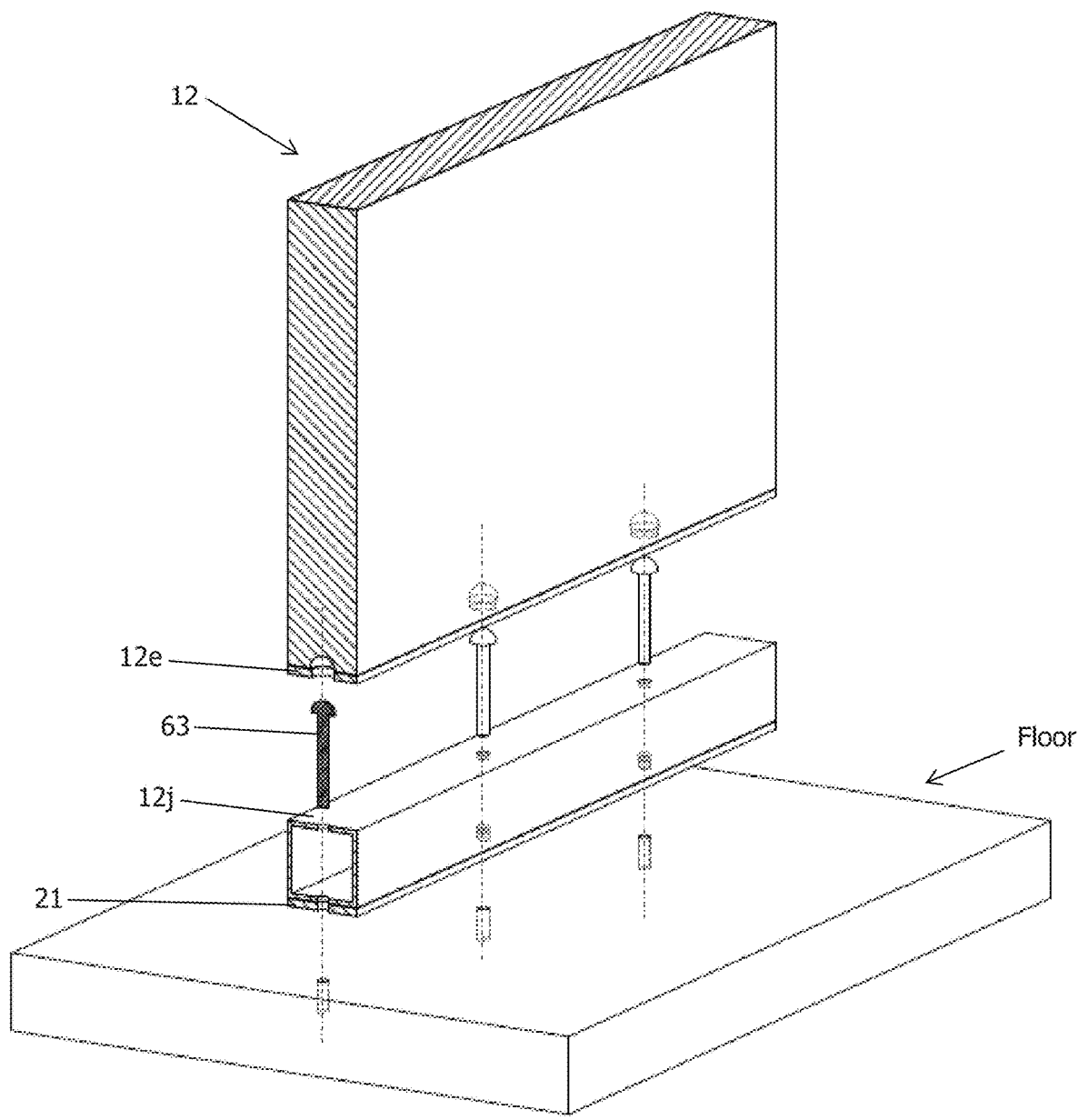
FIG. 2f is an illustrative 3-dimensional cross-sectional view of a floor bracket for installing the acoustical wall panel of a soundproof enclosure onto a floor space in accordance to certain embodiments of the present invention.

Each acoustical wall panel 12 is constructed for the functional requirements of the soundproof enclosure 10 walls, and as an example illustrated in FIG. 2a of the embodiments of the present invention, the acoustical wall panels 12 include a front wall panel 12a comprises an access door panel of rigid transparent material, two side wall panels 12b having each side wall panel comprises two spaced apart rigid opaque surfaces for sandwiching a layer of sound isolating material to form panel 12b with acoustical properties, and a back wall panel 12c of a sound isolating rigid transparent material. Each acoustical wall panel 12 includes a bottom edge provided with a bottom flange 12e of rigid material adapted to be supported by and releasably secured onto a floor base unit 11 as shown in FIGS. 2b and 2d or onto a floor space by a floor bracket 12j as shown in FIGS. 2c, 2e and 2f. The acoustical wall panel 12 further includes a top edge provided with a top flange 12d of rigid material adapted to support and releasably secure a ceiling unit 13 thereon, as illustrated in FIG. 2b to FIG. 2e.

In an embodiment of the invention, the ceiling unit 13 is disposed on the top edge 12d of the acoustical wall panels 12 to form an enclosed interior space 41 as illustrated on FIGS. 2b and 2c. In another embodiment of the invention, a ceiling unit 13 having an extended diameter portion larger than the diameter of the constructed acoustical wall panels 12 is disposed on the top edge 12d of the acoustical wall panels 12 to form the enclosed interior space 41 as illustrated on FIGS. 2d and 2e.

FIG. 1 shows a perspective view of a soundproof enclosure with the front wall panel 12a in open position. FIG. 1a shows a perspective view of a soundproof enclosure 10 with the ceiling unit 13 in a raised position, the floor base unit 11 in a lowered position and the front wall panel 12a in closed position.

Figure 7:
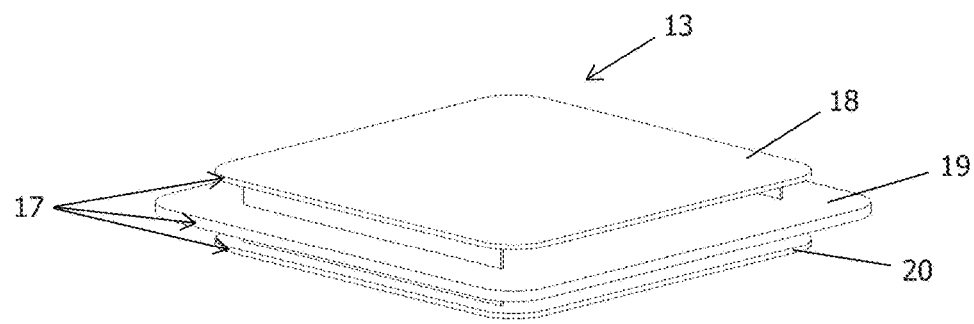
FIG. 7 is a perspective view of an acoustical ceiling unit, in accordance with certain embodiments of the present invention.
Figure 7A:
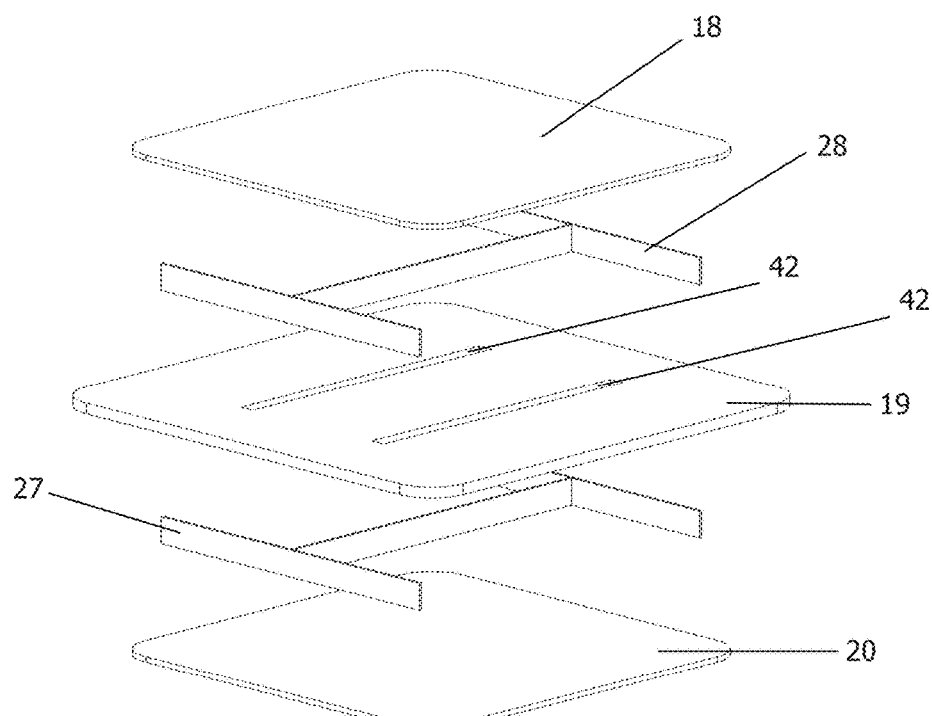
FIG. 7a is an exploded view of FIG. 7 showing an example of the ceiling brackets that assemble an upper covering layer to an intermediate core layer and the intermediate core layer to a lower suspended layer of the ceiling unit and showing an example of a pair of air flow apertures at the intermediate core layer which is formed in elongated slits for air intake and air exhaust from the soundproof enclosure, in accordance with certain embodiments of the present invention.
Figure 7B:
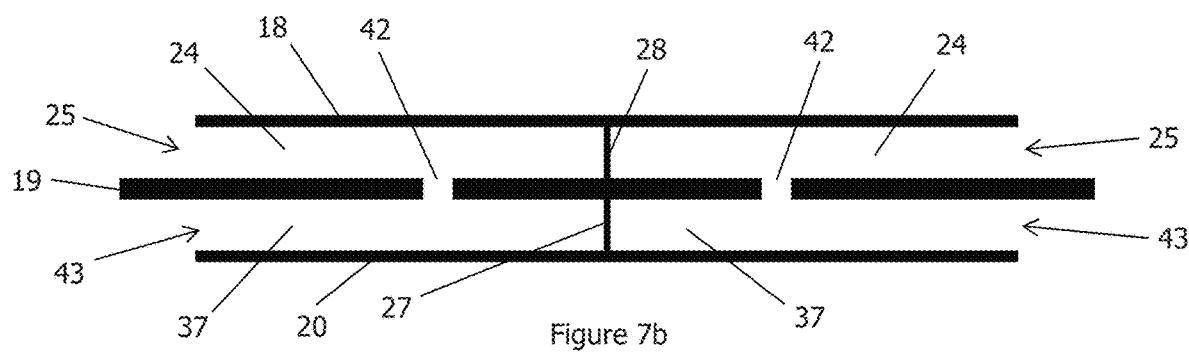
FIG. 7b is an illustrative cross-sectional view of the acoustical ceiling unit of FIG. 7.

As an example of the embodiments of the present invention, the ceiling unit 13 is a multilayer decoupling ceiling unit with at least three layers 17 as shown in FIGS. 7 to 7b.

Figure 2G:
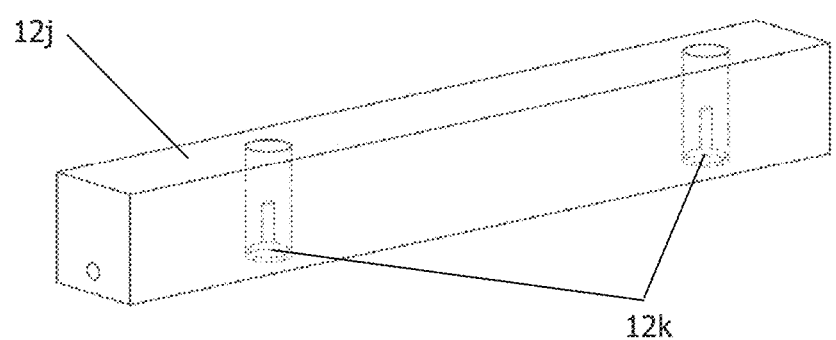
FIG. 2g is an illustrative 3-dimensional cross-sectional view of a floor bracket for installing the acoustical wall panel of a soundproof enclosure onto a floor space which is provided with levelling adjustments for uneven floor surfaces in accordance to certain embodiments of the present invention.

In an embodiment of the present invention, the acoustical wall panels 12 may be releasably fastened directly on to a floor space or on to adaptive floor brackets 12j as shown in FIGS. 2f and 2g on the floor and therefore the soundproof enclosure 10 is installed without a floor base unit 11 as illustrated in FIGS. 2c and 2e.

In an embodiment of the present invention, the acoustical wall panels 12 may be releasably fastened onto a floor space and be adjusted for varying floor surfaces by levelling adjusters 12k within floor bracket 12j, as illustrated in FIG. 2g.

Figure 3:
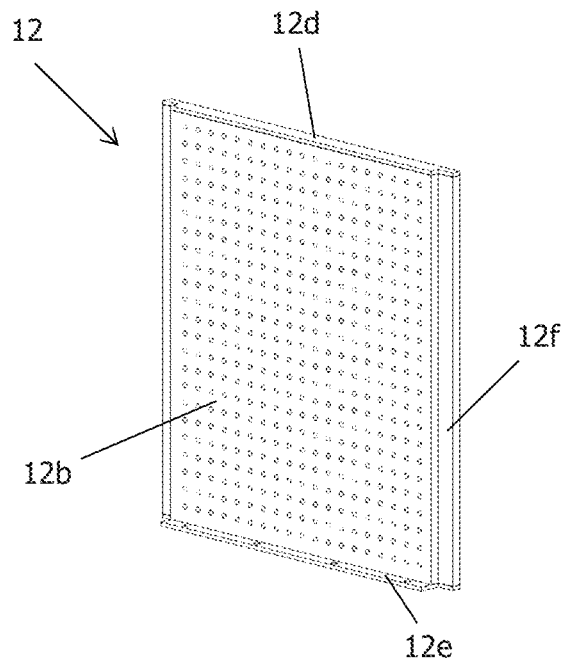
FIG. 3 is a perspective view of an example of an acoustical wall panel having an extended rigid flange each at a bottom edge and a top edge of the acoustical wall panel, and opposing vertical side edges with conventional overlapping flanges, and provided with visible acoustical properties on the interior surface of the acoustical wall panel in accordance with certain embodiments of the present invention.
Figure 3A:
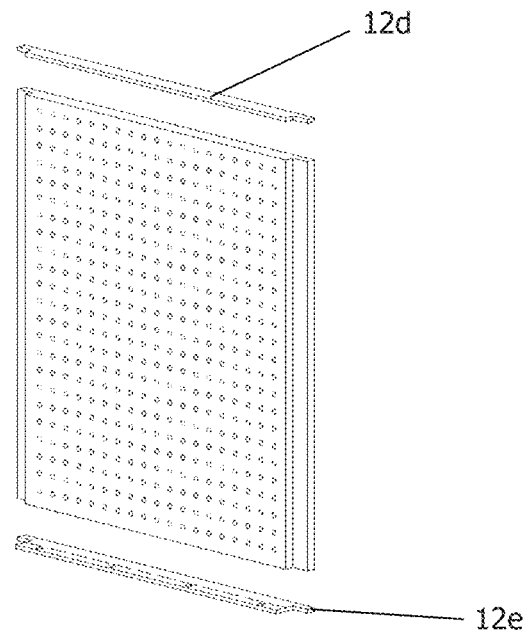
FIG. 3a is an exploded view of FIG. 3.
Figure 3B:
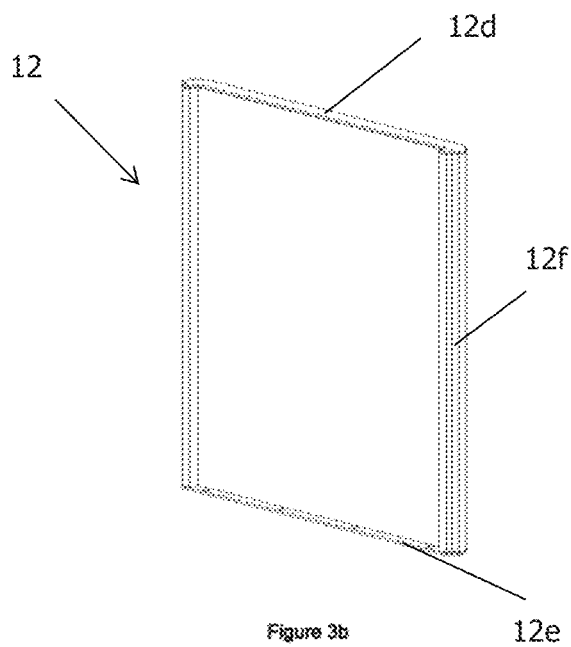
FIG. 3b is an illustrative example of a 3-dimensional view of FIG. 3 with integrated poles on each of the two vertical side edges in accordance with certain embodiments of the present invention.
Figure 3C:
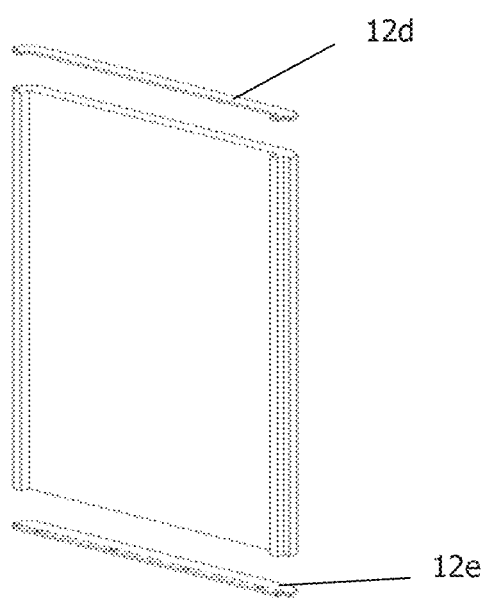
FIG. 3c is an exploded view of FIG. 3b.

In an embodiment of the present invention, the acoustical wall panels 12 may comprise a panel structure 12b generally constructed with an exterior wall layer 31 and an inner wall layer 32 of rigid materials and sandwiched in-between with sound insulating materials such as foam, felt, rock wool, etc. The exterior wall layer 31 and the inner wall layer 32 each has an exposed surface which may be further layered with sound absorbing or sound insulating materials, such as foam or felt of various textures to improve the absorption or insulation of sound, and in addition, the exposed surfaces may also comprise of pores, holes, or textures to deflect or absorb sound waves as shown in FIGS. 3 and 3a.

In an embodiment of the present invention, each acoustical wall panel 12 comprises the bottom flange 12e fitted at the bottom edge that can be releasably secured onto a top surface of the floor base unit 11, or directly onto a floor space, or onto the floor bracket 12j installed on a floor space.

In an embodiment of the present invention, each acoustical wall panel 12 has the top flange 12d of rigid material fitted at the top edge that supports and can releasably secure the modular ceiling unit 13.

In another embodiment of the invention, the acoustical wall panels 12 may be fitted with a rigid material of opaque, translucent, or transparent material in substitute of the abovementioned sandwiched construction; for example, shown in FIG. 2a, where the back wall panel 12c have its structure made of glass panel.

Figure 4:
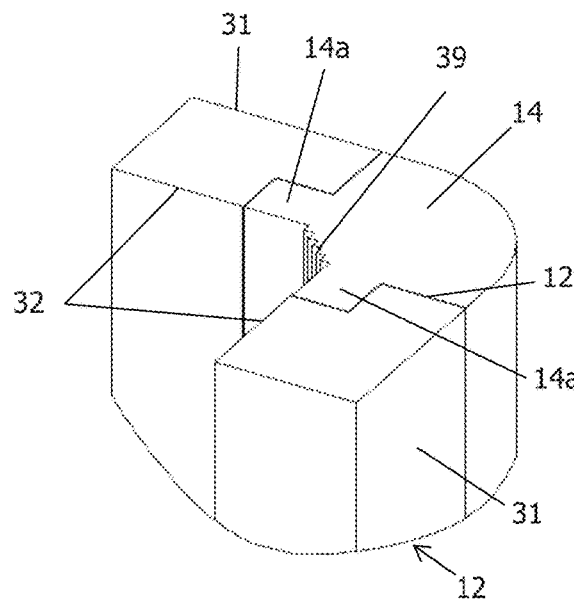
FIG. 4 is an illustrative partial 3-dimensional cross-sectional view of an example of two acoustical wall panels with the vertical side edges coupled to a coupling pole having a jagged inner corner with conventional overlapping flanges joining method, in accordance with certain embodiments of the present invention.
Figure 4A:
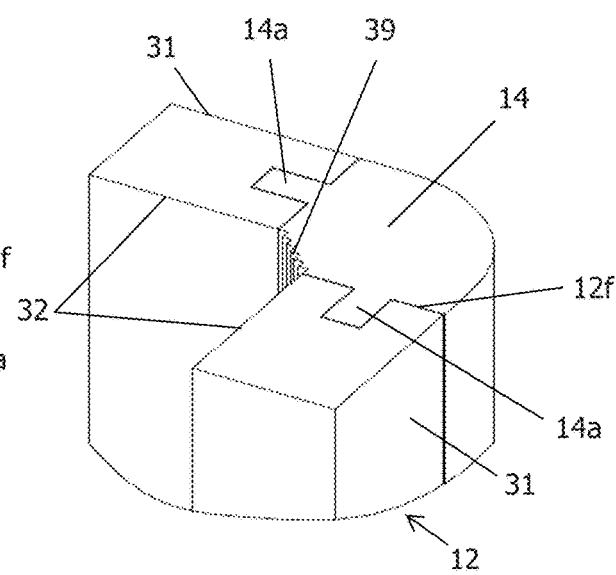
FIG. 4a is an illustrative partial 3-dimensional cross-sectional view of an example of two acoustical wall panels with the vertical side edges coupled to a coupling pole with conventional tongue and groove joining method, in accordance with certain embodiments of the present invention.

In embodiment of the invention, the soundproof enclosure 10 comprises of acoustical wall panels 12 and coupling poles 14 interconnected together with conventional overlapping flanges joining method as shown in FIG. 4 or with conventional tongue and groove joining method having a vertical tongue 14a provided on both vertical side edges of the coupling pole 14 as shown in FIG. 4a where a groove for accommodating the vertical tongue 14a provided on the vertical side edges 12f of the acoustical wall panels 12.

Figure 4B:
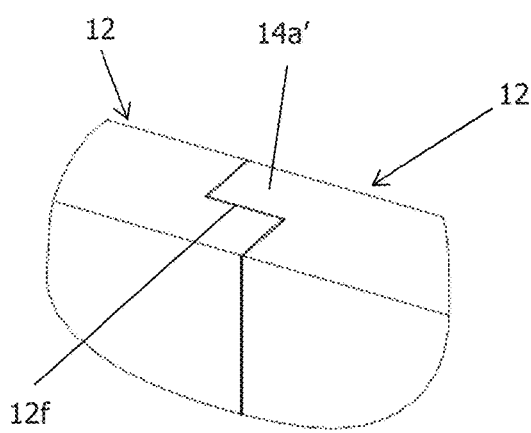
FIG. 4b is an illustrative partial 3-dimensional cross-sectional view of an example of the acoustical wall panels with the vertical side edges coupled to one another with conventional overlapping flanges joining method, in accordance with certain embodiments of the present invention.
Figure 4C:
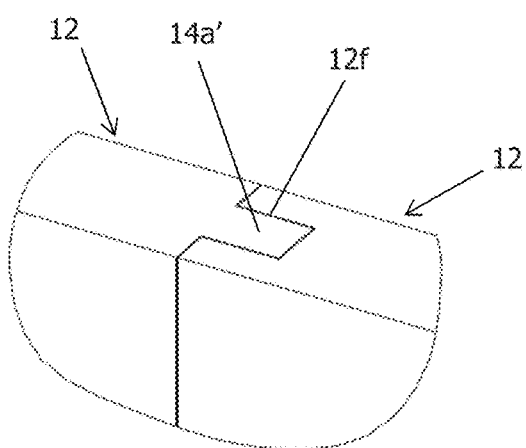
FIG. 4c is an illustrative partial 3-dimensional cross-sectional view of an example of the acoustical wall panels with the vertical side edges coupled to one another with conventional tongue and groove joining method, in accordance with certain embodiments of the present invention.

In an embodiment of the present invention, the conventional overlapping flanges or the conventional tongue and groove joining method may be employed whereby a vertical tongue 14a of one acoustical wall panel 12 is formed in a tongue portion at the vertical edge 12f and a groove is formed in a complementary shaped groove portion provided on respective abutting vertical side edges 12f of another acoustical wall panels 12 to releasably secure to one another, as illustrated in FIGS. 4b and 4c.

In the illustrated example in FIG. 1a, an assembly of interconnected acoustical wall panels 12 included a front wall panel, two side wall panels and a back wall panel which collectively form a peripheral wall of the soundproof enclosure. The plurality of acoustical wall panels 12 are interconnected and releasably secured by a plurality of coupling poles 14 at the vertical side edges 12f of the acoustical wall panels 12 by conventional groove and tongue fitting method or conventional overlapping flanges fitting method on each of the vertical side edges.

At least one strip of sound insulating material is fitted along the interconnecting vertical side edges of each of the acoustical wall panels 12 edges and each of the coupling pole 14 connecting edges to improve the sound insulation at the connections of the enclosure walls.

In an embodiment of the present invention, each of the acoustical wall panels 12 may be interchangeably disposed on any side of the soundproof enclosure.

Figure 6:
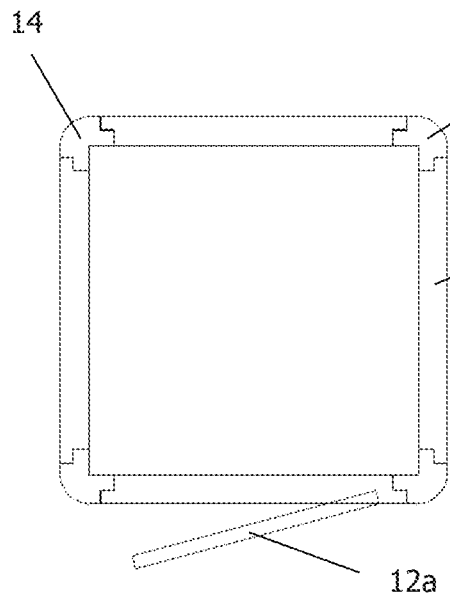
FIG. 6 is a top sectional view of FIG. 1 with four of the acoustical wall panels and four of the coupling poles all coupled to one another by conventional extended flange on their vertical side edges forming a peripheral wall of the soundproof enclosure, in accordance with certain embodiments of the present invention.
Figure 6A:
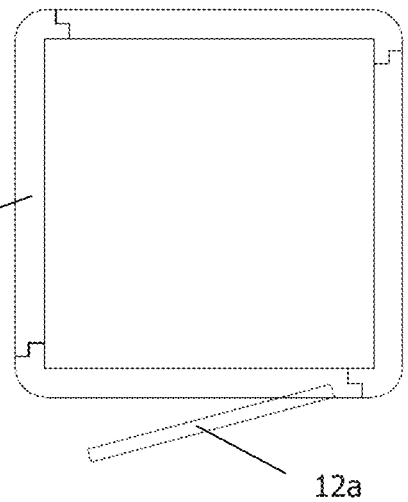
FIG. 6a is an illustrative example of a top sectional view of FIG. 1 showing each of the acoustical wall panels integrated with a coupling pole on one vertical side edge forming an extended flange and provided with a complementary shaped recess portion on the opposing vertical side edge for interconnecting with one another to form a peripheral wall of a soundproof enclosure, in accordance with certain embodiments of the present invention.
Figure 6B:
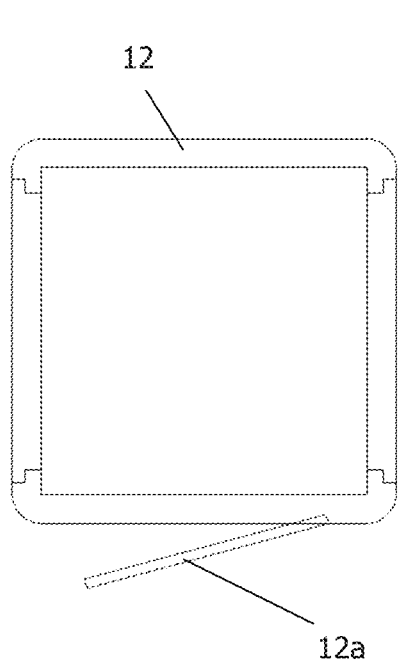
FIG. 6b is an illustrative example of a top sectional view of FIG. 1 showing two coupling poles integrated with a back acoustical wall panel and another two coupling poles integrated with a front acoustical wall panel to form a peripheral wall of the soundproof enclosure, in accordance with certain embodiments of the present invention.
Figure 6C:
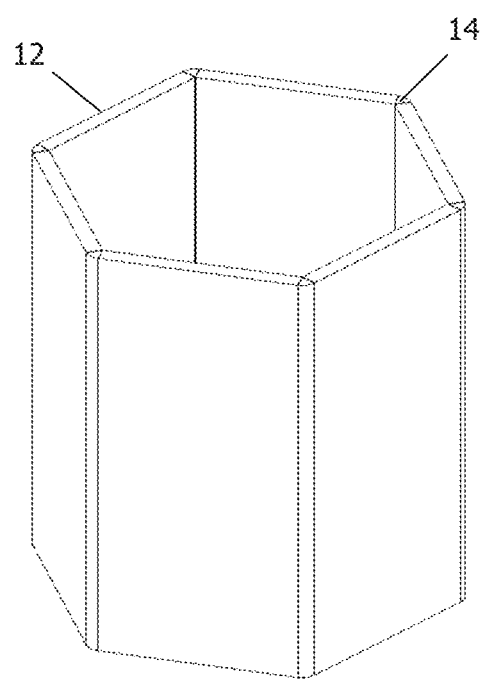
FIG. 6c is an illustrative example of a perspective sectional view of a soundproof enclosure configured in accordance with an embodiment of the present invention, integrated with a plurality of coupling poles with angles of 120 degrees, in accordance with certain embodiments of the present invention.
Figure 6D:
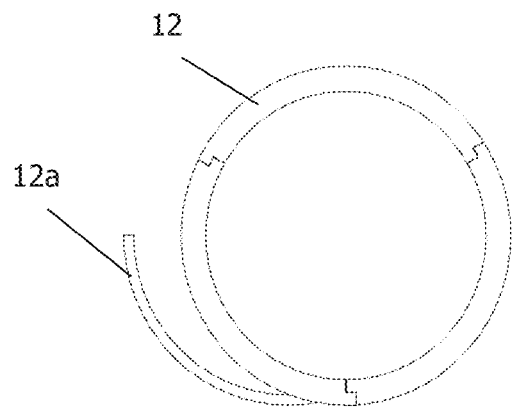
FIG. 6d is an illustrative example of a top sectional view of a soundproof enclosure having three acoustical wall panels with curved surfaces to form a peripheral wall of the soundproof enclosure, in accordance with certain embodiments of the present invention.
Figure 6E:
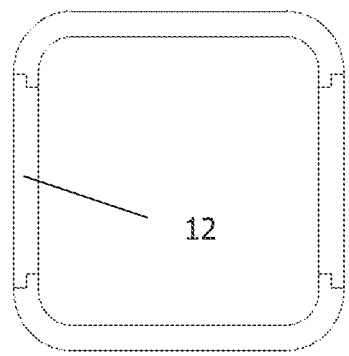
FIG. 6e is an illustrative example of a top sectional view of a soundproof enclosure having two acoustical wall panels with curved elongated vertical side edges on two ends and two flat surface acoustical wall panels, coupled to one another, to form a peripheral wall of the soundproof enclosure, in accordance with certain embodiments of the present invention.
Figure 6F:
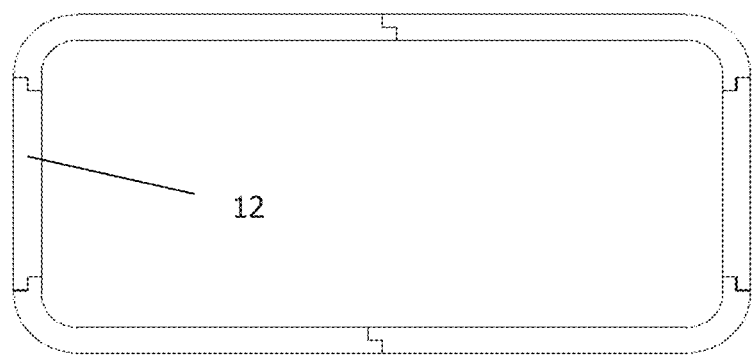
FIG. 6f is an illustrative example of a top sectional view of a soundproof enclosure having four acoustical wall panels with curved elongated vertical side edges on one panel end and flat surface on the other end, and having two flat surface acoustical wall panels, coupled to one another, to form a peripheral wall of the soundproof enclosure, in accordance with certain embodiments of the present invention.
Figure 6G:
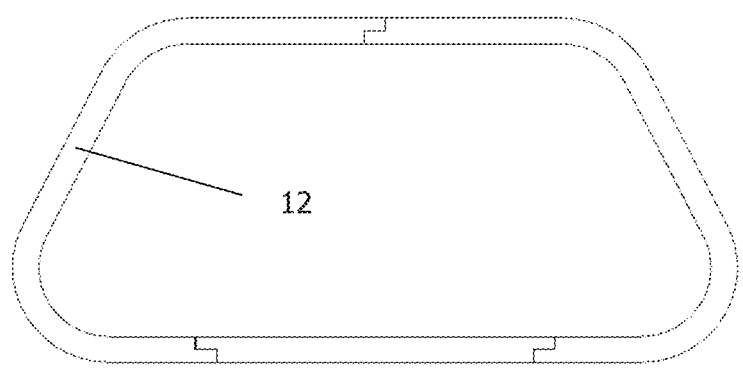
FIG. 6g is an illustrative view of a top sectional view of a soundproof enclosure having two acoustical wall panels with extended curved elongated vertical side edges with different angles on each corner of the panel ends, and having two flat surface acoustical wall panels, coupled to one another, to form a peripheral wall of the soundproof enclosure, in accordance with certain embodiments of the present invention.

At least a portion of the acoustical wall panel 12 illustrated in FIG. 1 is movably connected at one vertical side edge of the portion to a peripheral frame structure for providing and covering an access or entrance opening 15 for users to access to and from the soundproof enclosure. The front acoustical wall panel 12 acts as an access door and frame overlying the access opening 15 for movements between an open position and a closed position. The access door panel 12a is provided with handles 46 which facilitate the opening and closing of the access door panel 12a. The access door panel 12a can be of curved shape as illustrated in FIG. 6d, or of other shapes suitable for an access door panel 12a. To accommodate larger access area or to save layout space, the swing access door panel 12a as illustrated in FIG. 3d may be substituted by a sliding door construction as illustrated in FIG. 3e.

Figure 3D:
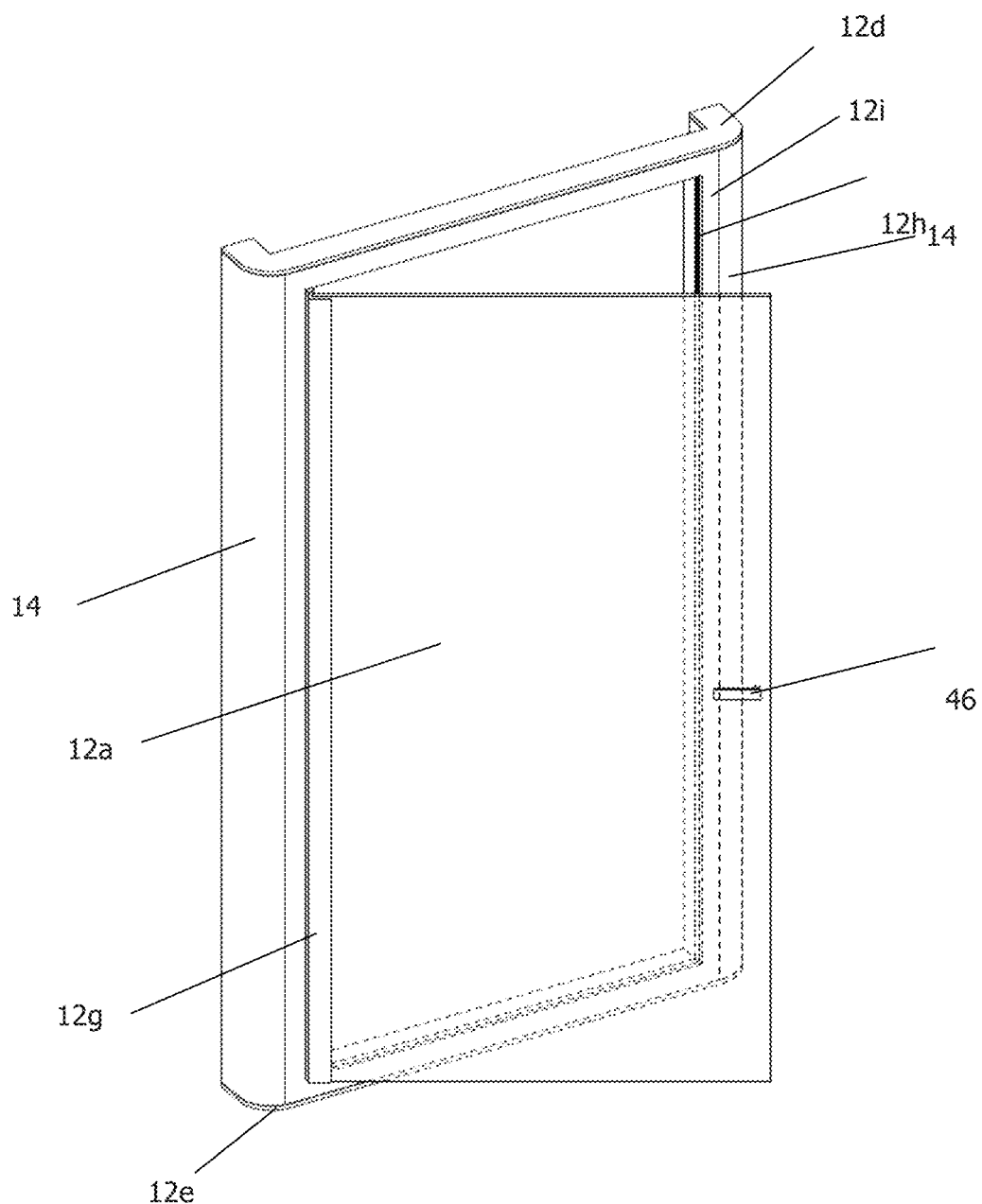
FIG. 3d is a perspective view of FIG. 3b configured with an example of the acoustical wall panel that has an acoustical swing door panel member and a continuous vertical door hinge with at least one strip of continuous sound seal provided on each of the four edges of a door frame, in accordance with certain embodiments of the present invention.
Figure 3E:
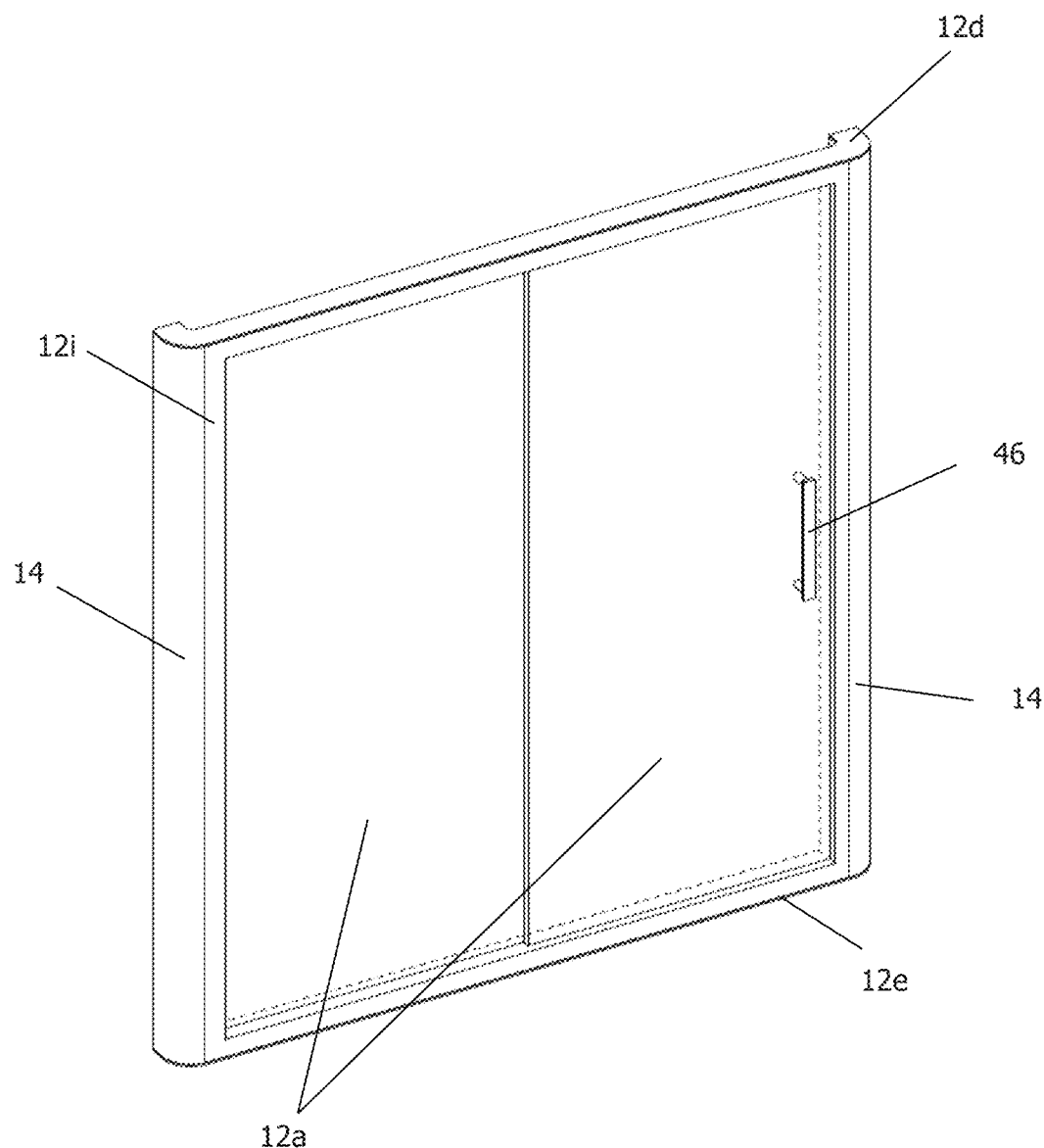
FIG. 3e is an illustrative example of a 3-dimensional view of FIG. 3b configured with an example of an acoustical wall panel that has an acoustical sliding door panel member and has at least one strip of continuous sound seal provided on each of the four edges of a door frame, in accordance with certain embodiments of the present invention.

As an example of the embodiments of the present invention, in FIG. 2a, the front acoustical wall panel 12 wall structure 12b is substituted by an access door panel 12a shown in FIG. 3d, which may also be of translucent or transparent material such as glass. As illustrated in FIG. 3d, the front acoustical wall panel 12 may include a sound sealing strip of material 12h applied around the periphery of the access door frame 12i to create a soundproof seal.

In an embodiment of the invention, FIG. 3d illustrates a vertical strip of rigid material 12g releasably secured to one side of the access door panel 12a spanning its full vertical length and on the other vertical side edge movably secured to the access door frame 12i to act as a continuous door hinge 12g for the access door panel 12a. The frame 12i comprises of at least one strip of sound seal material to couple with door hinge 12g to sound seal the entire vertical strip of the opening of the access door panel 12a to improve the sound impedance by avoiding sound gaps caused by conventional door hinges, and hence when the access door panel 12a is in a closed position, it will block sound from entering and leaving the soundproof enclosure 10. In addition, each of the four sides of the access door frame 12i is installed with at least one sound seal strip 12h to fully and continuously sound seal the door panel providing no sound gaps.

In an embodiment of the invention, the coupling pole 14 comprises a sound wave dispersing textures such a rough textiles or topography such as jagged vertical lines on the exposed inside surface 39 to reduce the sound reflection in the interior space 41 of the soundproof enclosure 10. The corner edges of the lower suspended layer 20 can have jagged or matching typological edges to reduce sound reflection, as shown in FIGS. 5f and 5g.

Figure 5:
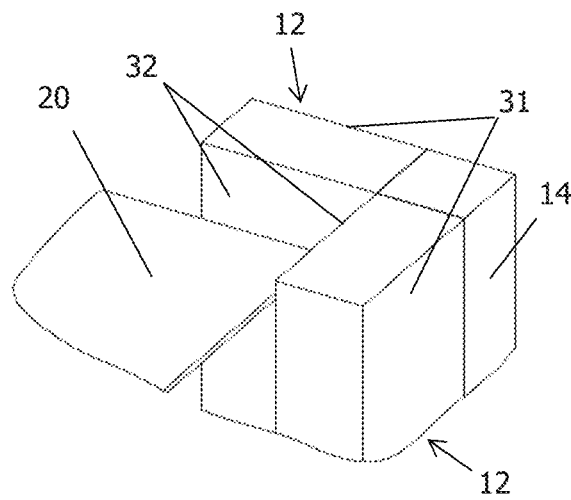
FIG. 5 is an illustrative partial 3-dimensional cross-sectional view of an example of a coupling pole with a corresponding lower suspended layer of a ceiling unit to reduce sound decibel levels within the soundproof enclosure by capturing the sound waves into the sparse-out spaces above the lower suspended layer and within in between the pole and the ceiling lower suspended layer, in accordance with certain embodiments of the present invention.
Figure 5A:
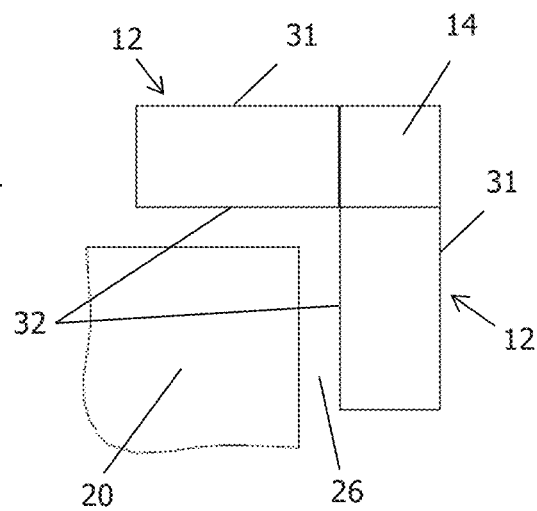
FIG. 5a is a top view of FIG. 5.
Figure 5B:
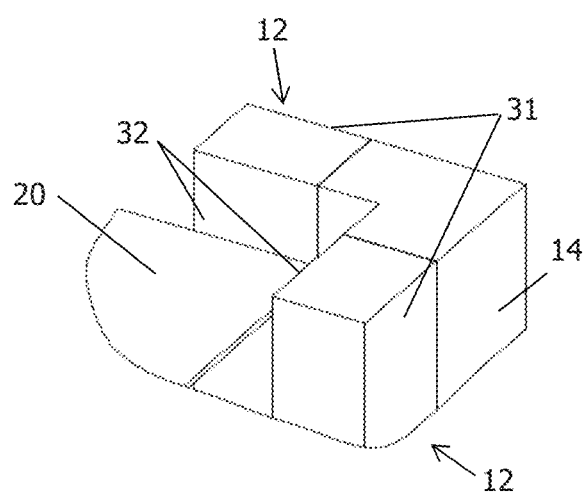
FIG. 5b is an illustrative example of FIG. 5 with an example of a larger diameter coupling pole, in accordance with certain embodiments of the present invention.
Figure 5C:
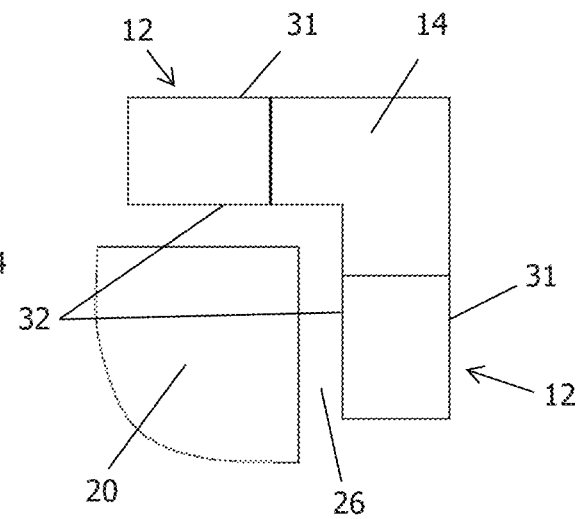
FIG. 5c is a top view of FIG. 5b.
Figure 5D:
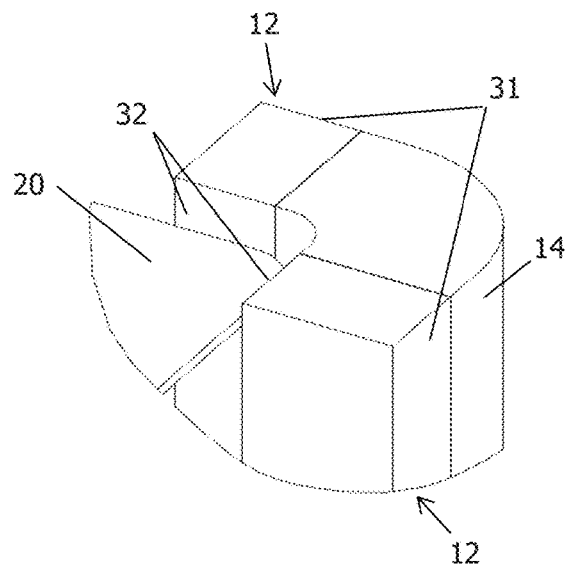
FIG. 5d is an illustrative example of FIG. 5b having an example of a pole with rounded surface and a corresponding lower suspended layer with rounded corner to reduce sound decibel levels within the soundproof enclosure by capturing the sound waves into sparse-out spaces above the lower suspended layer, in accordance with certain embodiments of the present invention.
Figure 5E:
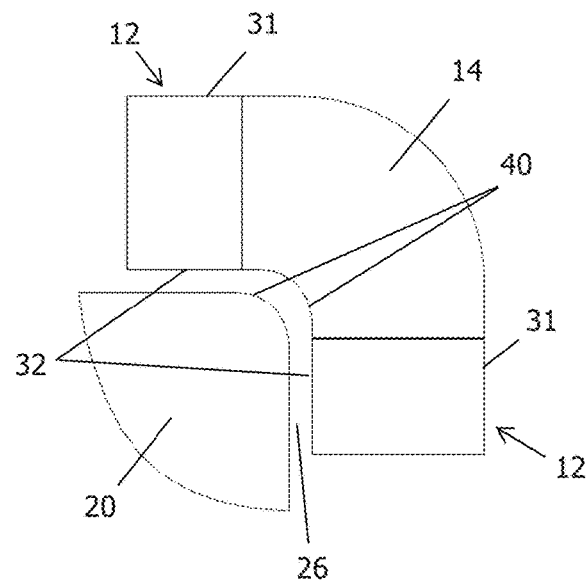
FIG. 5e is a top view of FIG. 5d.
Figure 5F:
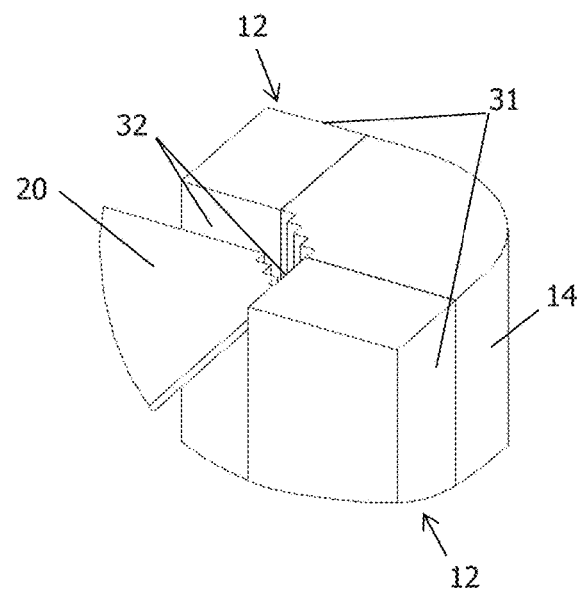
FIG. 5f is an illustrative example of FIG. 5b having an example of a coupling pole with jagged topography on the entire surface on the interior side of the soundproof enclosure and a corresponding lower suspended layer of a ceiling unit to further dissipate sound waves in accordance, with certain embodiments of the present invention.
Figure 5G:
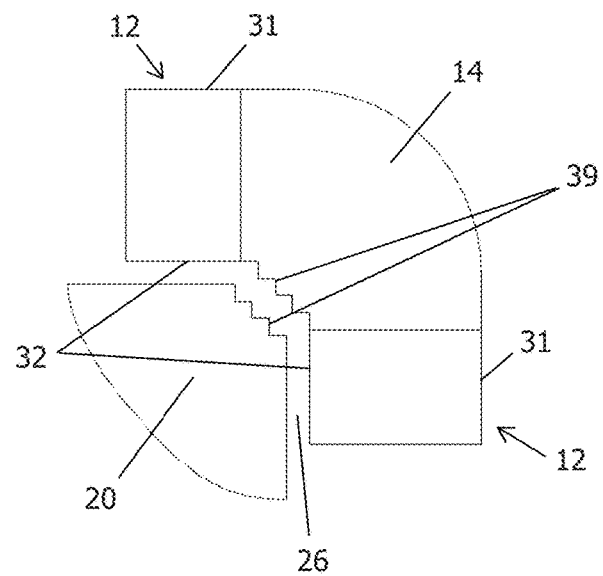
FIG. 5g is a top view of FIG. 5f.

Correspondingly, in an embodiment of the invention, the lower suspended layer 20 is suspended below the intermediate core layer 19 to create a space to capture the sound waves and to reduce to the sound dB levels within the interior space 41 as shown in FIGS. 5 to 5g.

In an embodiment of the invention, the acoustical wall panels 12 may have different shapes and interconnected to one another on the two vertical side edges to form an enclosure as illustrated by FIGS. 6d to 6g showing the top view of a partial selection of the various possible shapes.

In another embodiment of the invention, an acoustical wall panel 12 may be integrated to a coupling pole 14 on one or both the vertical side edges. In FIG. 6, a soundproof enclosure 10 is formed by four acoustical wall panels 12 and four coupling poles 14, and hence all the acoustical wall panels 12 are interconnected to one another vide a coupling pole 14 on each of the two vertical sides. In FIG. 6a, as an example of this embodiment, each acoustical wall panels 12 are integrated with a coupling pole 14 on one vertical side edge. In FIG. 6b, the front and back acoustical wall panels 12 are integrated with a coupling pole 14 on both vertical sides.

In yet another embodiment of the invention, the coupling poles 14 connecting the vertical side edges of the acoustical wall panels 12 may be oriented at angles other than right angles to each other, such as at angles between 20 degrees to 340 degrees and are generally oriented at angles of 60 to 180 degrees. As an example of this embodiment, FIG. 6c has shown the coupling poles 14 connecting vertical sides are oriented at 120 degrees illustrating the assembly of six acoustical wall panels 12. In addition, this embodiment may also embody the integration of coupling pole 14 with acoustical wall panel 12 as illustrated in FIGS. 6 to 6b. Similarly, as an example of this embodiment, the assembly of interconnected acoustical wall panels 12 includes a front access door panel 12a, and two side acoustical wall panels which collectively form a peripheral wall in a triangular arrangement, as shown in 7(iv) wherein the front acoustical wall panel 12 and the two side acoustical wall panels 12 are interconnected and releasably secured at each of their vertical side edges.

In an embodiment of the present invention, the coupling poles 14 are made with rigid materials with at least one cavity inside the pole. This cavity or cavities may be filled with sound insulating materials. In addition, the exposed surfaces of the coupling pole may also be layered with one or more layers of sound absorbing or insulating materials such a fabric, foam, or felt.

In an embodiment of the present invention, the acoustical wall panels 12 of the soundproof enclosure 10 can be installed by three methods:
  a. laid directly onto an existing floor of the space, as illustrated in FIGS. 2c and 2e, or
  b. onto the floor brackets 12j adapted to support the acoustical wall panels 12 as illustrated in FIG. 2f, or
  c. onto the floor base unit 11 adapted to be laid on the existing floor as illustratively shown in FIGS. 2b and 2d.

In an embodiment of the invention, the floor base unit 11 is provided as the base of the soundproof enclosure 10 and disposed on the existing floor of the space.

In another embodiment of the invention, the bottom edges 12e of the acoustical wall panels 12 are adapted to be supported directly on the floor base unit 11. The floor base unit 11 is provided with a decoupling element to acoustically isolate and decouple the peripheral wall of the soundproof enclosure 10.

Figure 14:
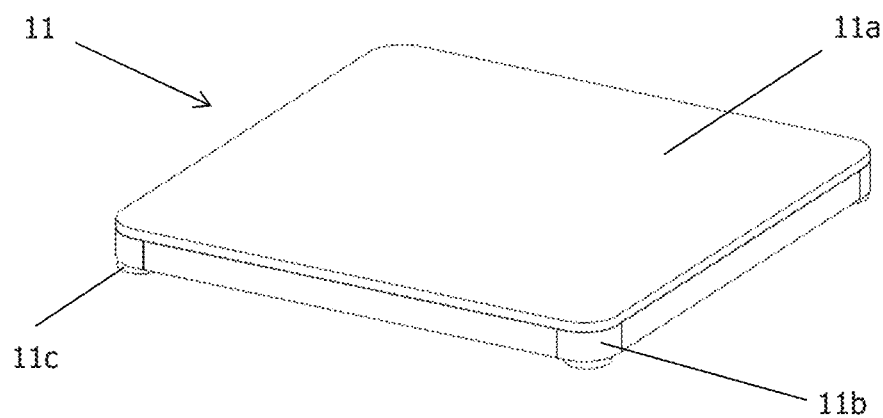
FIG. 14 is an illustrative perspective view of an example of a floor base unit of a soundproof enclosure, in accordance with certain embodiments of the present invention.
Figure 14A:
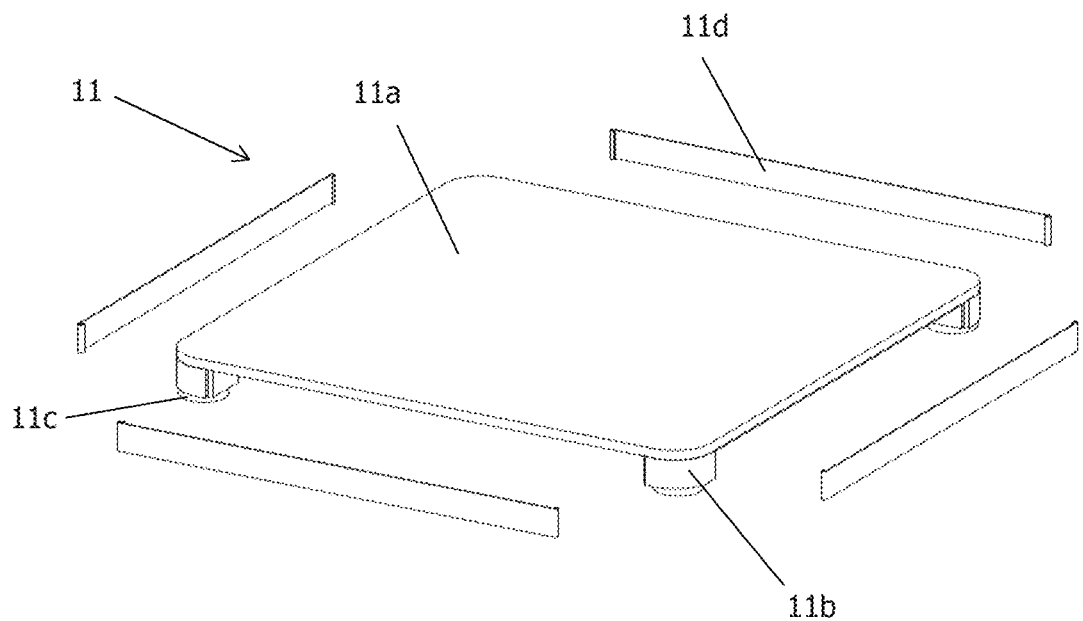
FIG. 14a is an illustration of FIG. 14 with the peripheral side covers disassembled showing a floor base plate which is structurally rigid, and four sets of legs secured to the floor base plate elevating the floor base plate above the floor level, and a screw type floor levelling guide attached to each of the foot, in accordance with certain embodiments of the present invention.

In an embodiment of the invention, the floor base 11 includes a base frame 11a in the form of rigid material in crisscross structure to provide structural strength, at least one floor plate 11b of rigid material to provide top surface to the floor base 11, a plurality of floor levellers 11c, in the form blot and floor stud, to level against uneven floors, an optional set of peripheral side covers 11d for reasons of at least one of the following; a. for user safety of the foot, b. aesthetic of the soundproof enclosure 10, and c. to protect against debris or dirt into below the floor base 11 as shown in FIGS. 14 and 14a.

In an embodiment of the invention, the floor plate 11b may comprise of a top layer and a bottom layer of rigid material; and sandwiched in-between with a layer of sound insulating material.

Figures 10, 10A:
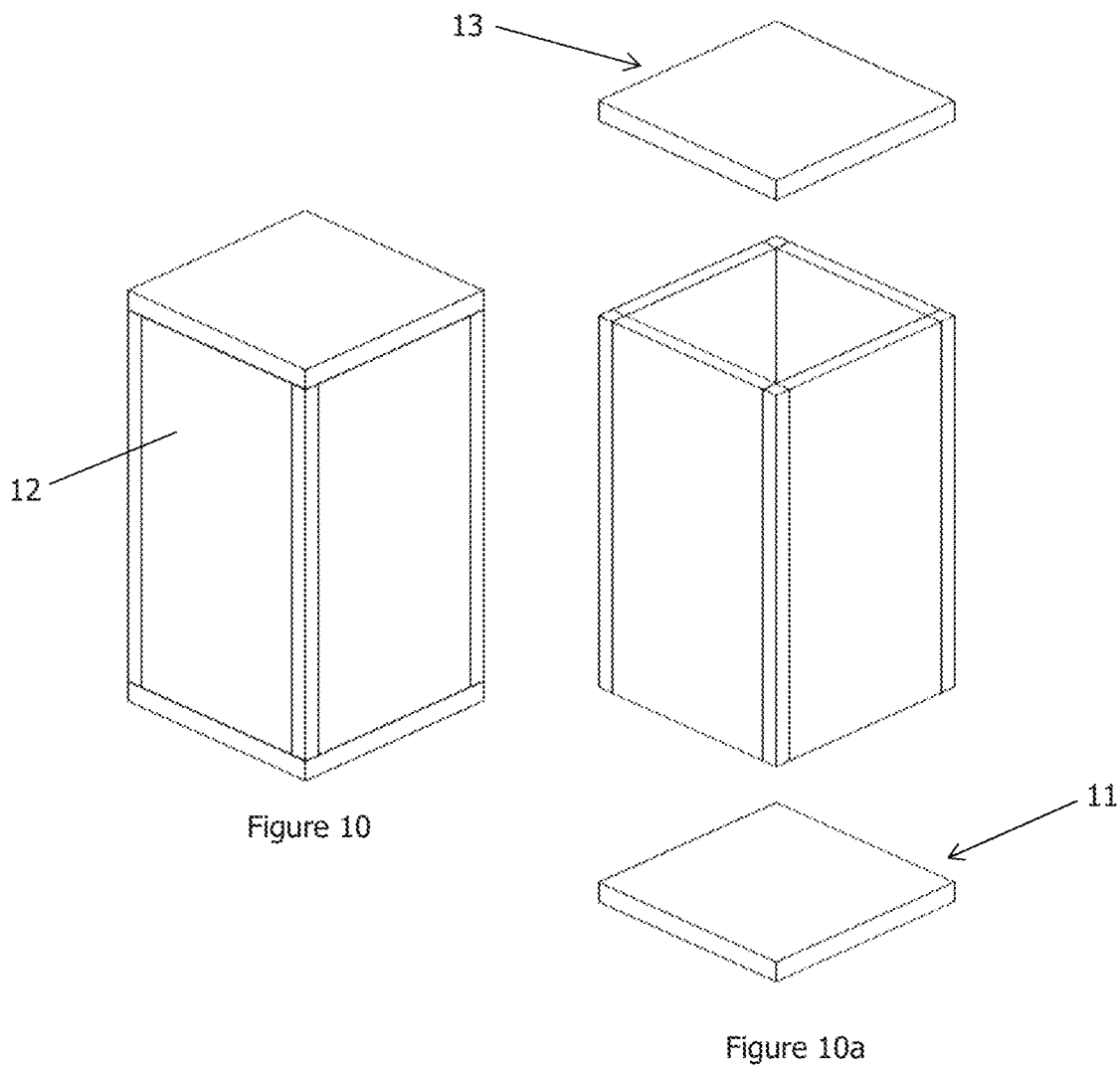
FIG. 10 is an illustrative perspective view of FIG. 1 as an example of a soundproof enclosure configured with a single modular ceiling unit and a single modular floor base, in accordance with certain embodiments of the present invention.
FIG. 10a is an illustrative perspective exploded view of FIG. 10.
Figure 10D:
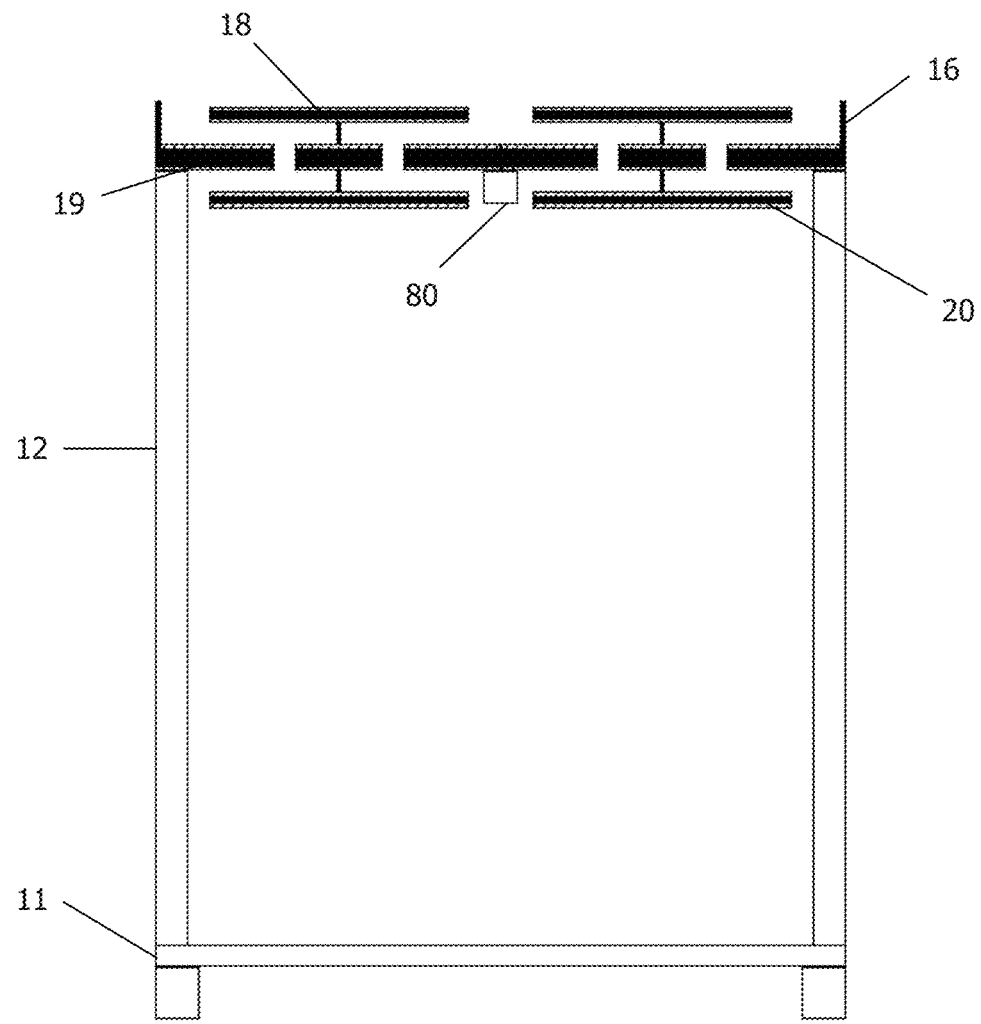
FIG. 10d is an illustrative cross-sectional view of FIG. 10b and showing the provision of multiple layers of sound insulating materials on the multilayer ceiling unit, in accordance with certain embodiments of the present invention.

In another embodiment of the invention, more than one floor plate 11b would be laid onto the floor base frame 11a to form a larger floor base unit 11 for a larger soundproof enclosure 10 as illustrated in FIGS. 10b and 10c. The base frame 11a may have an additional layer of rigid material to further strengthen its structure, as shown in FIGS. 14 to 14c, and FIGS. 15, 15a to 15c whereby structural strength is derived from the design of the base frame (not shown) similar to that of warehouse packaging pallets.

One or more layer(s) of flooring material (not shown) which can be a carpet layer and also a flooring underlay layer (not shown) which is a carpet underlay or additional sound insulating materials may be laid on top of floor plate 11b to improve the sound insulating and sound absorbing performance of the soundproof enclosure 10. In addition, one or more additional layer of rigid flooring material (not shown) may be disposed above the floor plate 11b.

Figure 14B:
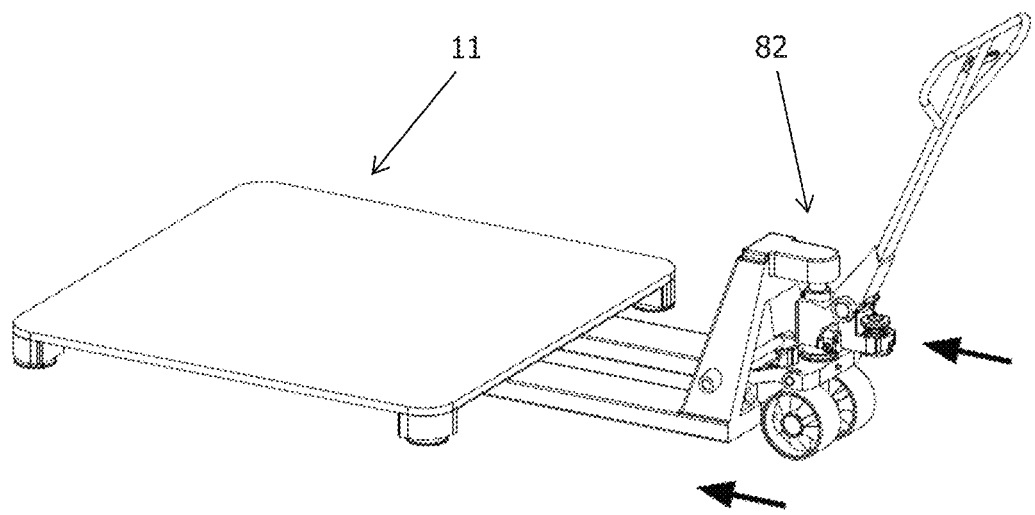
FIG. 14b is an illustration of FIG. 14 with the peripheral side covers removed showing the floor base plate supported at a level above the floor level sufficient for the insertion of a commercial hand pallet truck, in accordance with certain embodiments of the present invention.
Figure 14C:
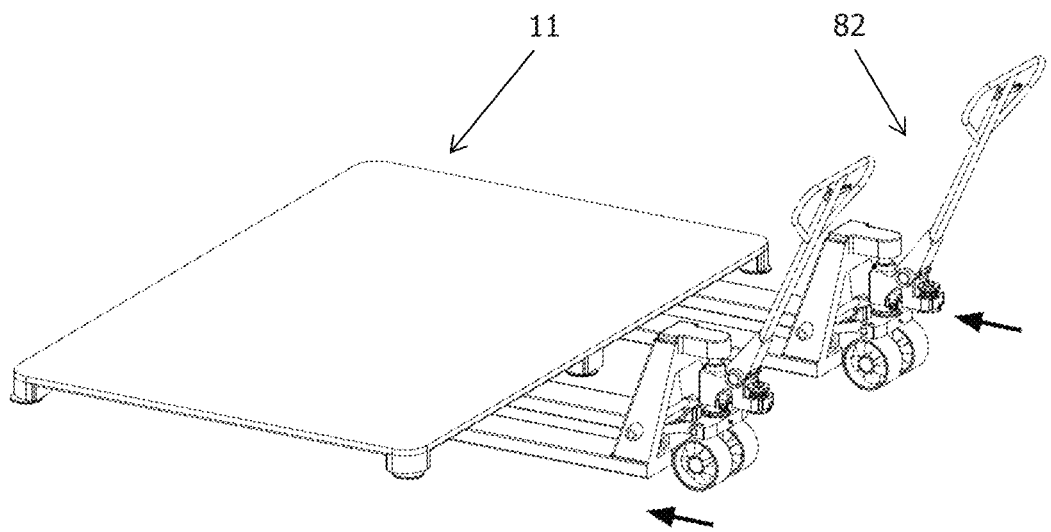
FIG. 14c is an illustrative example of a larger diameter version of FIG. 14 with the peripheral side covers removed showing a floor base plate which is structurally rigid, and a set of six feet securely fasten to the floor base plate elevating the floor base plate at a level above the floor level sufficient for the insertion of two commercial hand pallet trucks, and a screw type floor levelling guide attached to each of the foot, in accordance with certain embodiments of the present invention.

In an embodiment of the present invention, as illustrated in FIGS. 14 to 14c, the base frame 11a is constructed in structures similar to warehouse pallets for ease of relocation and movement by a hand pallet truck or a forklift vehicle. For a larger soundproof enclosure 10, more than one pallet truck may be inserted into below the base frame 11a after removing the optional peripheral side covers 11d as illustrated in FIG. 14a; and therefore, the soundproof enclosure 10 can be easily relocated or move about in whole without disassembly.

Figure 15:
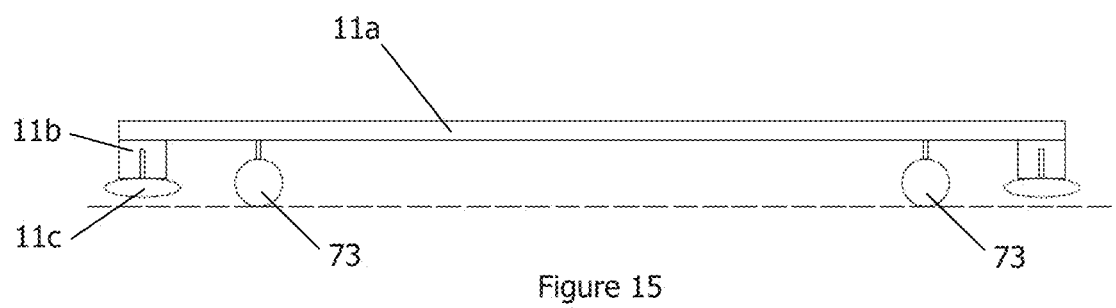
FIG. 15 is an illustrative front view of the floor base unit of an example of a floor base unit of a soundproof enclosure with the peripheral side covers removed showing a floor base plate, which is structurally rigid, having a set of four industrial grade castors attached to the floor base frame to allow the soundproof enclosure to be moved about easily by having a set four of feet securely fasten to the floor base frame at a height level above castors rolling level, in accordance with certain embodiments of the present invention.

In an embodiment of the invention, a plurality of castor wheels 73 are installed to the bottom surface of base frame 11a and a plurality of floor levellers 11c are installed and set at a height level that is above the roller level of the casters 73 as illustrated in FIG. 15, and hence the casters 73 are operational to allow to move the soundproof enclosure 10 easily, or to relocated easily in whole. Correspondingly, in this embodiment, the floor levellers 11c can be adjusted and set to a level that is below the height of the roller level as illustrated in FIG. 15a, and in this position, the soundproof enclosure 10 is securely rested onto the floor space desired.

Figure 15A:
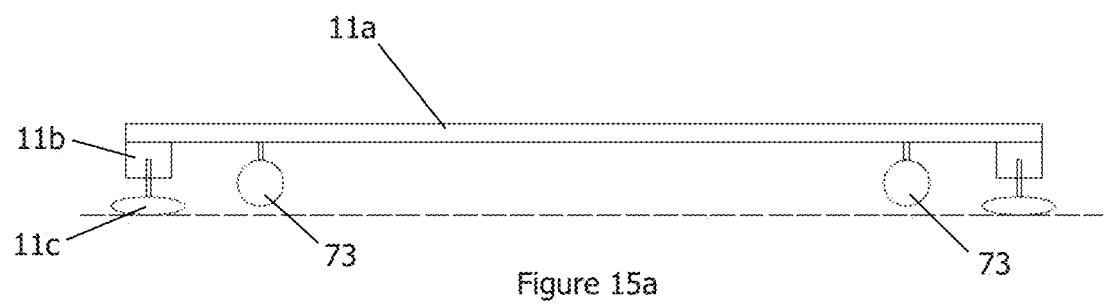
FIG. 15a is an illustration of FIG. 15 showing the floor base with the four levelling guides in a lowered position such that the floor base unit is raised to the extent that the set of casters can no longer touch the floor, and the floor base is securely resting on the floor space, in accordance with certain embodiments of the invention.
Figure 15B:
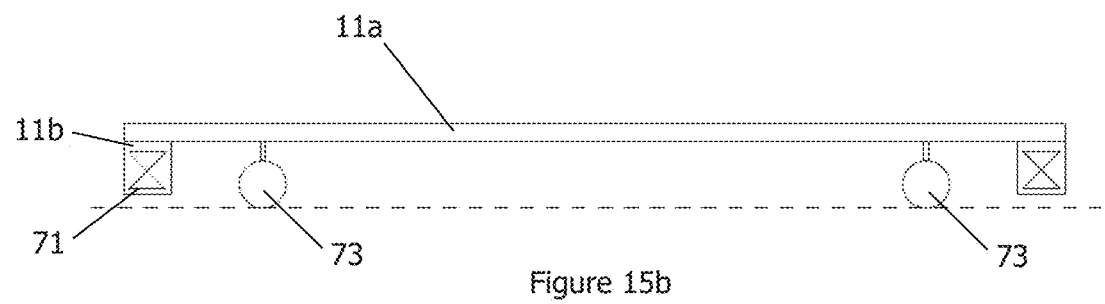
FIG. 15b is an illustrative front view of the floor base of an example of a floor base of a soundproof enclosure with the peripheral side covers removed showing a floor base plate, which is structurally rigid, having a set of four industrial grade castors attached to the floor base plate to allow the soundproof enclosure to be moved about easily, and having a set of four feet that incorporated mechanical or electro-mechanical device to adjust the height of each foot, in accordance with certain embodiments of the invention.
Figure 15C:
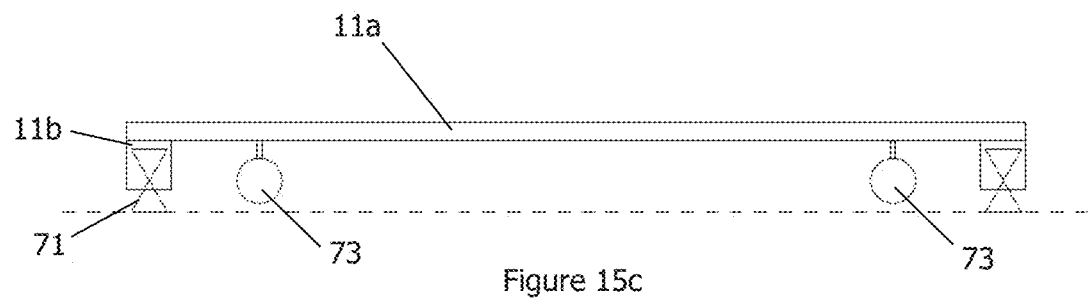
FIG. 15c is an illustration of FIG. 15b showing the floor base unit with the four levelling guides in the lowered position by mechanical or electro-mechanical devices, in accordance with certain embodiments of the invention.
Figure 15D:
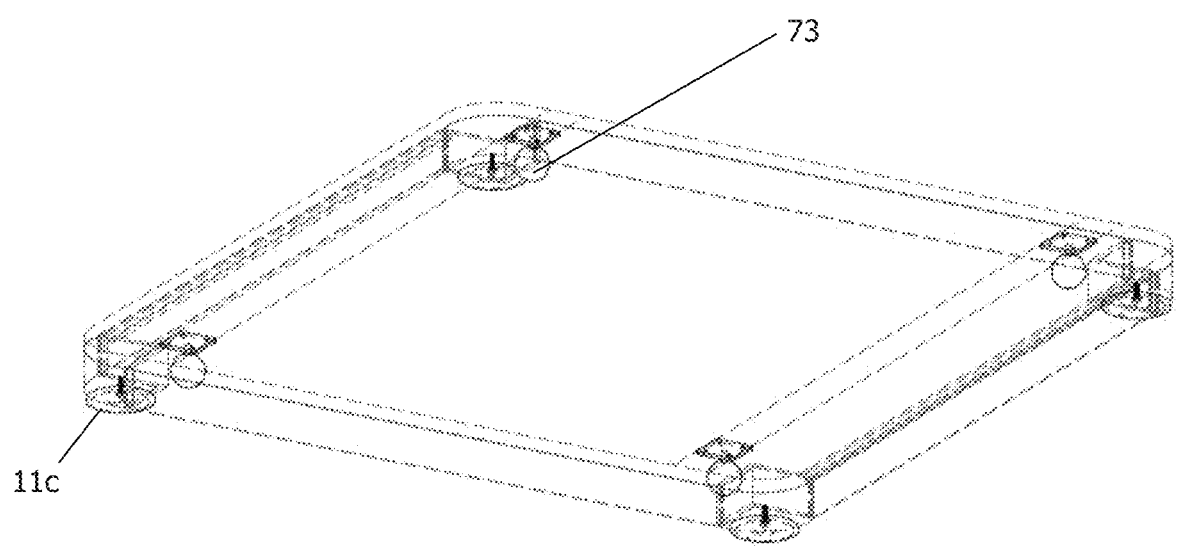
FIG. 15d is a see-through illustration of FIG. 15b showing the floor base unit with the four levelling guides of mechanical or electro-mechanical devices, and the installation of the set of casters, in accordance with certain embodiments of the invention.
Figure 15E:
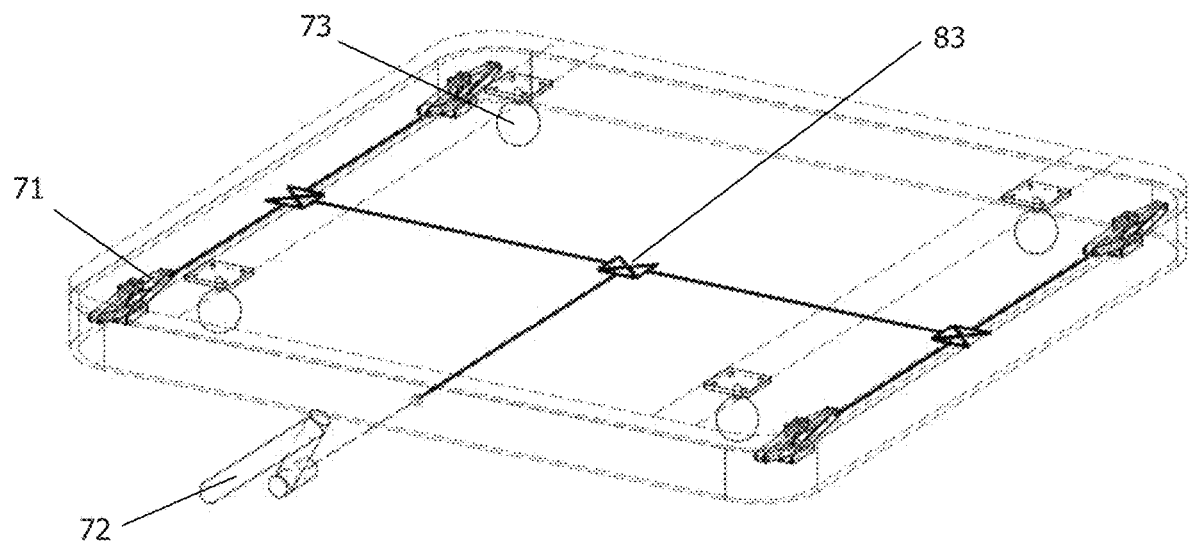
FIG. 15e is a see-through illustration of FIG. 15b showing the floor base unit with the four levelling guides of mechanical device similar to a car jack, and interconnected together by links and gears, in accordance with certain embodiments of the invention.
Figure 15F:
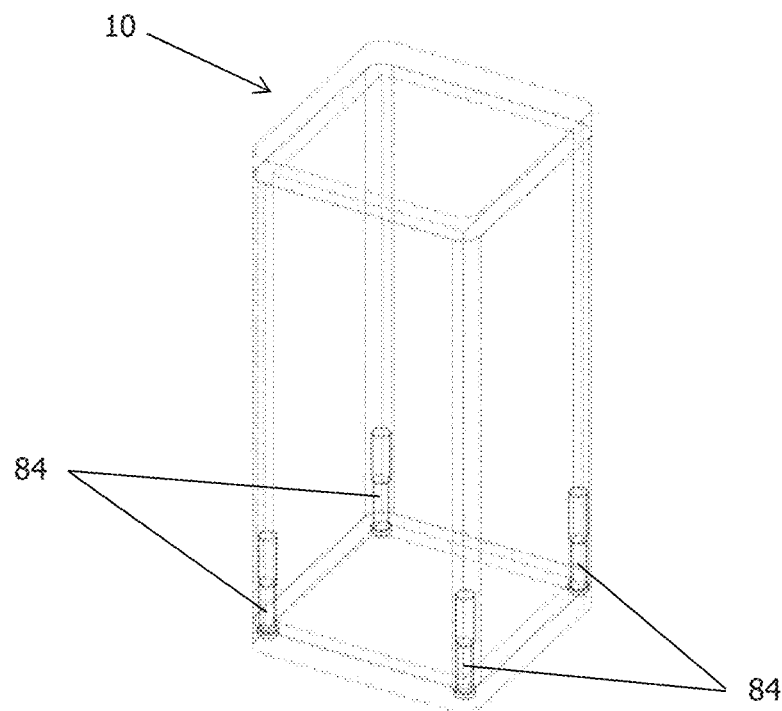
FIG. 15f is a see-thought illustration of FIG. 1 showing the floor base unit with the four levelling guides of electro-mechanical actuator similar to a piston and installed into the four poles of a soundproof enclosure, in accordance with certain embodiments of the invention.
Figure 15G:
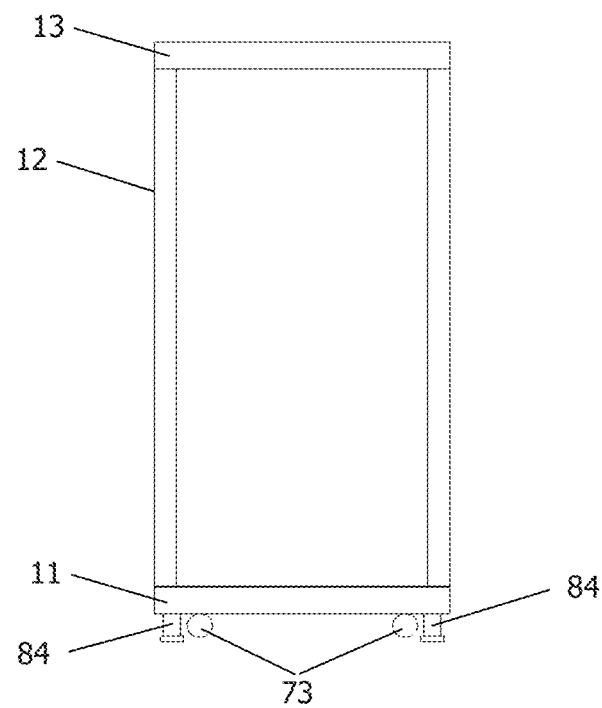
FIG. 15g is a see-thought front view illustration of FIG. 15f showing the four levelling guides of electro-mechanical actuator in the lowered position such that the floor base is raised so that the set of casters can no longer touch the floor, in accordance with certain embodiments of the invention.

In yet another embodiment of the invention, a plurality of mechanical or electro-mechanical levelling devices 11d such as a car jack lift or a "LINAK base lift" actuator are installed on the bottom surface the base frame 11a; and serves the same purpose as the floor levelling studs 11c demonstrated in FIGS. 15 and 15a, as illustrated in FIGS. 15d and 15e. In addition, cylindrical electro-mechanical actuators can also be installed for the same embodiment performance herein described, as illustrated in FIGS. 15f and 15g.

In an embodiment of the invention, a ceiling unit 13 is constructed by three layers of ceiling panels 17 comprising of an upper covering layer 18 of rigid material raised above the intermediate core layer 19 of rigid material by one or more brackets 28 that divide(s) the in-between space cavity into 2 cavities to form the air inflow and air outflow passages 24 for air circulation; and similarly, a lower suspended layer 20 of rigid material is releasably secured by bracket 27 means to the intermediate core layer by one or more brackets that divide/s the in-between space cavity into 2 cavities that forms the inflow and outflow spaces for air circulation. The intermediate core layer has one or more aperture(s) 42 of varying shapes to allow air to pass through from an upper air flow passage 24 to a lower air flow passage 37, as illustrated in FIGS. 7 to 7b.

In an embodiment of the invention, the brackets 28 and 27 topologically created the various required upper air flow passages 24 and lower air flow passages 37 for air circulation without the need to construct additional materials such as air duct, air hose or air channel, as illustrated by FIG. 7b.

Figure 7C:
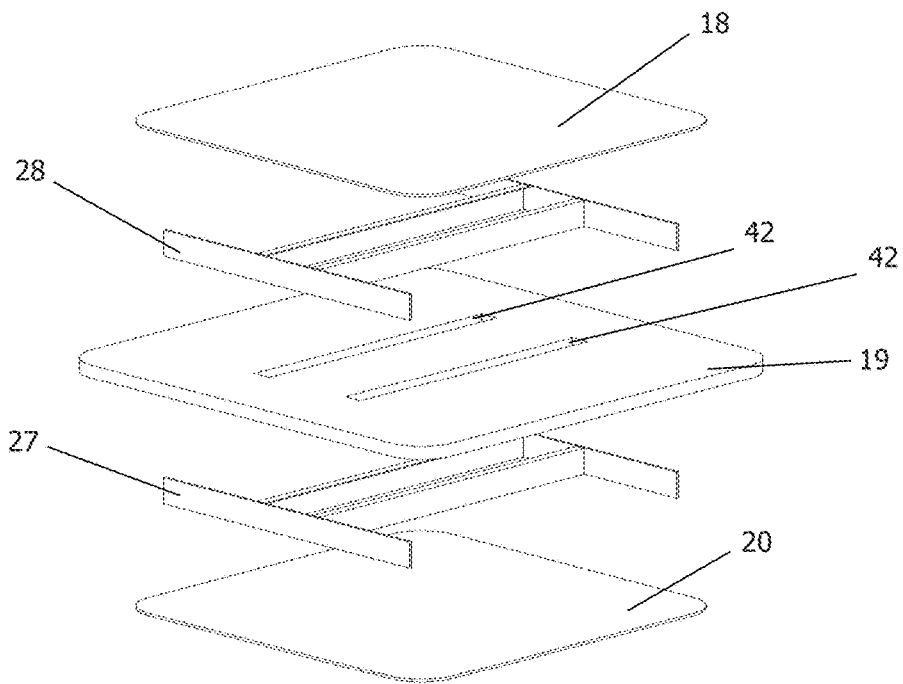
FIG. 7c is an exploded view of FIG. 7 showing another example of the ceiling brackets that assemble an upper covering layer to the intermediate core layer and the intermediate core layer to a lower suspended layer of the ceiling unit in accordance with certain embodiments of the present invention.
Figure 7D:
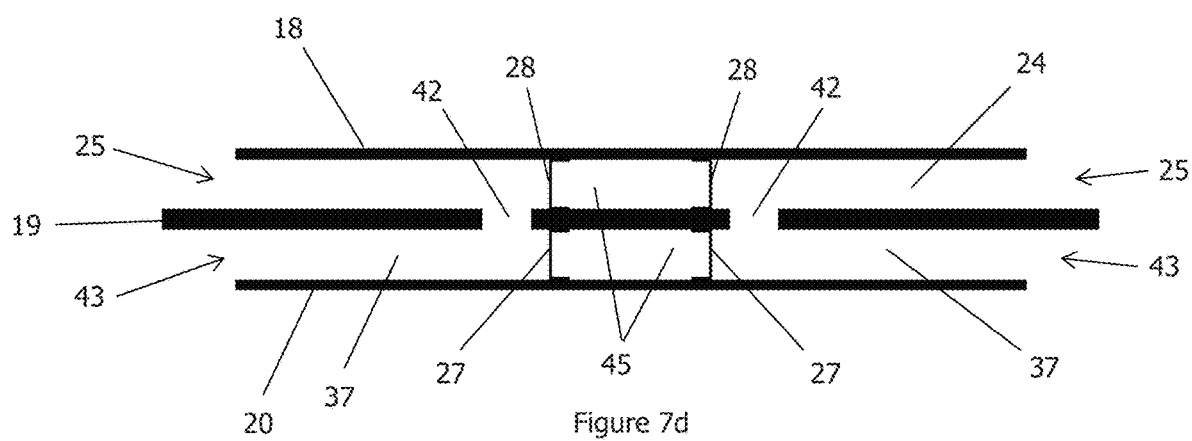
FIG. 7d is an illustrative cross-sectional view of the ceiling unit of FIG. 7c showing two central cavities formed in-between and within the center of the ceiling brackets structure, in accordance with certain embodiments of the present invention.
Figure 7E:
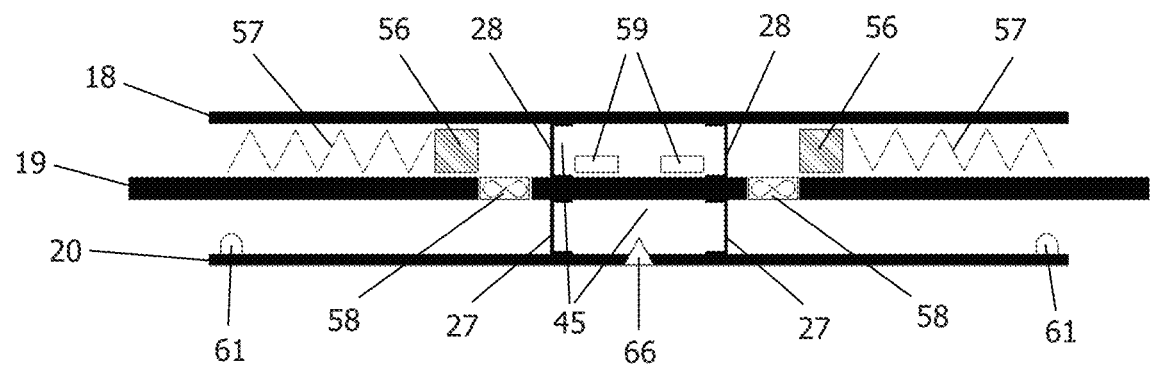
FIG. 7e is an illustrative cross-sectional view of the ceiling unit of FIG. 7c showing an example of the sufficient capacity of the two cavities to form the two air flow passages above the intermediate core layer to comprise an air filter and a sound silencer in each of the cavities of the two air flow passages, and showing an example of an air circulation fan installed within each of the two air flow apertures in the intermediate core layer of round shape to propel the air intake and the air exhaust, and also showing the central cavity for electrical components such as electrical connectors and step-down transformers for the implements installed within the ceiling unit and, and for a light housing for central lighting and a strip of LED light all around the perimeter of the lower suspended ceiling layer for ambient lighting within the interiors of a soundproof enclosure, in accordance with certain embodiments of the present invention.
Figure 7F:
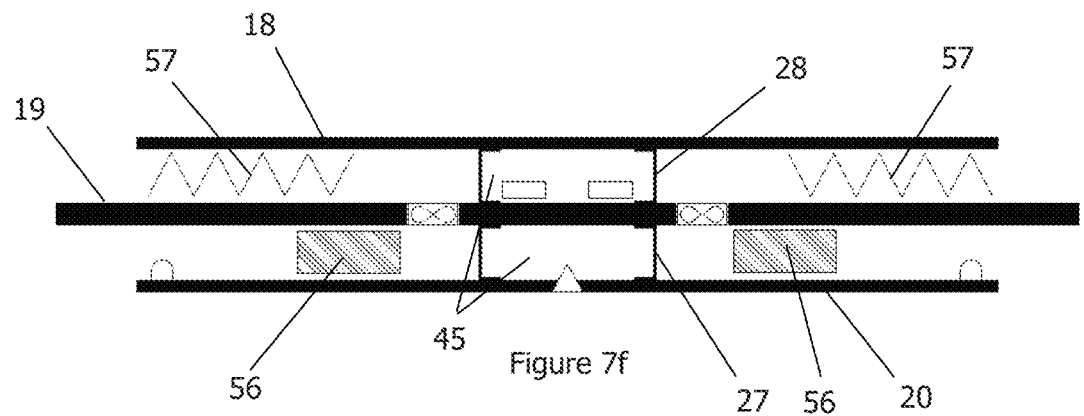
FIG. 7f is an illustrative cross sectional view of the ceiling unit of FIG. 7c showing another example of the sufficient capacity of the two cavities of the two air flow passages above the intermediate core layer to comprise a sound silencer in each of the cavities of the two air flow passages, and showing an example of the sufficient capacity of the two cavities of the two air flow passages below the intermediate core layer to comprise an air filter in each of the cavity of the two air passages, and showing an example of an air circulation fan installed within each of the two air flow apertures in the intermediate core layer of round rectangular shape to propel the air intake and the air exhaust, and also showing the central cavity for electrical components such as connectors and step-down transformers for the implements installed within the ceiling unit and, and for a light housing for central lighting and a strip of LED light all around the perimeter of the lower suspended ceiling layer for ambient lighting within the interiors of a soundproof enclosure, in accordance with certain embodiments of the present invention.
Figure 7G:
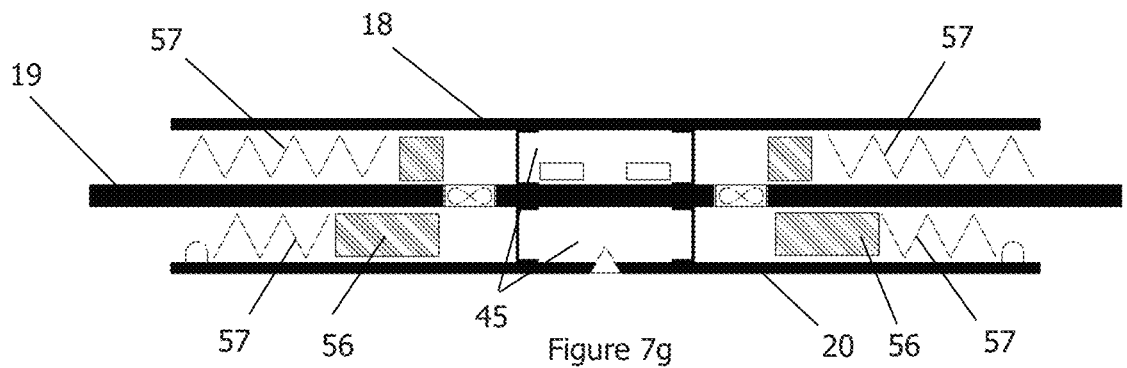
FIG. 7g is an illustrative cross sectional view of the ceiling unit of FIG. 7c showing yet another example of the sufficient capacity of the four cavities of the four air flow passages above and below the intermediate core layer to comprise an air filter and a sound silencer in each of the cavities of the four air flow passages, and showing an example of an air circulation fan installed within each of the two air flow apertures in the intermediate core layer of round rectangular shape to propel the air intake and the air exhaust, and also showing the central cavity for electrical components such as connectors and step-down transformers for the implements installed within the ceiling unit and, and for a light housing for central lighting and a strip of LED light all around the perimeter of the lower suspended ceiling layer for ambient lighting within the interiors of a soundproof enclosure, in accordance with certain embodiments of the present invention.
Figure 7H:
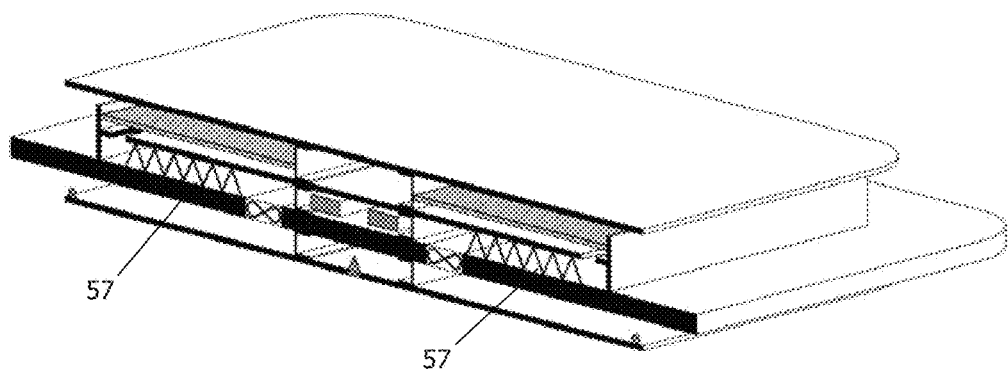
FIG. 7h is an illustrative perspective cross-sectional view of the ceiling unit of FIG. 7e with the air filter installed as an additional layer below the upper covering layer, that protects the air filter from the exterior environmental debris or weather exposure, to achieve a larger surface area for more efficient air flow, and showing yet another additional layer below the air filter layer to guide the air flow to the extended surfaces of the large surface air filter, in accordance with certain embodiments of the present invention.
Figure 7I:
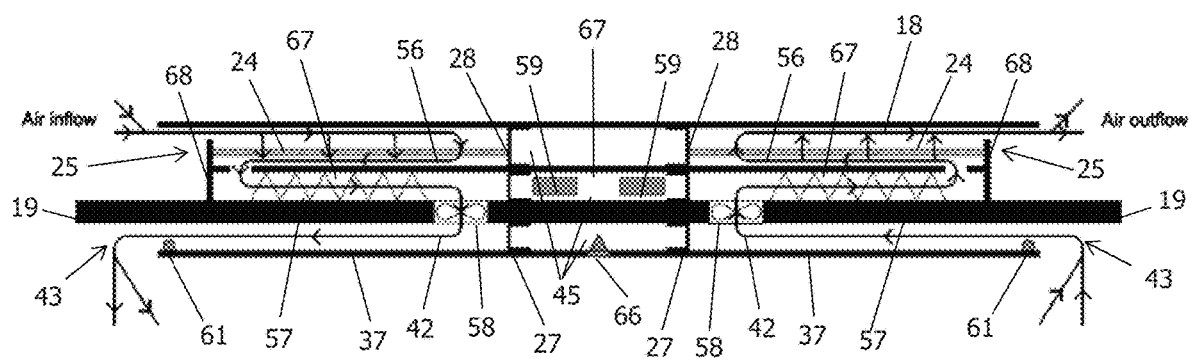
FIG. 7i is a cross-sectional front view of the ceiling unit of FIG. 7h illustrating the air flow through the air filter layer interposed below the top most layer by providing an example of a set of holes near the two opposing edges on the additional below layer that is above the intermediate core layer.
Figure 7J:
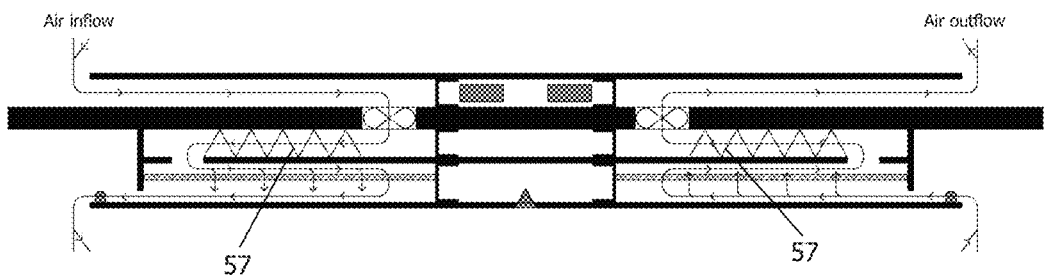
FIG. 7j is an illustrative cross-sectional view of the ceiling unit of FIG. 7h showing another example of the various implements that are mirror imaged to the layers below the intermediate core layer instead, in accordance with certain embodiments of the present invention.
Figure 7K:
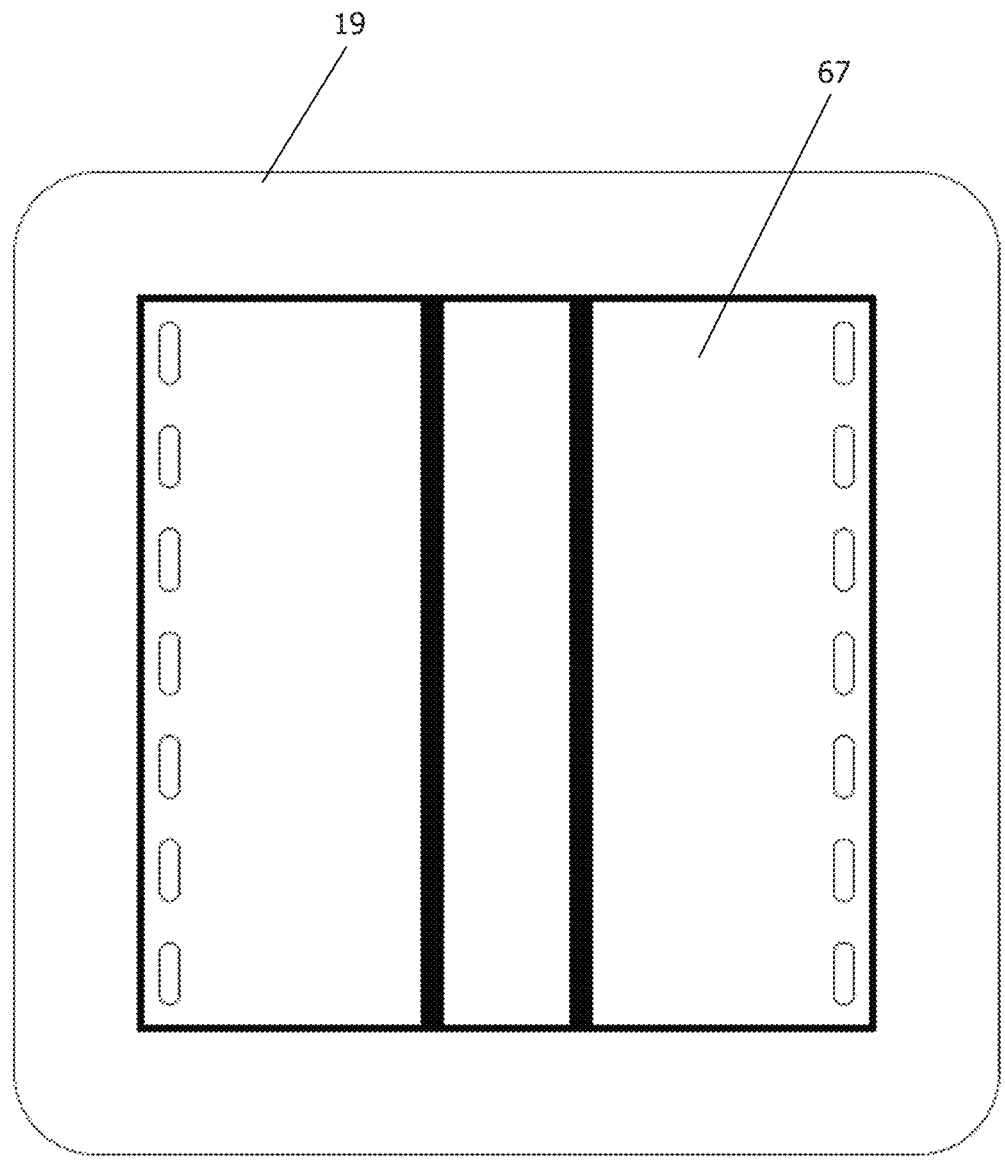
FIG. 7k is an illustrative top view of FIG. 7h showing the layer below the air filter layer.
Figure 7L:
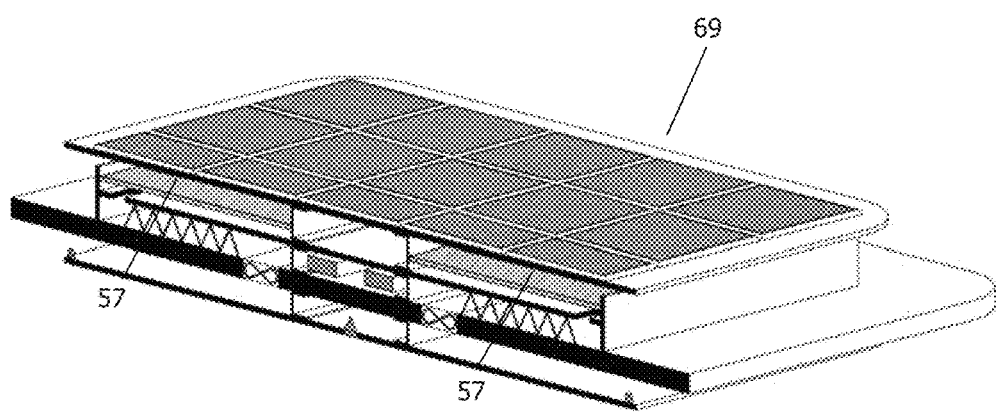
FIG. 7l is an illustrative 3-dimensional view of the ceiling unit of FIG. 7h showing yet another example of the multilayer ceiling unit with a set of electricity generating solar cells provided on top of the top most layer, in accordance with certain embodiments of the present invention.
Figure 7M:
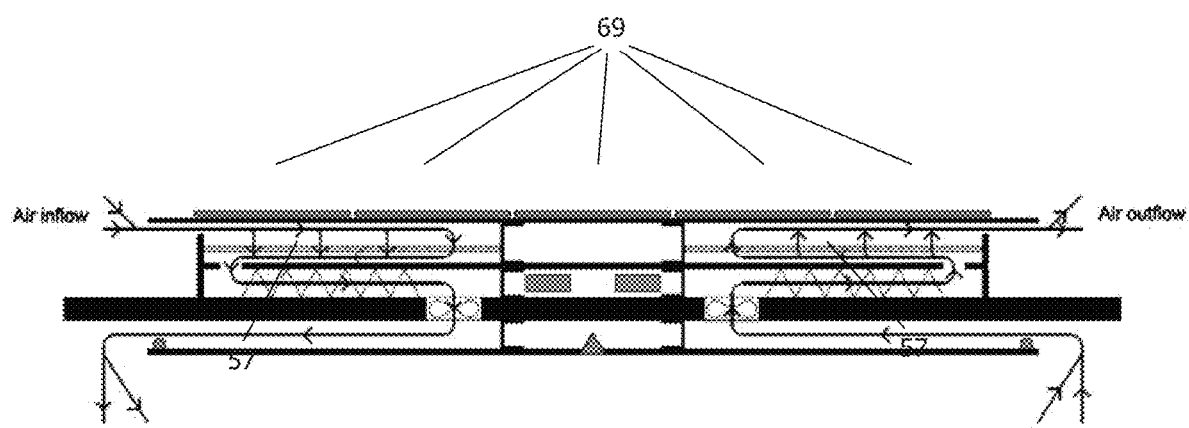
FIG. 7m is an illustrative front cross-sectional view of the ceiling unit of FIG. 7l showing the air flow directions through the multilayer ceiling unit.
Figure 7N:
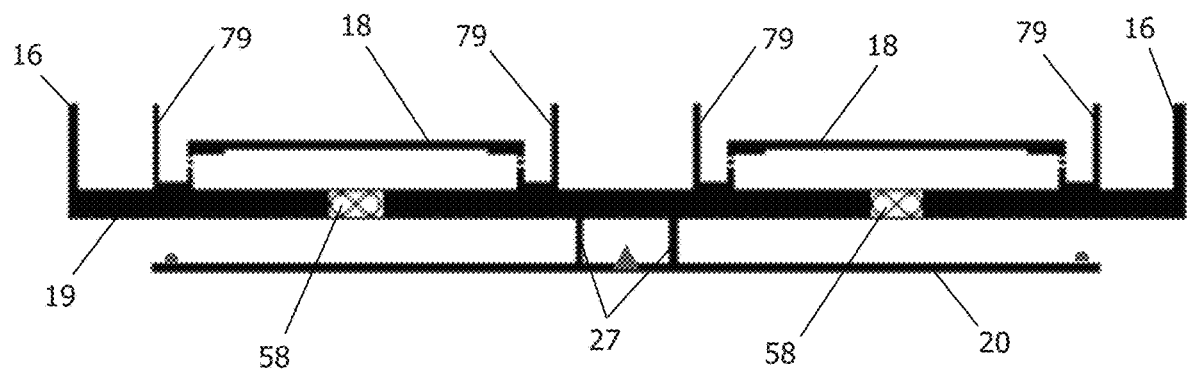
FIG. 7n is an illustrative cross-sectional view of the ceiling unit showing multiple upper covering layers and additional vertical wall members constructed to form additional sound barriers, in accordance with certain embodiments of the present invention.
Figure 7O:
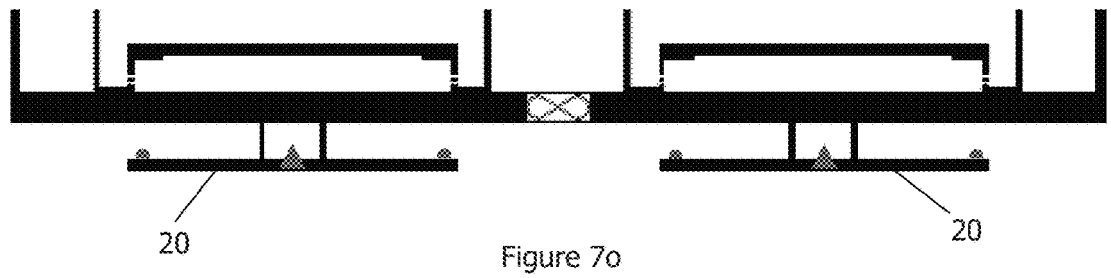
FIG. 7o is an illustrative cross-sectional view of the ceiling unit showing the ceiling unit formed with multiple lower suspended layers.
Figure 7P:
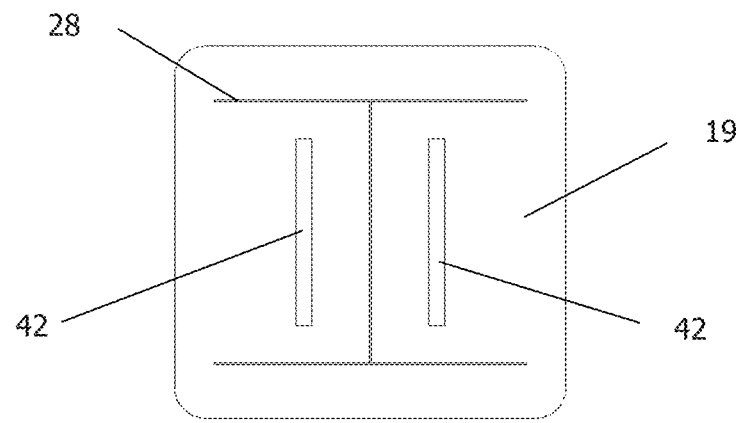
FIG. 7p is a top view of the intermediate core layer of the ceiling unit showing an example of an air flow aperture of long rectangular shape in each of the air passages in the intermediate core layer for the air intake and the air exhaust by mechanical or natural convectional means, in accordance with certain embodiments of the present invention.
Figure 7Q:
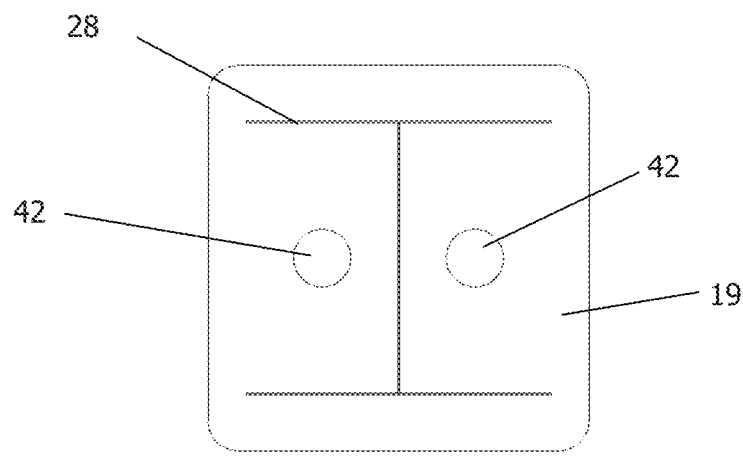
FIG. 7q is a top view of the intermediate core layer of the ceiling unit showing an example of an air flow aperture of round shape in each of the air passages in the intermediate core layer for the air intake and the air exhaust by mechanical or natural convectional means, in accordance with certain embodiments of the present invention.
Figure 7R:
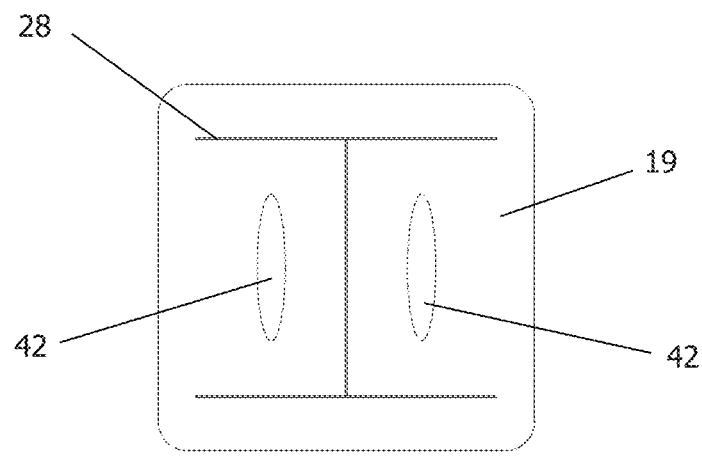
FIG. 7r is a top view of the intermediate core layer of the ceiling unit showing an example of an air flow aperture of oval shape in each of the air passages in the intermediate core layer for the air intake and the air exhaust by mechanical or natural convectional means, in accordance with certain embodiments of the present invention.

In another embodiment of the invention, the multilayer decoupling ceiling unit 13 comprises a plurality of ceiling layers which includes an upper covering layer 18, an intermediate core layer 19 and a lower suspended layer 20 as shown in FIGS. 7 to 7o. Each ceiling layer is vertically spaced apart with one another. The lower suspended layer 20 comprises panel of rigid material which is attached to the intermediate core layer 19 with bracket means 27 to suspend the lower suspended layer 20 below the intermediate core layer 19 for defining a bottom horizontal air passage 37. The upper covering layer 18 comprises a metal plate member which is disposed above and releasably secured to the intermediate core layer 19 with bracket means 28 to raise and suspend the upper covering layer 18 above the intermediate core layer 19 for defining an upper air flow passage 24 as shown in FIGS. 7b and 7d.

In an embodiment of the invention, the construction method of the 3 layers of the ceiling unit 13, the brackets 28 and 27 may contain cavities 45 in-between within the bracket flanges to form an additional third cavity to allow space to fit devices such as electrical connectors, lights, light electrical adapters or step-down electrical transformers as illustrated in FIGS. 7c and 7d.

In an embodiment of the invention, one or more electrical fan or mechanical air-circulation device 58 is installed at the aperture 42 and therefore providing mechanical air circulation in the sound proof enclosure 10 as illustrated in FIG. 7e to 7o.

In embodiment of the invention, one or more air filter of any combination of air cleaning nature, including filter cloth, Hepa or ultraviolent light, is installed within the upper and lower air flow passages 24 and 37 and therefore providing filtered air flow into or exiting the sound proof enclosure 10, as illustrated in FIGS. 7e to 7o.

In an embodiment of the invention, one or more porous sound-silencing muffler 57 or air filter 56 is fitted into the two upper air flow passages 24 and the two lower air flow passages 37 of the ceiling unit 13 to insulate the sound going into or exiting the sound proof enclosure 10 and simultaneously allowing natural convection air flow between the interior and exterior air without having the need for mechanical air circulation.

Figure 7S:
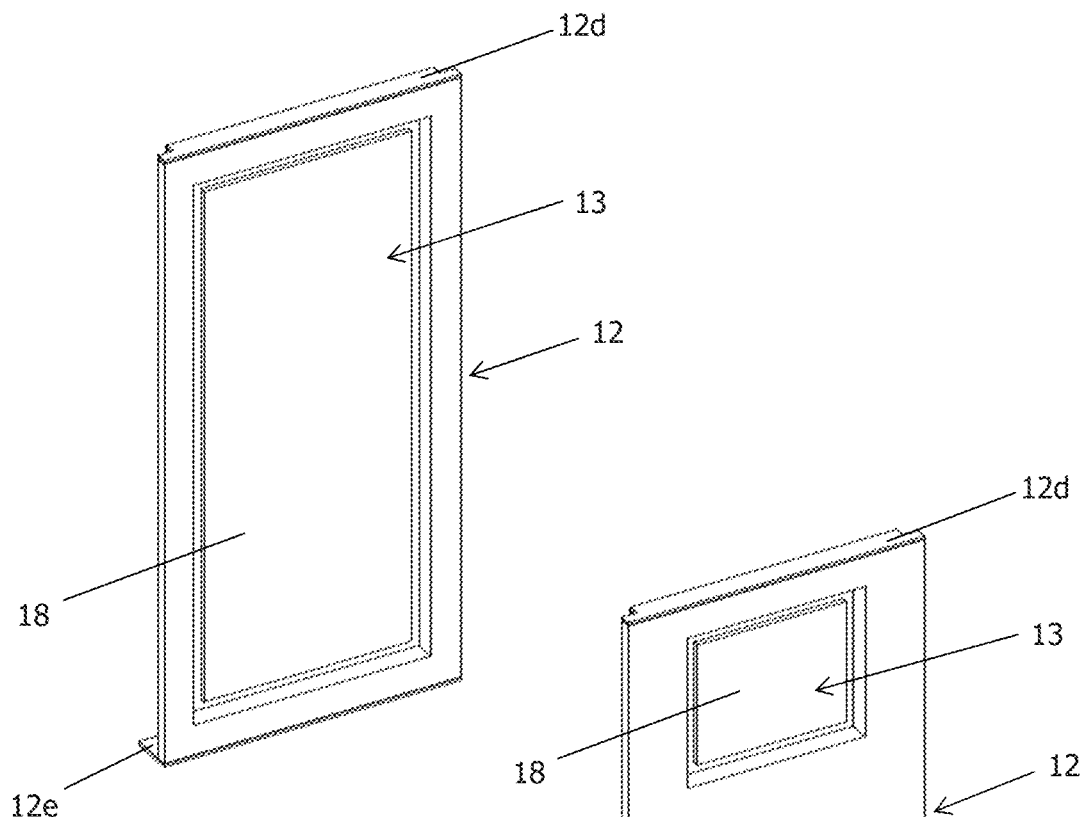
FIG. 7s is an illustrative 3-dimensional view of the acoustical ceiling unit fitted as a whole of an acoustical wall panel to perform all the functions with all the same features and advantages of the embodiments of the ceiling unit invention, in accordance with certain embodiments of the present invention.
Figure 7T:
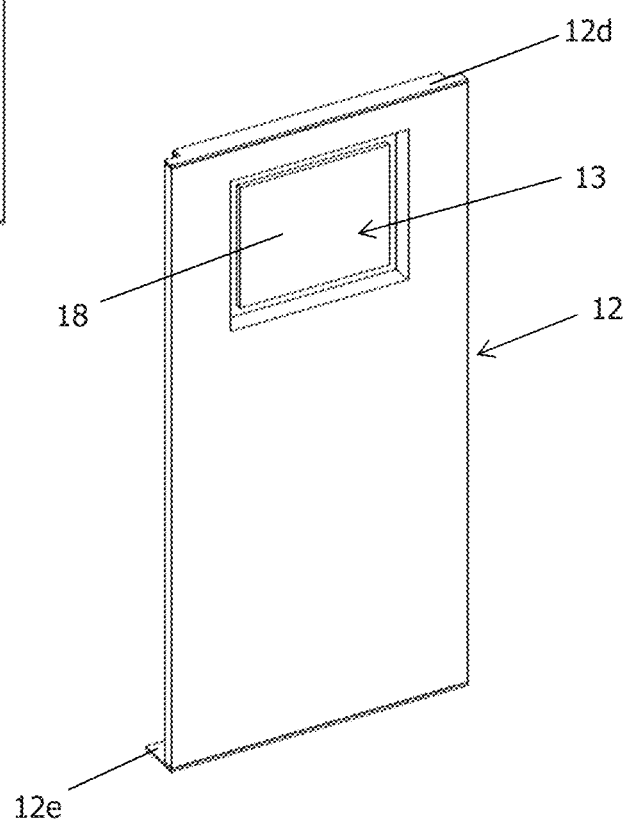
FIG. 7t is an illustrative 3-dimensional view of the acoustical ceiling unit fitted at a portion of an acoustical wall panel to perform all the functions with all the same features and advantages of the embodiments of the ceiling unit invention, in accordance with certain embodiments of the present invention.
Figure 7U:
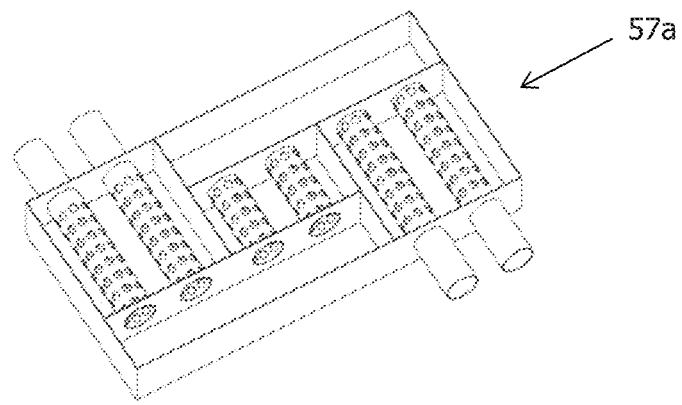
FIG. 7u is an illustrative 3 dimensional view of a multiple chamber sound muffler of a topology that can fit into the spaces in-between the multilayer ceiling unit, in accordance to certain embodiments of the present invention.

In an embodiment of the invention, one or more sound muffler 57 as shown in FIG. 7u is installed in the upper and lower air flow passages 24 and 37, as illustrated in FIG. 7g.

In an embodiment of the invention, one or more air filter 56 is installed in air flow passages 24 and 37, as illustrated in FIG. 7g.

In another embodiment of the invention, the sound muffler 57 and the air filter 56 can be installed in a variety of ways. The combinations and arrangements are not in any way limited by the inherent design of the multilayer ceiling unit air flow passages 24 and 37. By way of examples, FIG. 7e illustrated one combination and arrangement of the implements sound mufflers 57 and an air filter 56 installed in the ceiling unit 13. In this embodiment, examples of other combination and arrangement of the implements of sound mufflers 57 and air filters 56 are further illustrated in FIGS. 7e, 7f, 7g, 7i, 7j, 7m, etc.

The conventional air circulation method is deployed by the air circulation device installed on the intermediate core layer 19, as shown in FIG. 7e. In an embodiment of the invention, the air circulation device(s) 58 can be installed within the air flow passages 24 and 37.

In an embodiment of the invention, additional layers 17 can be deployed, such as large surface air filters 56 as illustrated in FIG. 7A. In this embodiment of the invention, five ceiling layers 17 are deployed to achieve the air flow and air circulation functions as illustrated in FIGS. 7h, 7i, and 7j. The ability to achieve such a high level of performance such deployment of large surface filters in a multilayer ceiling unit 13 of relatively small thickness is an embodiment of this invention.

In an embodiment of the invention, the additional layer 67 added the surface area required for installation of large surface air filters 56, as illustrated in FIGS. 7i and 7j.

In an embodiment of the invention, a multilayer ceiling unit 13 comprises of one or more multi-chamber sound muffler 57a, as shown in FIG. 7u, installed within the air flow passages 24 and 37.

Figure 7V:
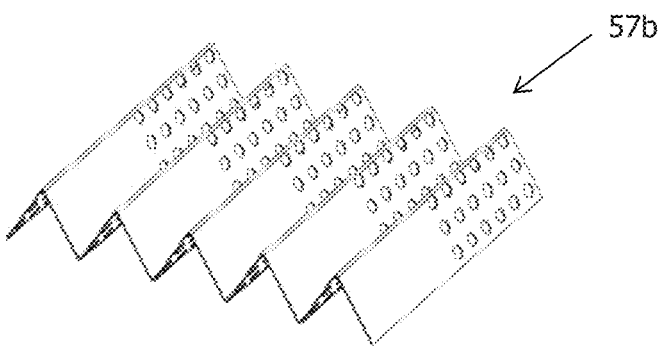
FIG. 7v is an illustrative 3 dimensional view of a multiple vane high porosity sound muffler of a topology that can fit into the spaces in-between the multilayer ceiling unit, in accordance to certain embodiments of the present invention.
Figure 7W:
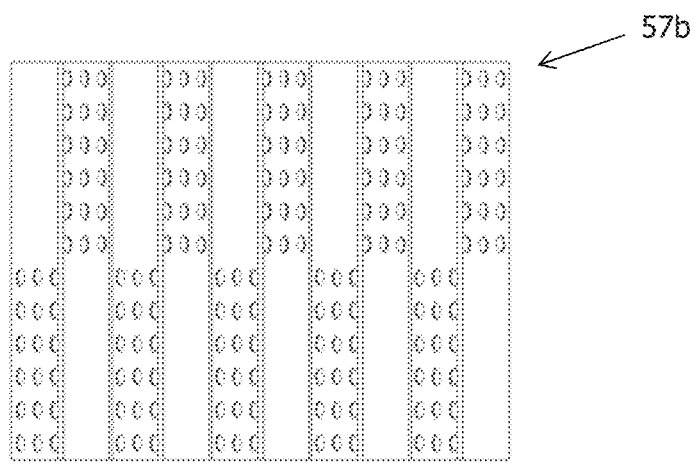
FIG. 7w is the top view of FIG. 7v.

In an embodiment of the invention, an example of a high porosity sound muffler design is shown on FIG. 7v.

In an embodiment of the invention, the examples of sound mufflers 57, such as 57a and 57b, may be deployed on the ceiling, walls, or floors of any enclosure requiring air circulation of external fresh air and soundproofing features, such as soundproof enclosure 10 or elevator cabins, etc.

In an embodiment of the invention, a multilayer ceiling unit 13 comprises of solar cells on upper covering layer 18 to provide electrical requirements to lights, air circulation, communication equipment within a soundproof enclosure 10.

In an embodiment of the invention, a multilayer ceiling unit 13 comprises of one or more high porosity sound muffler 57b, as shown in FIG. 7v, installed within the air flow passages 24 and 37.

Figure 8:
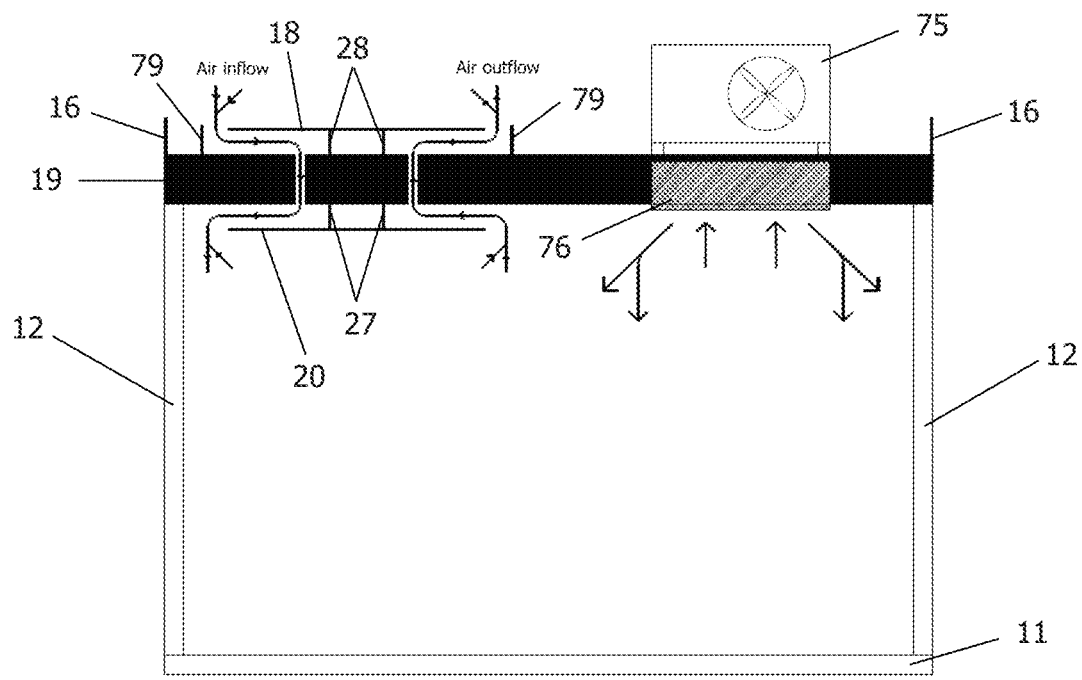
FIG. 8 is an illustrative cross-sectional view of an example of a multilayer ceiling unit with larger thickness of the intermediate core layer to install an indoor blower unit of a commercial split unit air conditioner system on the ceiling unit and an outdoor heat-exchange unit disposed on top of the intermediate core layer, in accordance with certain embodiments of this present invention.
Figure 8A:
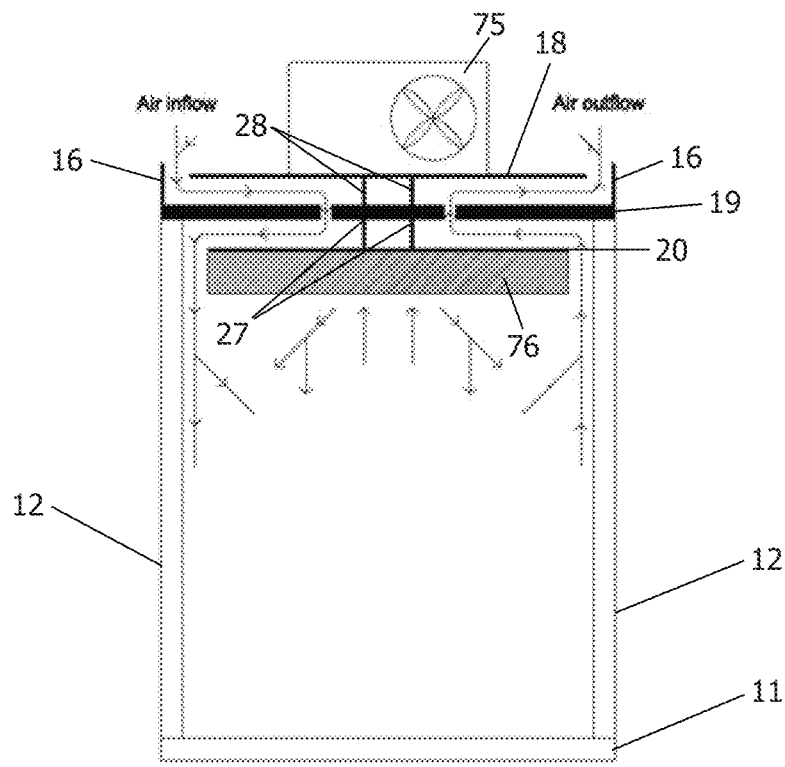
FIG. 8a is an illustrative cross-sectional side view showing a multilayer ceiling unit to provide for a visually neat installation of larger thickness of the lower suspended ceiling layer accommodating the an indoor blower unit of a commercial split unit air conditioner system on the ceiling unit and an outdoor heat exchange unit disposed on top of the upper covering layer above the intermediate core layer, in accordance with certain embodiments of this present invention.

In an embodiment of the invention, the top covering layer 18 and the intermediate core layer 19 provides structurally protection from dust, debris, or rain in outdoor or indoor conditions for the devices such as electrical connectors, lights, light electrical adapters, step-down electrical transformers, air-filters, porous sound-silencers, sound mufflers or parts or whole of commercial air-conditioning systems, and also provides structurally protection to the interiors of the sound proof enclosure 10 as illustrated in FIGS. 7 to 7o, 8, 8a, and more particularly illustrated FIG. 1 and FIG. 8a.

In an embodiment of the invention, the ceiling unit 13 is fitted as a part or a whole of an acoustical wall panel 12, and thereby providing that acoustical wall panel 12 to be able to circulate and filter air and has sound impedance, and all the features of the ceiling unit 13 embodiments; these features being suitable for construction of a soundproof enclosure 10, as illustrated in FIGS. 7s and 7t.

Figure 9:
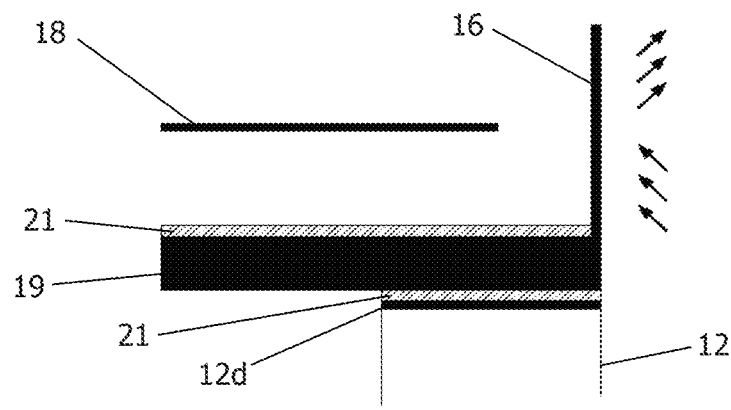
FIG. 9 is an illustrative partial side cross-sectional view of a ceiling unit showing a peripheral vertical wall which acts as a aesthetic finish, a protection wall against external debris, and a sound barrier by being installed at an appropriate distance to the opening of the exterior air flow passage, in accordance with certain embodiments of this present invention.
Figure 9A:
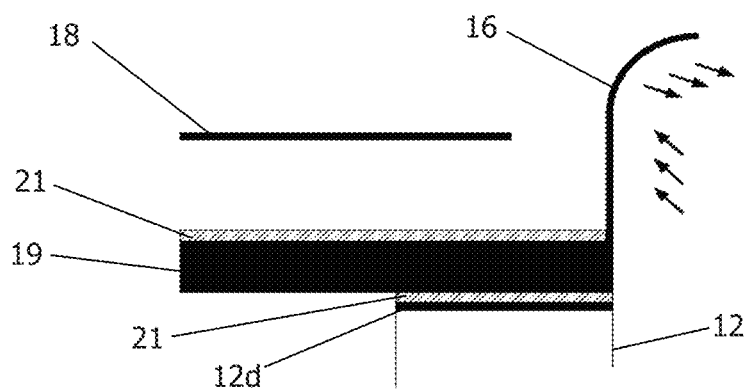
FIG. 9a is an illustrative partial side view of a ceiling unit FIG. 9 showing an example peripheral vertical wall acting as a sound barrier curved outward to deflect sound waves originating mostly from areas around the human height areas, in accordance with certain embodiments of this present invention.
Figure 9B:
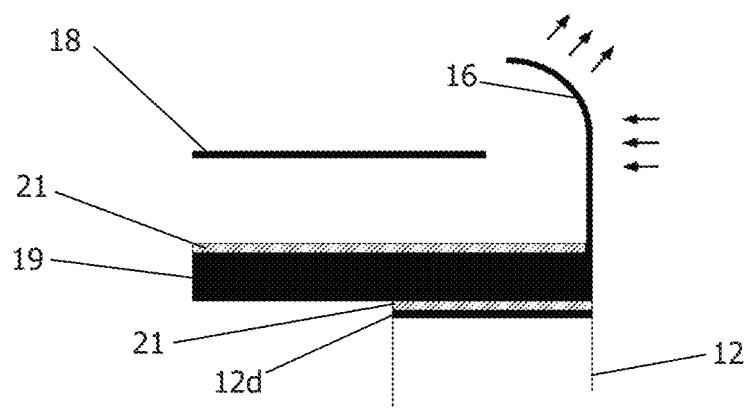
FIG. 9b is an illustrative partial side view of a ceiling unit FIG. 9 showing an example peripheral vertical wall acting as a sound barrier curved inward to deflect sound waves originating the external environment, in accordance with certain embodiments of this present invention.
Figures 9C, 9D:
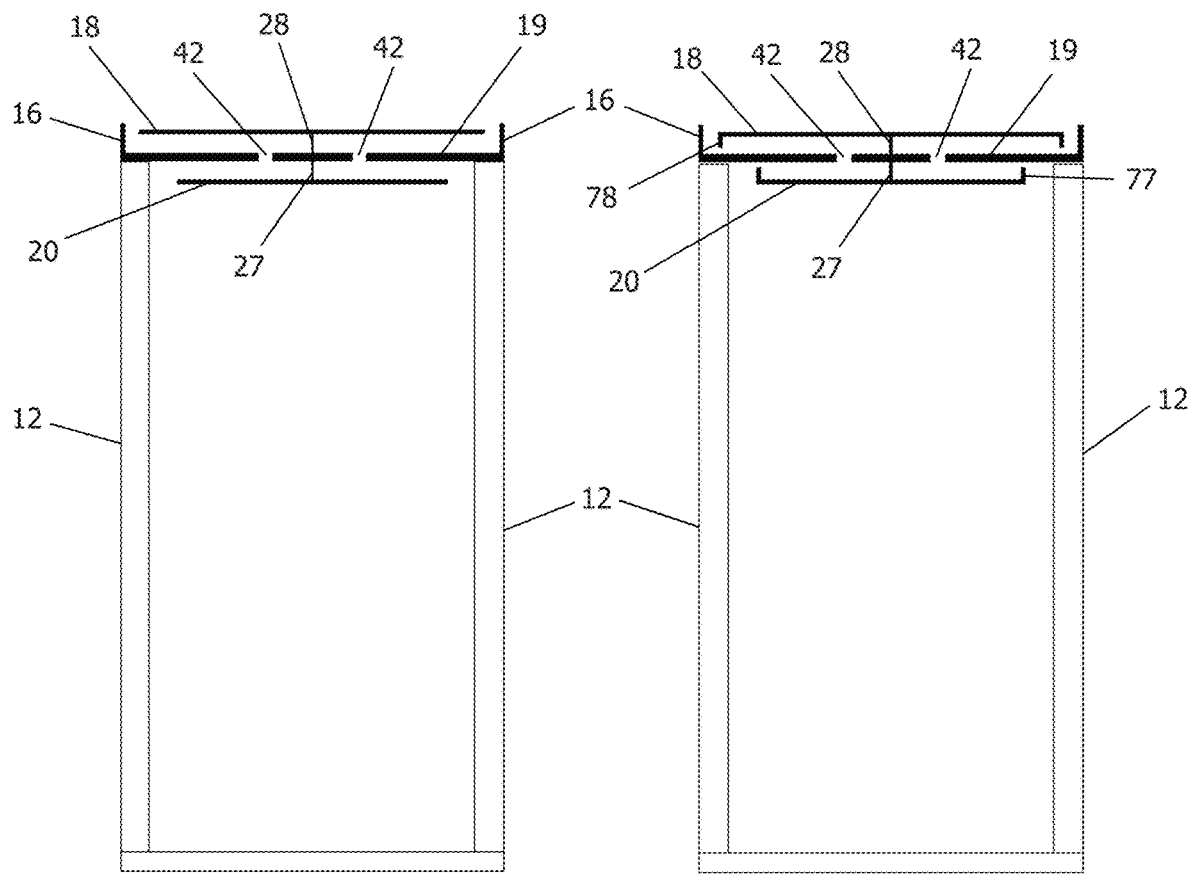
FIG. 9c is an illustrative cross-sectional view of FIG. 1 showing the example of ceiling unit in FIG. 9 with sound barrier as implemented in a soundproof enclosure, in accordance with certain embodiments of this present invention.
FIG. 9d is an illustrative cross-sectional view of FIG. 1 showing the example of ceiling unit in FIG. 9 with sound barrier as implemented in a soundproof enclosure and includes an illustration of an example of improvement to the sound barrier peripheral wall performance by providing an additional set of lips bended downwards from the upper covering layer, in accordance with certain embodiments of the present invention.
Figures 9E, 9F:
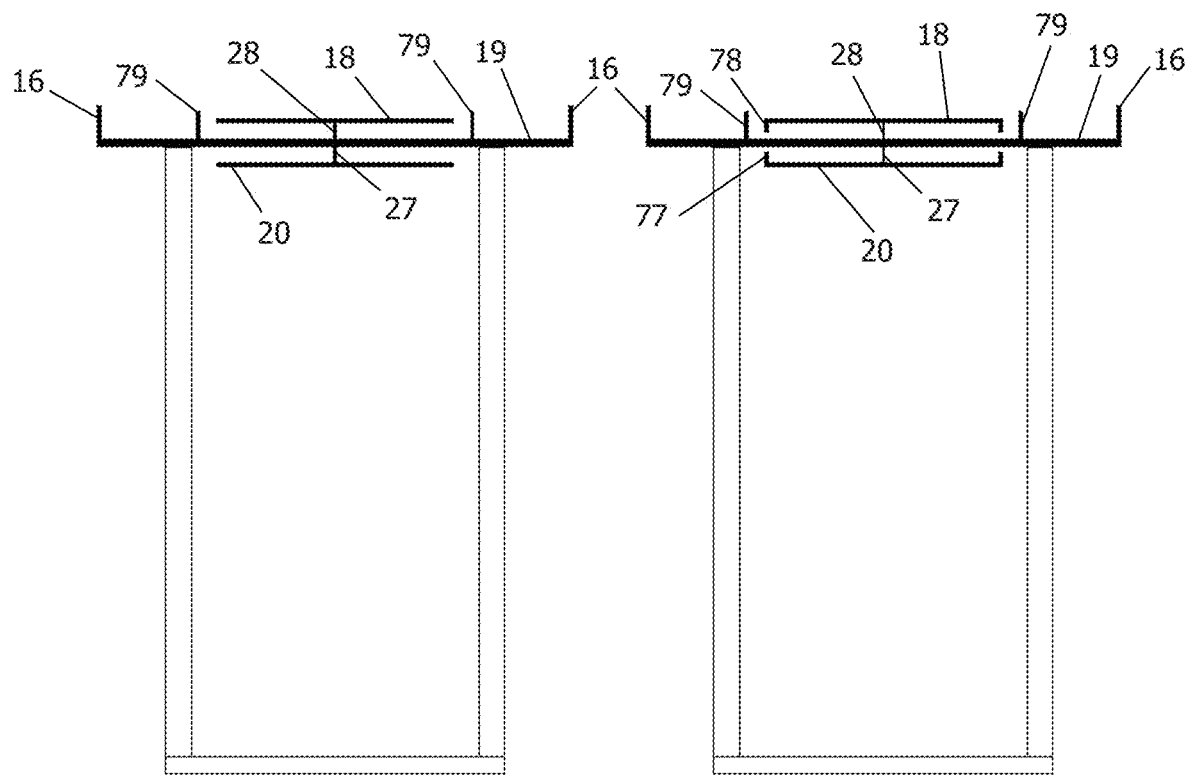
FIG. 9e is an illustrative cross-sectional view of FIG. 1 showing the example of ceiling unit in FIG. 9 with an extended diameter and providing a sound barrier vertical wall within the space of the ceiling intermediate core layer when the ceiling unit peripheral wall is farther distance from the edge of the upper covering layer to serve as an effective sound barrier, in accordance with certain embodiments of this present invention.
FIG. 9f is an illustrative cross-sectional view of FIG. 9d showing the example of ceiling unit upper covering layer and the lower suspended layer provided with bended lips to improve the sound impedance performance, in accordance with certain embodiments of this present invention.
Figure 16:
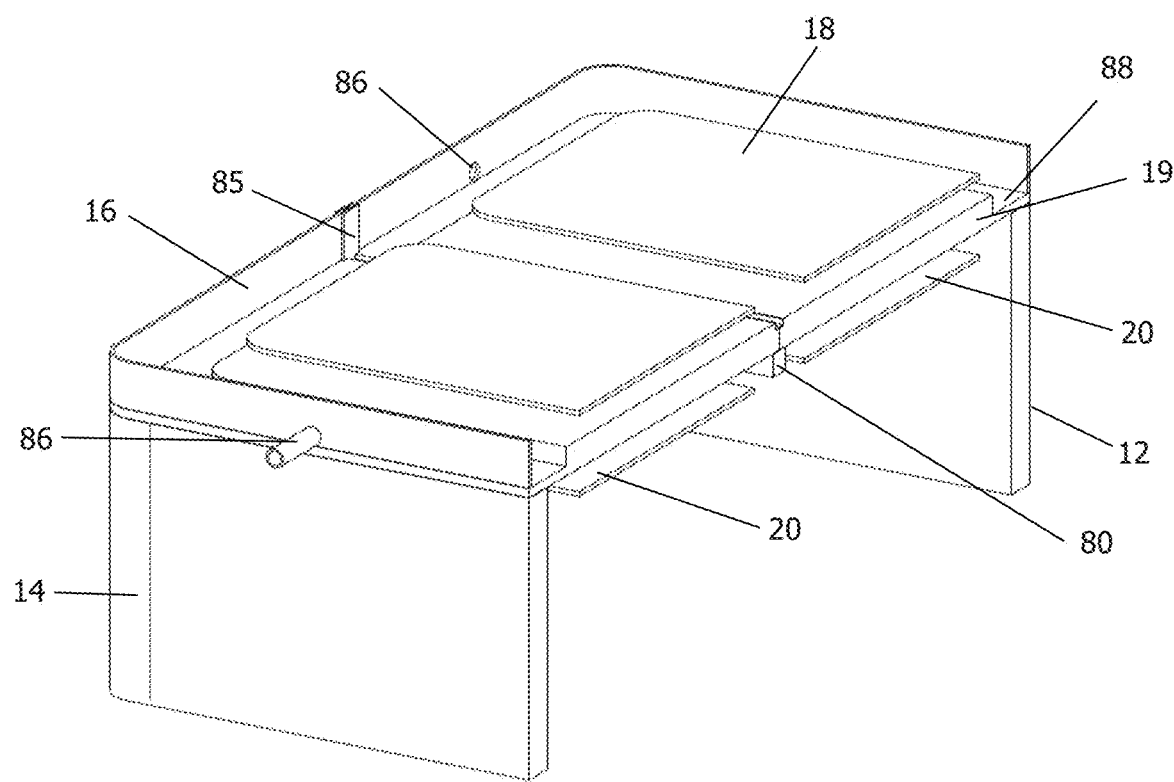
FIG. 16 is an illustrative 3-dimensional partial cross-sectional view of FIG. 10b showing two modular acoustical ceiling units with provisions for outdoor use, including a perimeter water trough and a water drainage duct in each of the intermediate core layer of the four modular ceiling unit, and also showing the ceiling support cross beam holding up the ceiling units, and a groove in-between the two intermediate core layers for application of water-poof silicon weather proof gel, in accordance with certain embodiments of the present invention.
Figure 16A:
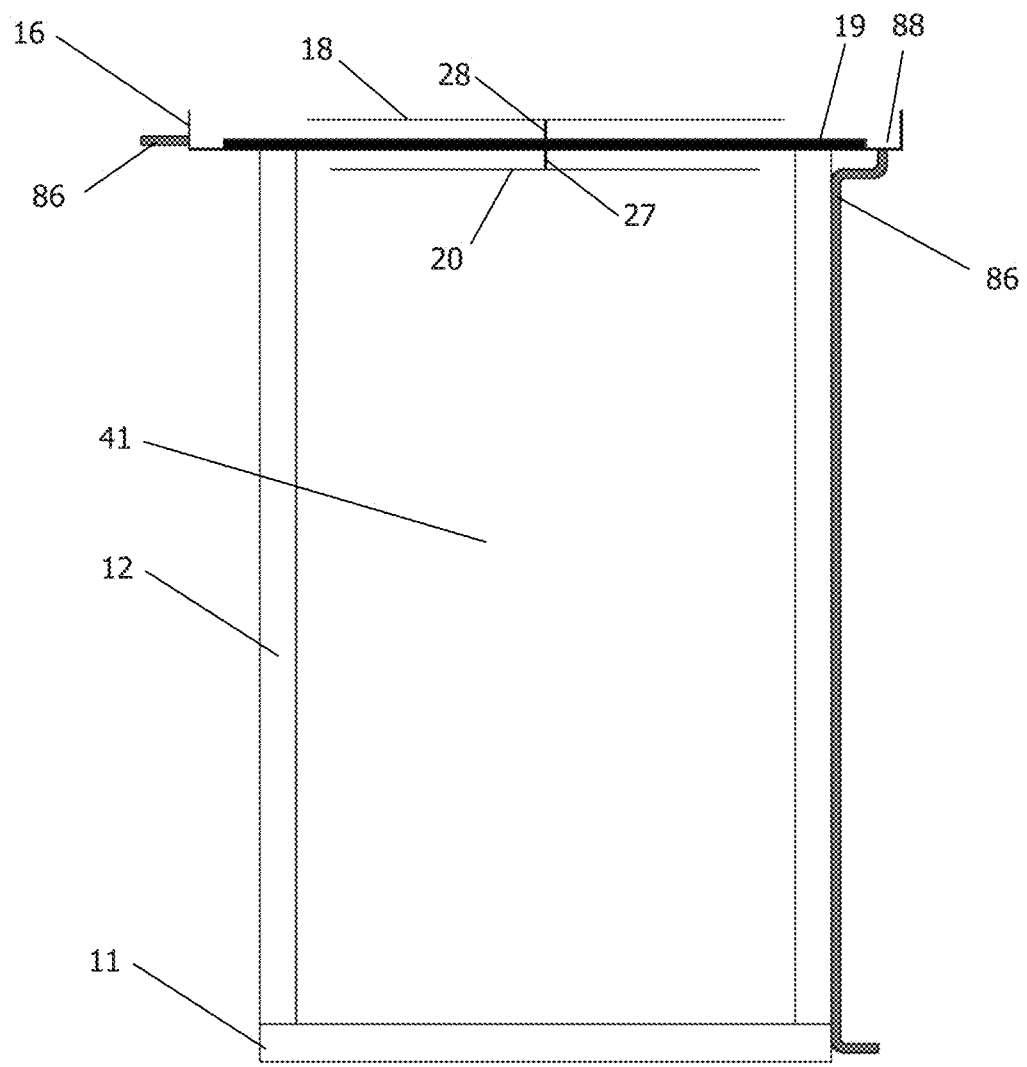
FIG. 16a is an illustrative side cross sectional view of a soundproof enclosure with an extended ceiling unit, and on the left side of the figure showing a water drainage duct exiting the intermediate core layer of a ceiling unit to drain water from the ceiling unit and to diverted water from the side of acoustical wall panel; in general to protect the soundproof enclosure from rain and sunshine; and on the right side of FIG. 16a showing a water drainage duct exiting from the intermediate core layer of a ceiling unit and connected to a downpipe running downwards attached to the exterior side of the right side acoustical wall panel to improve water drainage, in accordance to certain embodiments of the present invention.
Figure 16B:
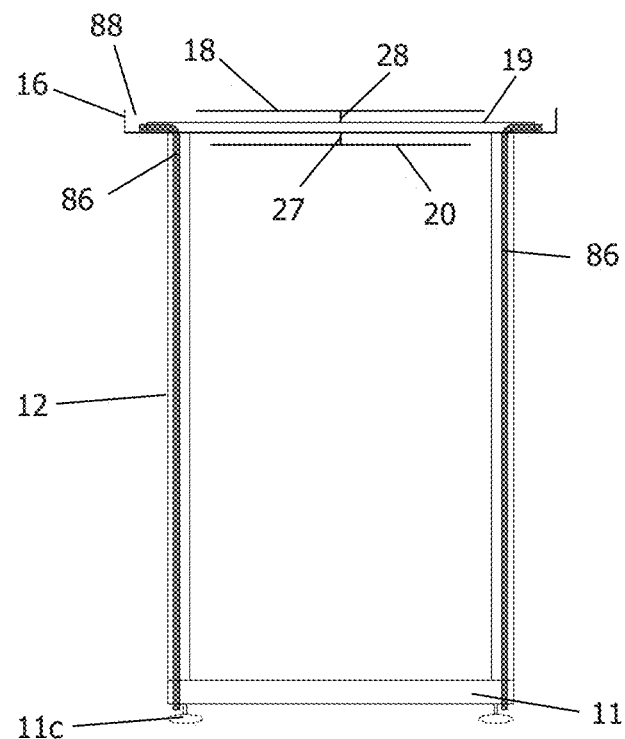
Figure 16C:
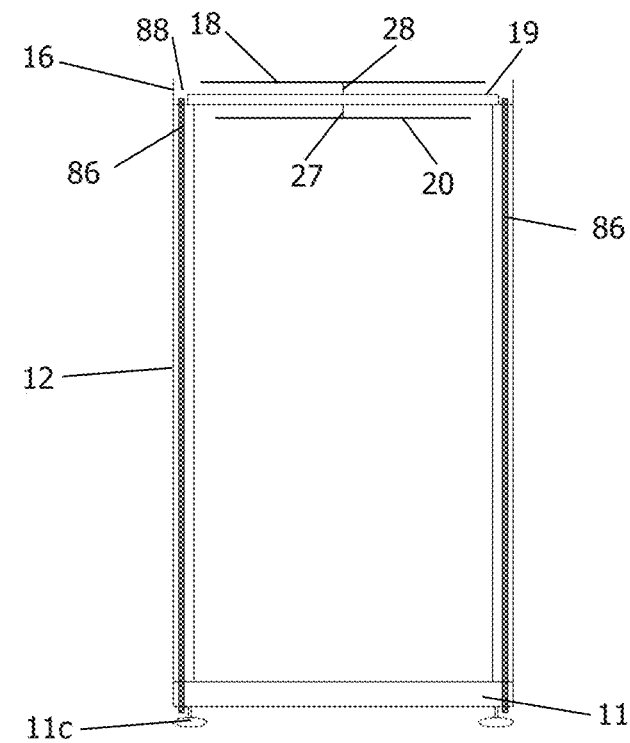
Figure 17:
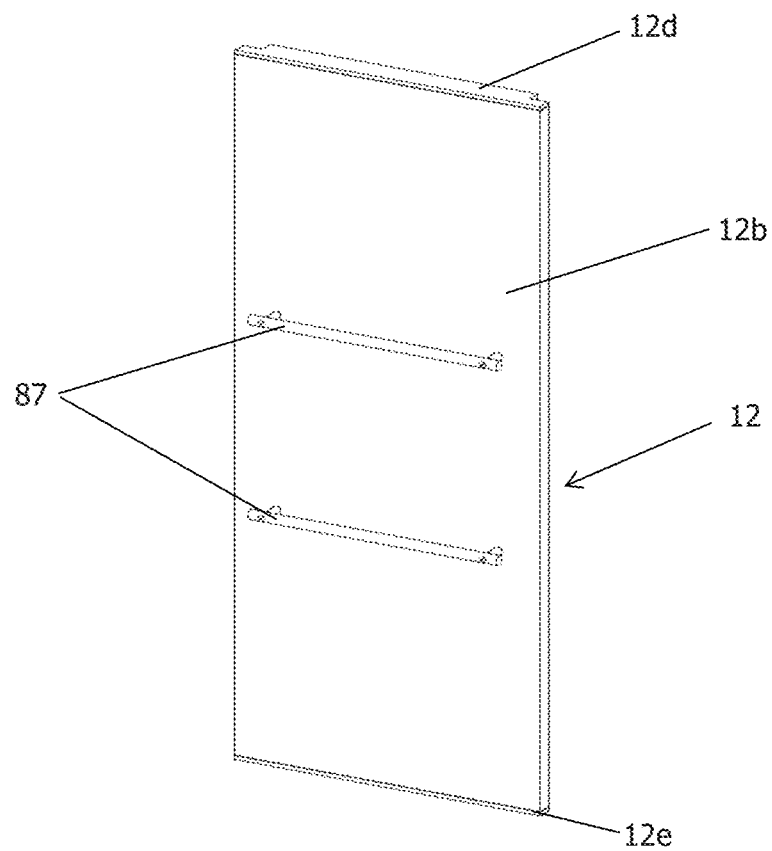
Figure 17A:
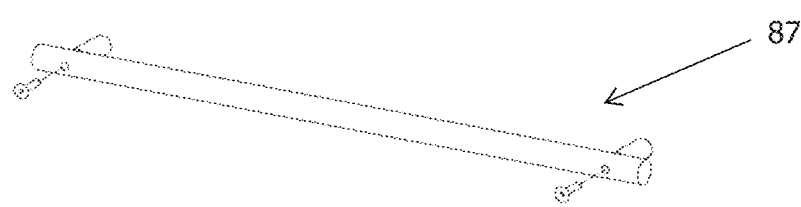
Figure 17B:
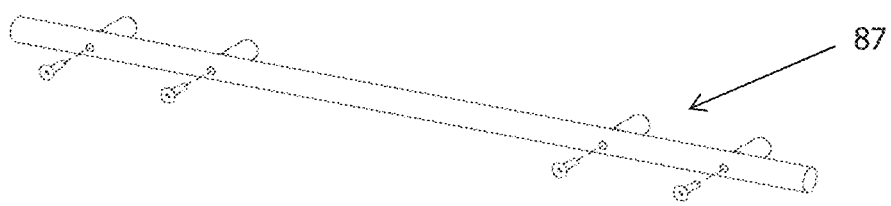
Figure 17C:
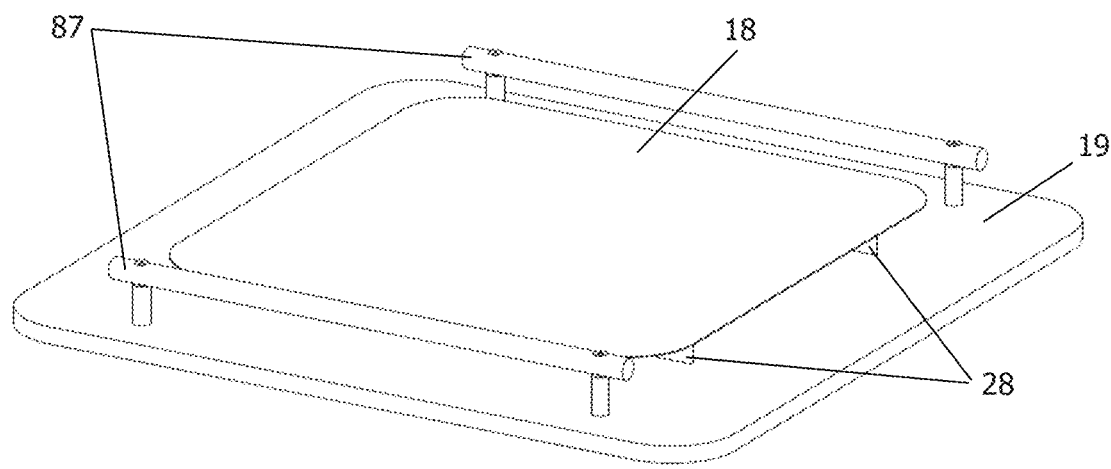

In an embodiment of the invention, the ceiling unit 13, of larger diameter than the perimeter of the soundproof enclosure 10 walls, is releasably secured on the enclosure 10 to provide an extended roof cover to protect the walls and interiors of the enclosure a degree of protection from direct sun light and rain, as illustrated in FIGS. 9e and 9f and also illustrated in FIGS. 16 to 16c.

In an embodiment of the invention, a ceiling unit 13 comprises a drainage trough 88 along at least one of the edges of the intermediate core layer 19 to effectively drain rain water away from roof of an enclosure to divert the rain water away from the walls, as illustrated in FIG. 16. The outlet 86 of this drainage trough 88 is extended outwards to divert the water away from the acoustical wall panel whereby the rain water falls downwards and outwards.

In another embodiment of this invention, the drainage trough 88 is connected to a hose, inside or outside an acoustical wall panel 12 or inside a coupling pole 14, to drain the water to the ground, as illustrated in FIGS. 16a to 16c.

In an embodiment of the invention, a ceiling unit 13 comprises of the vertical wall member 16 is formed with its height being at least substantially the same as that of the height of the upper covering layer 18 and located at an appropriate distance from the opening 25 of the air flow passages 24 to form a sound barrier to the opening 25 in a manner similar to sound defecting barriers that are installed along highways or railway lines, and also to protect against debris.

In an embodiment of the invention, a ceiling unit 13 comprises of peripheral vertical wall members 16 acting as a sound barrier is further enhanced by the sound barrier curved outward to deflect sound waves originating mostly from areas around the human height as illustrated in FIG. 9a, and peripheral vertical wall 16 acting as a sound barrier curved inward improve deflection of sound waves originating from the external environment.

In another embodiment of the invention, a multilayer ceiling unit 13 comprises of the upper covering layer 18 bended downwards to improve the sound impedance entry to the soundproof enclosure 10, and correspondingly the lower suspended layer 20 is bended upwards to improve the sound impedance exit from the soundproof enclosure 10, and illustrated in FIG. 9d.

In yet another embodiment of the invention, where the peripheral wall member 16 is not at an appropriate distance to perform as a sound barrier to openings 25, a multilayer ceiling unit 13 comprises of additional vertical flanges 79 of at least the same height as the upper covering layer 18 are added at locations of appropriate distance from the openings 25 act as a sound barrier, and whereby to further enhance the sound barrier performance, the vertical flanges 78 are extended downwardly from the upper covering layer 18 and may be curved inwardly or outwardly, as illustrated in FIGS. 7n, 7o, 8, in FIGS. 9a and 9b, and FIGS. 9e and 9f.

In an embodiment of the invention, a ceiling unit 13 provided the complete basic human requisites in an enclosed space in terms of fresh air inflow and stale exhaust air outflow that are filtered and silenced, and also provides sufficient lights.

In an embodiment of the invention, a soundproof enclosure of larger diameter comprises of more than one modular ceiling units 13 in FIG. 10b.

In yet another embodiment of the invention, a soundproof enclosure 10 of larger diameter comprises of modular ceiling units 13 of varying sizes and shapes, as illustrated in FIGS. 7(i) to 7(viii).

Figure 11C:
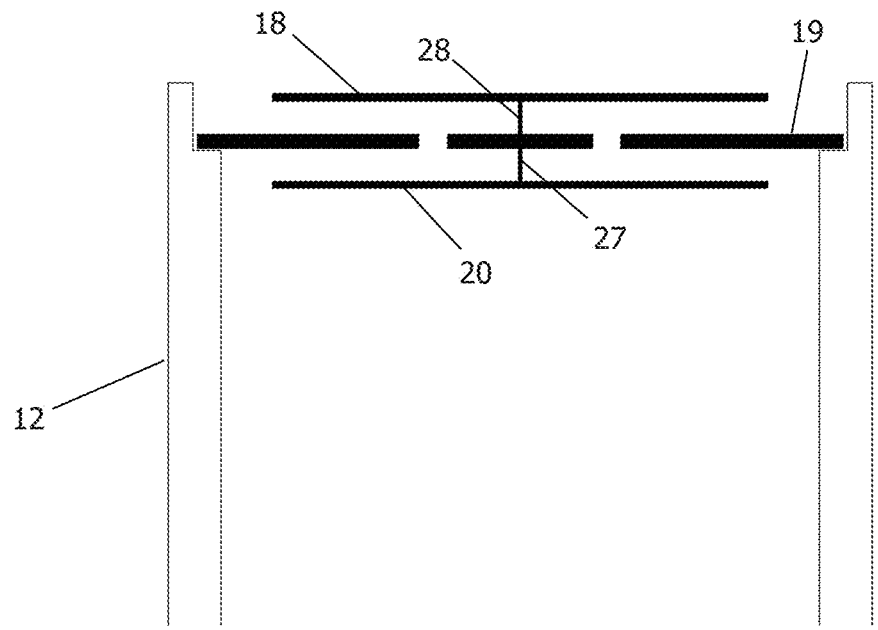
FIG. 11c is an illustrative cross sectional view of the ceiling unit supported by only a portion of the top edges of the acoustical wall, in accordance with certain embodiments of this present invention.
Figure 11D:
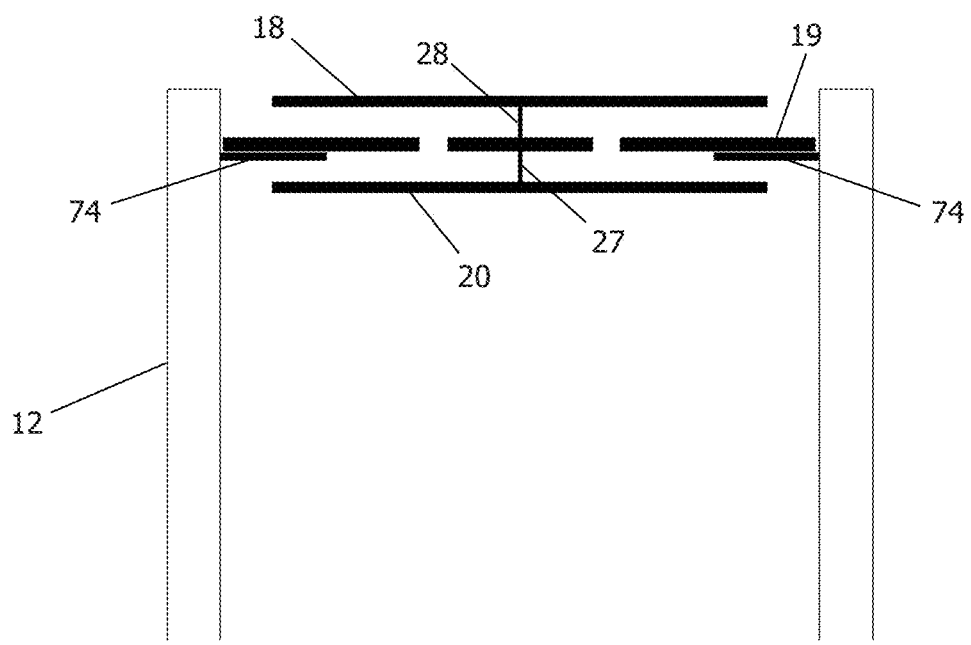
FIG. 11d is an illustrative view cross sectional view of the ceiling unit supported by extended flange installed on the upper portion of the acoustical wall, in accordance with certain embodiments of this present invention.
Figure 12:
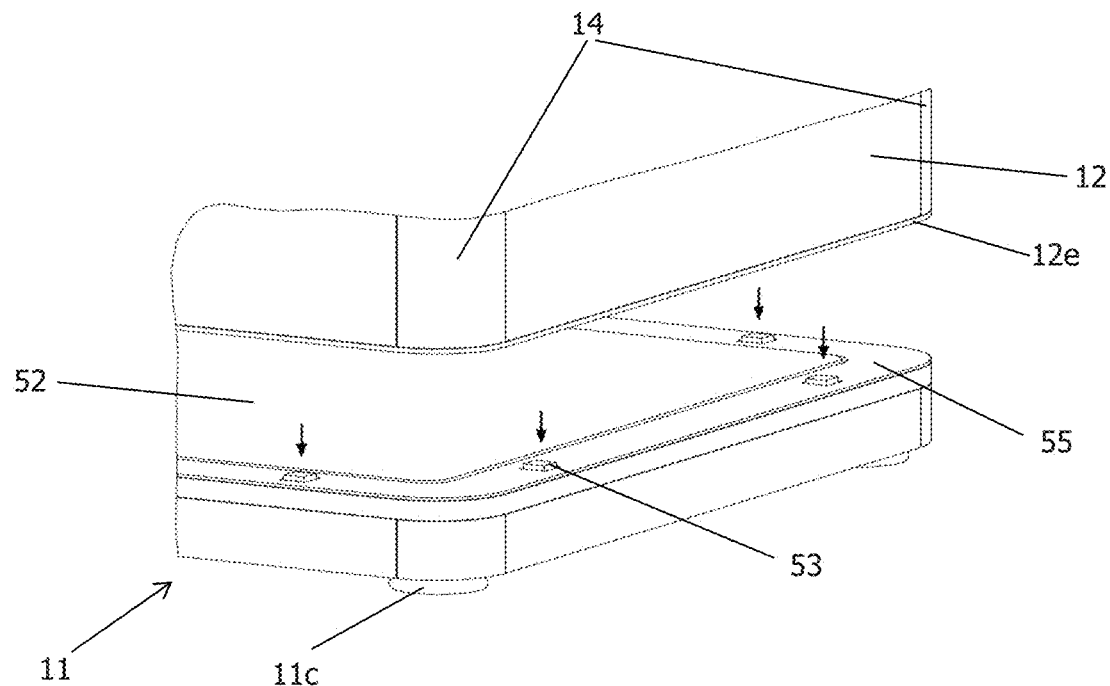
FIG. 12 is an illustrative 3-dimensional cross sectional partial view of the of FIG. 1 showing an illustrative example a layer of soft sound isolating gasket on the perimeter of a floor base and a set of rigid materials protruding above height level of the soft sound isolating gasket materials, in accordance with certain embodiments of the present invention.
Figure 12A:
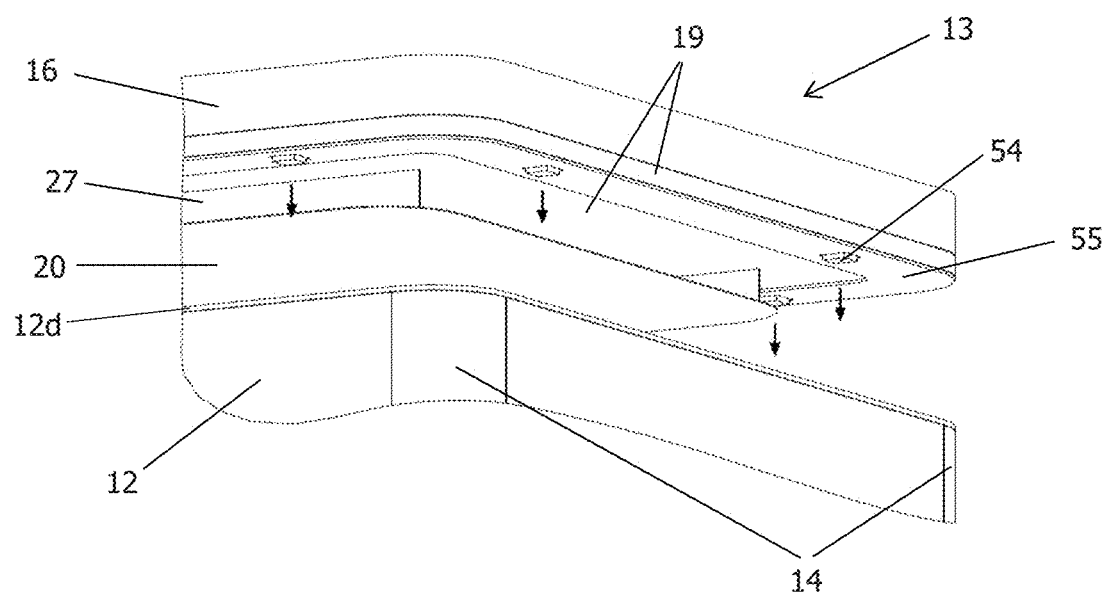
FIG. 12a is an illustrative 3-dimensional cross sectional partial view of the of FIG. 1 showing an illustrative example a layer of soft sound isolating gasket on the perimeter of a ceiling unit and a set of rigid materials protruding downwards extending below the level of the soft sound isolating materials, in accordance with certain embodiments of the present invention.
Figure 12B:
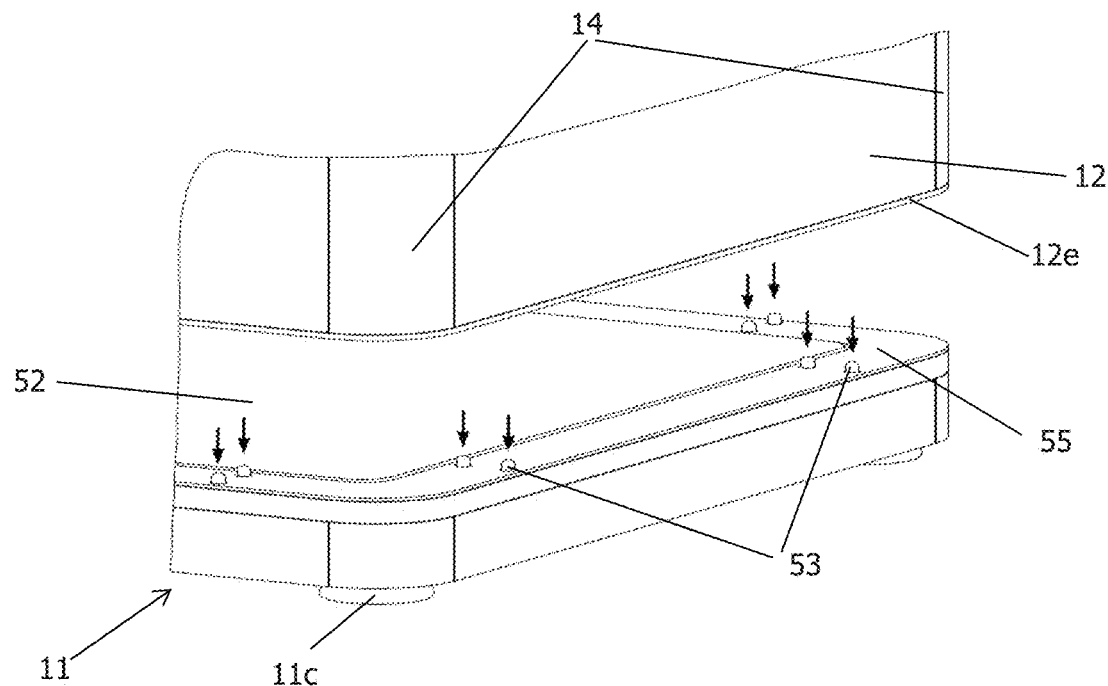
FIG. 12b is an illustration of FIG. 12 with the provision of rounded tip upstanding pins of rigid material in replacement of the set of protruding rigid materials, in accordance with certain embodiments of the present invention.
Figure 12C:
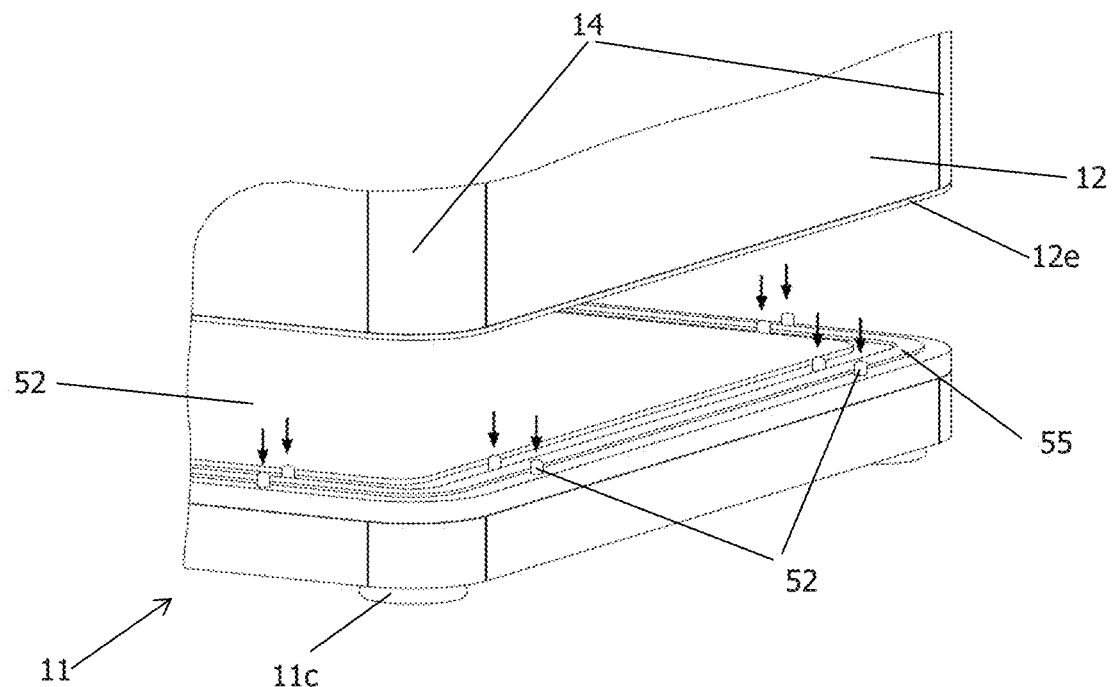
FIG. 12c is an illustration of FIG. 12b with an example of the layer of soft sound isolating gasket on the perimeter of a floor base unit and within the rigid rounded tip upstanding pins for easier manufacture and assembly, in accordance with certain embodiments of the present invention.
Figure 12D:
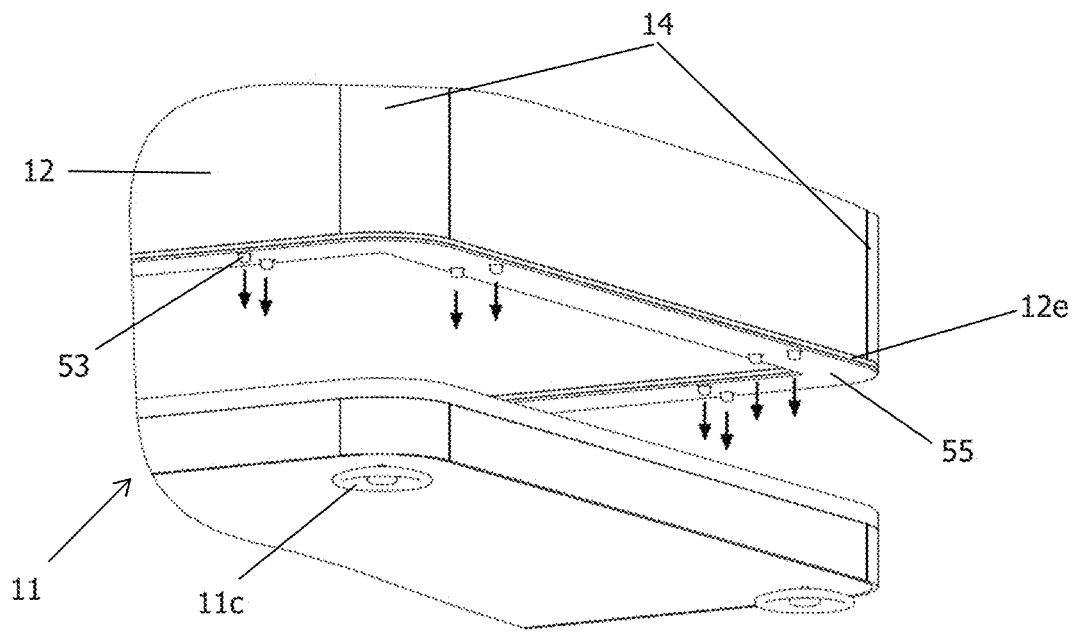
FIG. 12d is an illustrative 3-dimensional cross sectional partial view of FIG. 1 showing an illustrative example a layer of soft sound isolating gasket material installed on the bottom surface of the bottom edge of the acoustical wall panels and a set of rounded tip pins of rigid material protruding below the surface level of the soft sound isolating gasket material layer, in accordance with certain embodiments of the present invention.
Figure 12E:
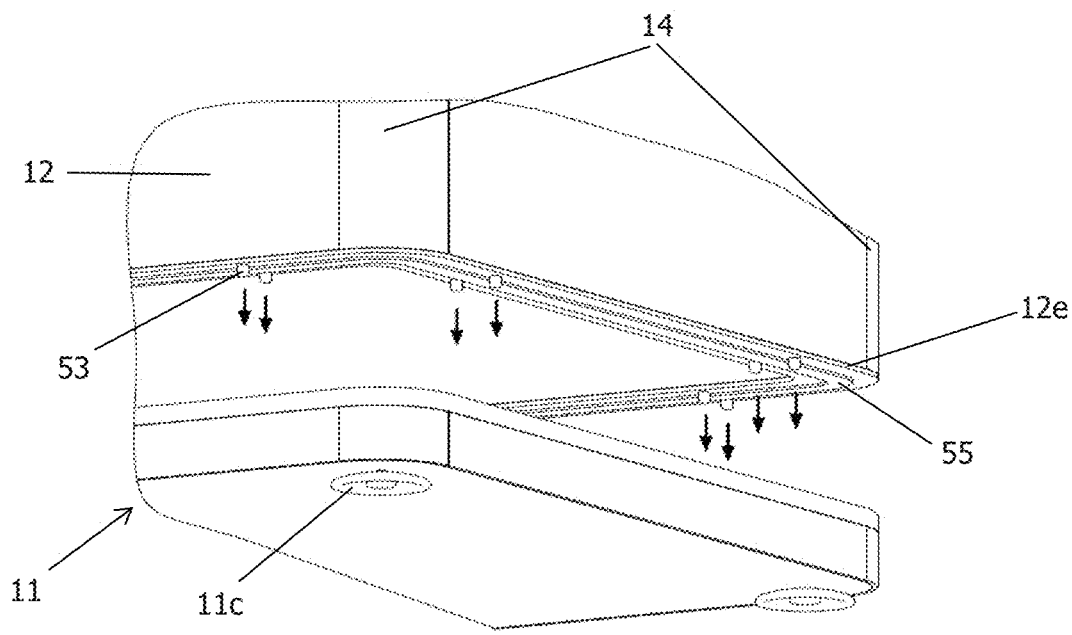
FIG. 12e is an illustration of FIG. 12d with an example of the layer of soft sound isolating gasket material within the rigid pins, in accordance with certain embodiments of the present invention.
Figure 12F:
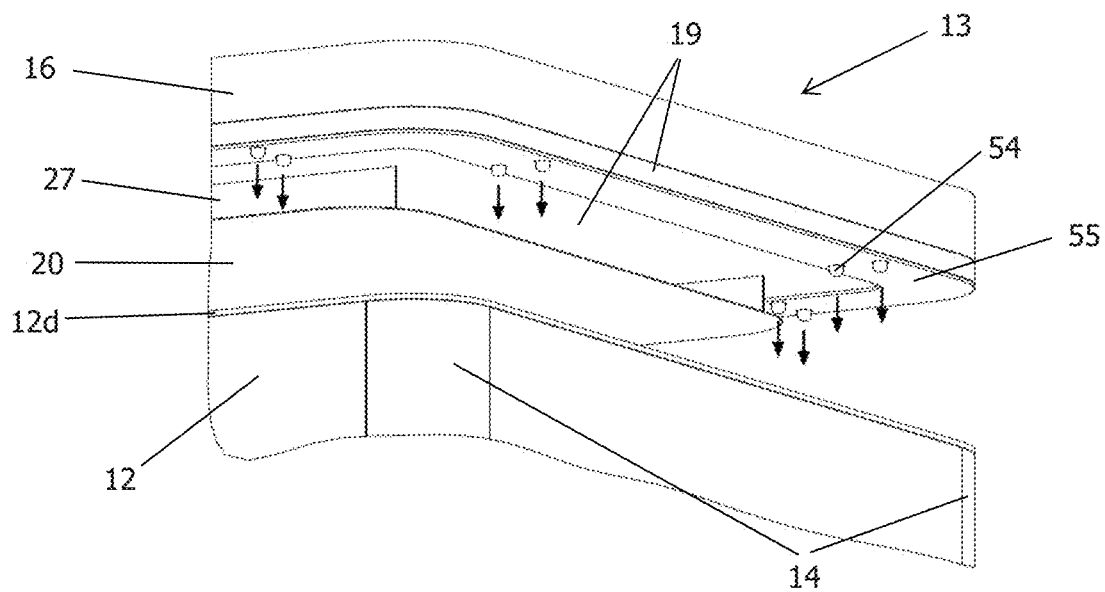
FIG. 12f is an illustrative 3-dimensional cross sectional partial view of the of FIG. 1 showing an illustrative example a layer of soft sound isolating on the perimeter of a ceiling unit and a set of pins of rigid materials protruding downwards extending below the level of the soft sound isolating materials to elevate a ceiling unit, in accordance with certain embodiments of the present invention.
Figure 12G:
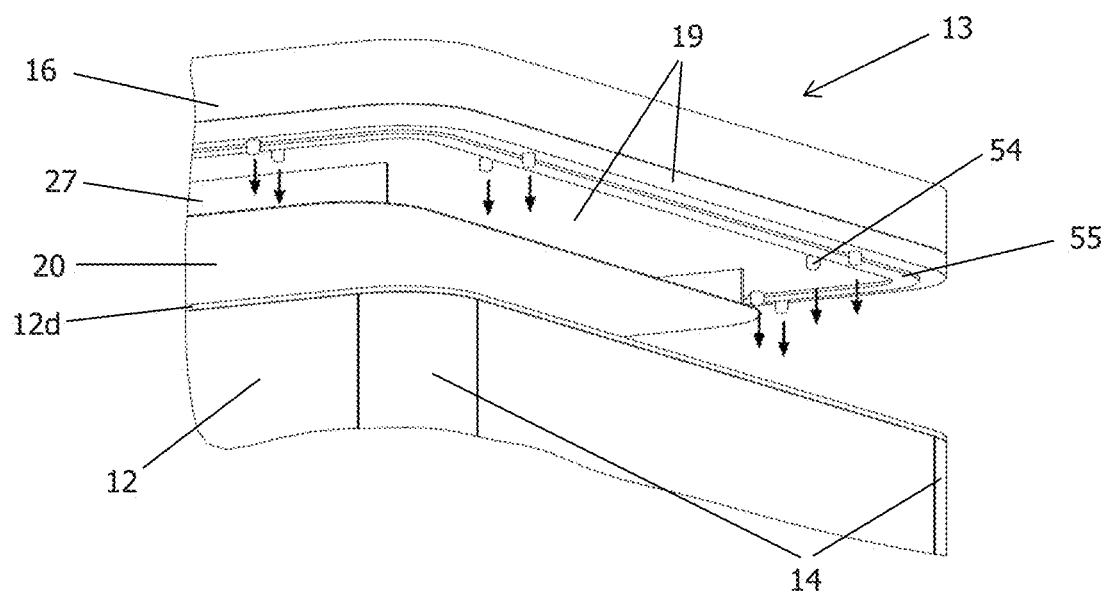
FIG. 12g is an illustration of FIG. 12f with an example of the layer of soft sound isolating gasket material within the rigid pins for easier manufacture and assembly, in accordance with certain embodiments of the present invention.
Figure 12H:
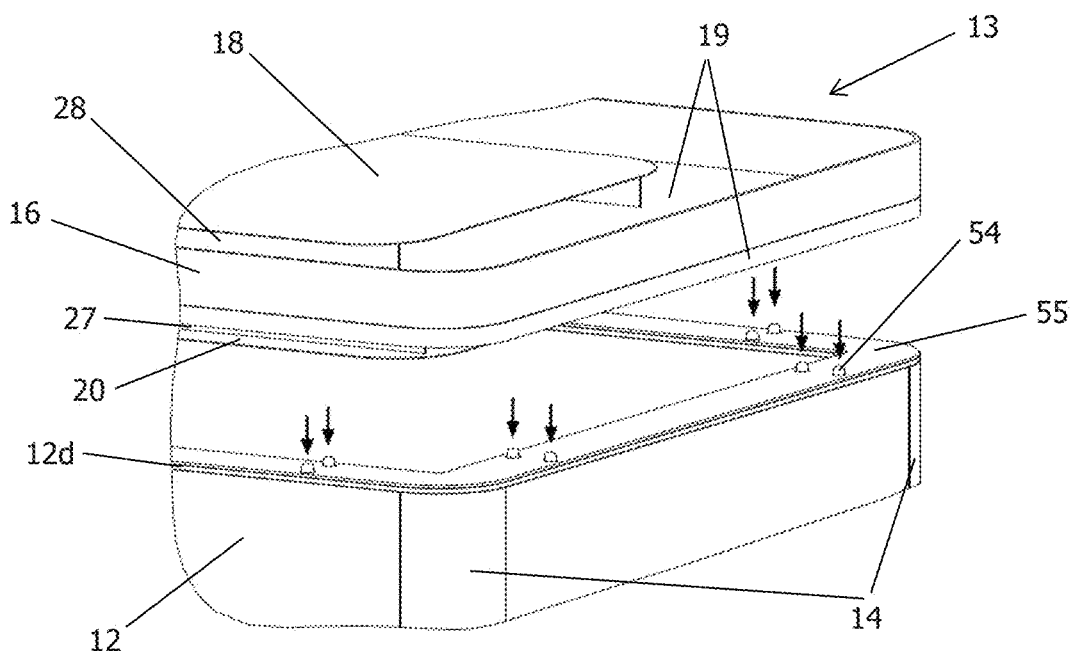
FIG. 12h is an illustrative 3-dimensional cross sectional partial view of the of FIG. 1 showing an illustrative example a layer of soft sound isolating on top edge of the acoustical wall panel and a set of pins of rigid materials protruding above the layer of soft sound isolating material, in accordance with certain embodiments of the present invention.
Figure 12I:
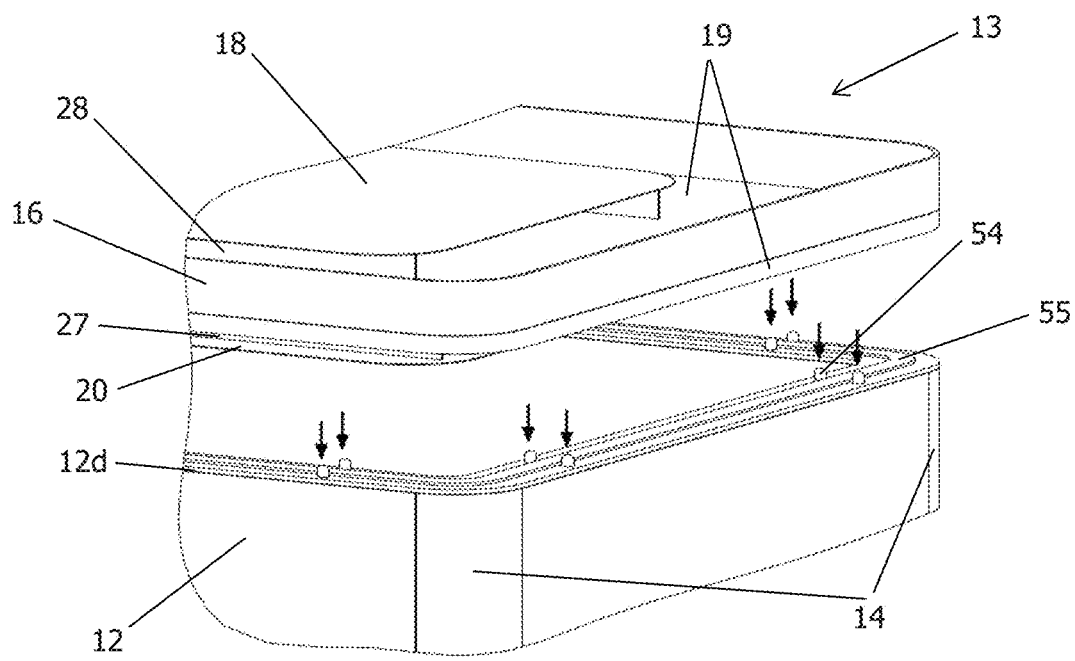
FIG. 12i is an illustration of FIG. 12g with an example of the layer of soft sound isolating material within the rigid pins, in accordance with certain embodiments of the present invention.
Figures 13, 13A:
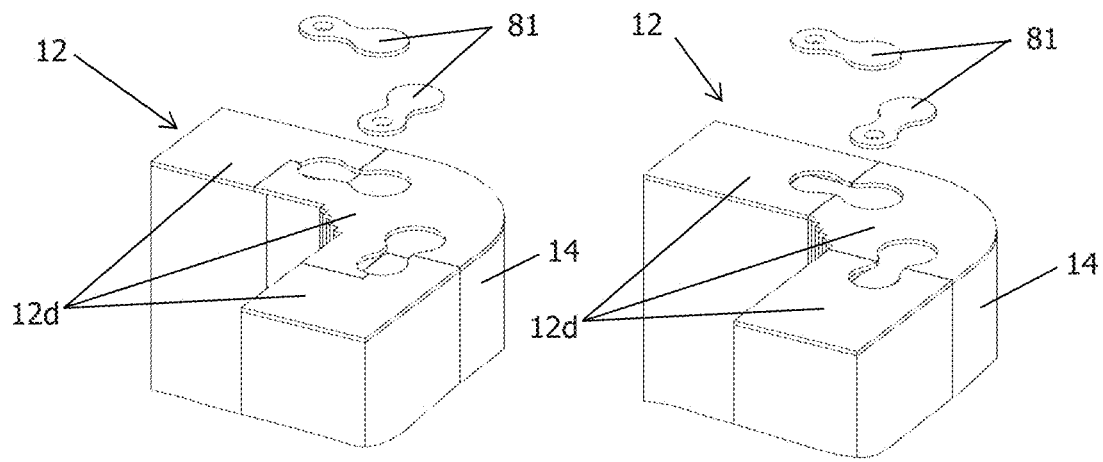
FIG. 13 is a partial 3-dimensional perspective view of two acoustical wall panels and a coupling pole coupled to one another by conventional extended flange joining method and locked with a piece of donut shape hard material on the top edge of each of the two joints, in accordance with certain embodiments of the present invention.
FIG. 13a is a partial 3-dimensional perspective view of two acoustical wall panels and a coupling pole coupled to one another and locked with a piece of donut shape hard material on the top edge of each of the two joints, in accordance with certain embodiments of the present invention.
Figures 13B, 13C:
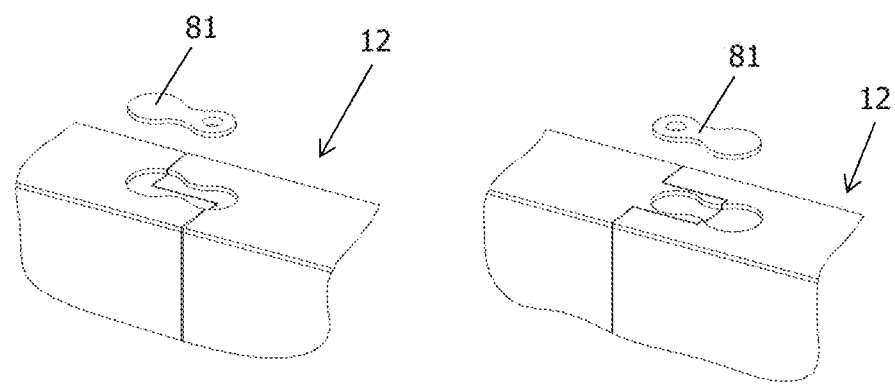
FIG. 13b is a partial 3-dimensional perspective view of two acoustical wall panels coupled to one another by conventional extended flange joining method and locked with a piece of donut shape hard material on the top edge the joint, in accordance with certain embodiments of the present invention.
FIG. 13c is a partial 3-dimensional perspective view of two acoustical wall panels coupled to one another and locked with a piece of donut shape hard material on the top edge the joint, in accordance with certain embodiments of the present invention.
Figures 13D, 13E:
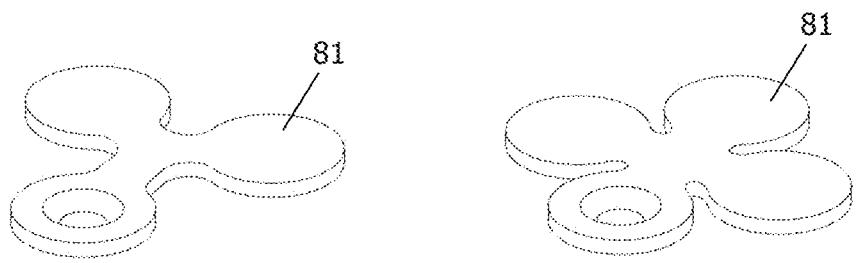
FIG. 13d is a 3-dimensional perspective view of an example of locking plate with three circular shapes joined in the center and can be used in replacement of the locking plates illustrated in FIGS. 13 to 13c, in accordance with certain embodiments of the present invention.
FIG. 13e is a 3-dimensional perspective view of an example of locking plate with four circular shapes joined in the center and can be used in replacement of the locking plates illustrated in FIGS. 13 to 13c, in accordance with certain embodiments of the present invention.

In an embodiment of the invention, the intermediate core layer 19 of the ceiling unit 13 is supported or suspended by a layer of sound and electrical insulating material layer 21 that can isolate sound, vibration and electricity from the entire lower part of the enclosure 10 as illustrated in FIGS. 11, 11a(i), 11a(ii), 11b(i) and 11b(ii). For a larger soundproof enclosure 10, more than one ceiling unit can be disposed in a similarly manner.

The ceiling unit 13 of the soundproof enclosure 10 includes an intersecting locking member 62 with sound and electrical shield to releasably attach the ceiling unit 13 to the acoustical wall panels of the enclosure. The intersecting locking member 62 includes a stepped elongated body 62a fitted in an aperture extending through the thickness of the intermediate core layer 19 and the top flange 12d at the top edge of the acoustical wall panel 12 as shown in FIG. 11a(i) or a horizontal wall member 16b extended from the vertical wall member 16 as shown in FIG. 11b(i). The stepped elongated body 62a of the intersecting locking member 62 is provided with a through hole along its lengthwise for receiving therethrough a securing bolt 63 from one edge of the elongated body 62a, which may be fastened by a nut 64 at the other edge of the elongated body 62a. The intersecting locking member 62 can also be partially extended into the interior space 41 of the soundproof enclosure as shown in FIGS. 11a(ii) and 11b(ii).

In an embodiment of the invention, an ease of assembly method is disclosed whereby an acoustical wall panel 12 or a modular ceiling unit 13 of the enclosure 10 is typically heavy and bulky, and thus in need a method to install more easily by use of sets of pins or rigid material to elevate the heavy components until they precisely fall into correct assembly positions. These components typically comprise of a layer of soft sound insulating gasket material along the joining surfaces that tend to easily get damaged during assembly because of movements between these surfaces with the weight set upon the surfaces. These sets of pins or rigid material elevates the heavy components until the precise correct assembly positions, and hence protects against damage to the soft sound isolating gaskets during the assembly process. The designs of this embodiment of the invention are illustrated in FIGS. 12, 12a to 12i.

In an embodiment of the invention, the soundproof enclosure 10 can be easily moved about and relocated because the floor base unit 11 comprised of a floor base plate which is structurally rigid, and four sets of feet securely fasten to the floor base plate elevating the floor base plate above the floor level, and a screw type floor levelling guide attached to each of the foot, as illustrated in FIG. 14a, and the floor base plate is supported at a level above the floor level sufficient for the insertion of a commercial hand pallet truck prongs or forklift vehicle to easily move the sound proof enclosure 10, as illustrated in FIGS. 14, 14a, and 14b.

In another embodiment of the invention, a larger soundproof enclosure 10 can be easily moved about and relocated because the floor base unit 11 of a larger diameter comprised of a floor base plate which is structurally rigid, and 6 sets of feet secured fasten to the floor base plate elevating the floor base plate at a level above the floor level sufficient for the insertion of two commercial hand pallet trucks, and a screw type floor levelling guide attached to each of the foot adjusted for levelling on uneven floor surfaces, as illustrated in FIG. 14c.

In an embodiment of the invention, a floor base unit 11 comprised of a set of caster wheels to allow for the enclosure to be pushed around for relocation or reposition. Once a location or position has been selected, a set of floor levellers would raise up the enclosure floor base sufficiently to allow a set of caster wheels to be not touching the floor level; and this set of floor levellers can be of vertical bolt and stud, or of a set of raising device such as car jacks, or set of electrically operated device such as "Linak Baselift" or other actuating pistons, as illustrated in FIGS. 15, 15a to 15f.

In an embodiment of the invention, a floor base unit 11 comprised of a floor base plate 11a, which is structurally rigid, having a set of four industrial grade castors attached to the floor base plate to allow the soundproof enclosure to be moved about easily, and having four sets of feet securely fasten to the floor base plate being able to elevate the floor base plate above castors rolling level by adjusting lowering a screw type floor levelling guide attached to each of the foot such that the soundproof enclosure will no longer be able to move about, and releasably secured to the floor space as shown in FIG. 15a. The four levelling guides can be lowered such that the floor base is raised so that the set of casters can no longer touch the floor, and hence the soundproof enclosure 10 is securely and properly placed at a desired floor space, as illustrated in FIG. 15a. FIG. 15d is a see-through illustration of this embodiment.

In an embodiment of the invention, as an example of a floor base unit 11 which is structurally rigid comprised of a set of four industrial grade castors attached to the floor base plate to allow the soundproof enclosure to be moved about easily, and more than three sets of feet that incorporated mechanical or electro-mechanical device to adjust the height of each foot so that the feet can be lowered such that the floor base unit 11 is raised so that the set of casters can no longer touch the floor, and hence the soundproof enclosure 10 is securely and properly placed at a desired floor space, as illustrated in FIG. 15c. This invented technology is further illustrated with the four levelling guides of mechanical or electro-mechanical devices, and the installation of the set of casters a see-through illustration in FIG. 15d of FIG. 15b.

In an embodiment of the invention, the floor base unit 11 comprises four levelling guides of mechanical device similar to a car jack, and interconnected together by torque transfer links and gears to operate with a single crank handle or spindle as illustrated in FIG. 5e.

In an embodiment of this invention, the floor base unit 11 comprises three or more levelling guides of electro-mechanical device similar to a piston actuator 84 and are installed into the coupling poles 14 or inside the acoustical wall panels 12, and the feet can be lowered such that the floor base is raised so that the set of casters can no longer touch the floor, and hence the sound proof enclosure 10 is securely and property placed at a desired floor space, as illustrated in FIG. 15g.

In an embodiment of the invention, a soundproof enclosure 11 without any floor base unit 11 comprises a plurality of acoustical wall panels 12 and ceiling unit(s) releasably secured to a floor space by a floor bracket 12j installed directly on the floor, as illustrated in FIGS. 2f and 2g.

In an embodiment of the invention, a soundproof enclosure 11 without any floor base unit 11 comprises a plurality of acoustical wall panels 12 and ceiling unit(s) releasably secured to a floor space by a floor bracket 12j at the bottom flange 12e of the bottom edge of the wall panel as illustrated in FIGS. 2c and 2e.

In an embodiment of the invention, a method of assembly with ease is disclosed. A set of one or more handles are provided with the supply of the soundproof enclosure 10. The installing sequence is to first place the floor base unit 11 onto the desired floor space, and then to carry and position and assemble the heavy acoustical wall panels 12 onto the floor base unit 11. The generally soft sound insulating gasket materials to be sandwiched in-between the bottom edge 12e and floor base plate 11a can be easily damaged if in contact with one another, and movements are made to position the acoustical wall panel 12 to the assembly position, tearing the gasket materials in this movement.

FIG. 7b shows a front cross-sectional view of the multilayer decoupling ceiling unit 13 in accordance to an embodiment of the invention. The intermediate core layer 19 is provided with a pair of air passage apertures 42 for the air flow passage(s) 24 to pass to or from the air flow passage(s) 37. The ceiling unit 13 can be of various shapes in accordance to the shapes of the soundproof enclosure 10 formed by the plurality of acoustical wall panels 12 defining the interior space 41 of the soundproof enclosure 10. Although the acoustical wall panels 12 of the soundproof enclosure 10 may be sized differently, however the form of construction is identical with that above described.

The intermediate core layer 19 of the multilayer decoupling ceiling unit 13 may comprise a vertical wall member 16 extending perpendicularly from the edge of the intermediate core layer 19 for defining an upwardly extended wall for abuttingly retaining and supporting the plurality of ceiling layers thereon as shown in FIGS. 9 and 11.

In an embodiment of this invention, the soundproof enclosure 10 can include a fixed table 44 or foldable table which is attached to one of the acoustical wall panels 12 or the floor base unit 11, a chair can be placed on the floor base unit 11 or floor within the enclosed space 41, a sensing module can be incorporated to detect user existence for automatically controlling the lighting and the air circulation or ventilation unit, power connectors to provide electricity supply for the electronic devices; and network connection lines.

In accordance with another aspect of the invention, there is provided a method of constructing the soundproof enclosure 10 whereby the method includes the step of prefabricating a peripheral wall by interconnecting a plurality of acoustical wall panels 12 each to another at opposing sides to form an assembly of interconnected panels for enclosing an interior space 41, where each of the acoustical wall panels 12 has a bottom edge 12e and a top edge 12d upper end opposite bottom edge 12e, providing at least a portion of one enclosure movably connected at one side edge between an open position and a closed position for providing and covering an access opening 15, and positioning the assembly of interconnected panels at the bottom edge 12e on a floor space or floor base unit 11, as illustrated in FIGS. 2b to 2e.

Although a preferred embodiment of the present invention has been described in detail by way of examples with reference to the accompanying drawings, it should be understood that various changes, substitutions, and modifications can be made herein without departing from the scope of the invention as defined by the appended claims.

The invention claimed is:

1. A soundproof enclosure (10) comprising:
a plurality of acoustical wall panels (12) interconnectable each to another at opposing vertical side edges (120 for enclosing an interior space (41), each of the acoustical wall panels (12) having a bottom edge provided with a bottom flange (12e) adapted to be supported on a floor base unit (11) or on a floor and a top edge provided with a top flange (12d), wherein at least a portion of a front wall panel (12a) is movably connected at one vertical side edge between an open position and a closed position for providing and covering an access opening (15) in which the portion forms at least one access door panel of rigid material; and
a multilayer decoupling ceiling unit (13) disposed on the top edges of the acoustical wall panels (12) for forming the enclosure, the multilayer decoupling ceiling unit (13) comprising:
a plurality of ceiling layers (17) having an intermediate core layer (19) supported by the top flanges (12d) at the top edges of the acoustical wall panels (12), the ceiling layers are vertically spaced apart from one another; and
a vertical wall member (16) upwardly extending from an outer periphery end of the intermediate core layer (19),
wherein the intermediate core layer (19) of the multilayer decoupling ceiling unit (13) is disposed on the top flanges (12d) at the top edges of the acoustical wall panels (12), includes a decoupling element comprising a layer of low acoustic impedance material or sound insulating material (21) interposed between contacting surfaces of the intermediate core layer (19) and the top flanges (12d) for isolating and decoupling the ceiling unit (13) from the acoustical wall panels (12) to provide the soundproof enclosure (10) with a desired sound impedance, and to enhance the sound absorption and insulation characteristics of the soundproof enclosure (10).

2. The soundproof enclosure (10) as claimed in claim 1, wherein the plurality of ceiling layers of the ceiling unit (13) further comprises:
at least one upper covering layer (18) raised and suspended over the intermediate core layer (19) by bracket means (28) for defining at least one air flow passages (24) therebetween; and
at least one lower suspended layer (20) disposed suspended beneath the intermediate core layer (19) by bracket means (27) for defining at least one air flow passage (37) therebetween,
wherein the ceiling unit (13) includes an open exterior space within the vertical wall member (16) and the upper covering layer (18), which is divided into an air flow passage for intake (24) at one side and an air flow passage for exhaust (24) at the other side, for accommodating one or more air ventilation units within the air passages to circulate the exterior air into the enclosure (10) and to exhaust the interior air out from the enclosure (10); and wherein the ceiling unit (13) includes an interior space in between the at least one lower suspended layer (20) and the intermediate core layer (19) which is divided into an air flow passage (37) for intake at one side and an air flow passage (37) for exhaust at the other side, for accommodating one or more air ventilation units within the air passages to circulate the exterior air into the enclosure (10) and to exhaust the interior air out from the enclosure (10).

3. The soundproof enclosure (10) as claimed in claim 2, wherein the lower suspended layer (20) of the ceiling unit (13) provides a corresponding gap (26) in between an inner wall layer (32) of the acoustical wall panel (12) and inner corners of the lower suspended layer (20) for trapping sound waves and reducing sound reflection properties within the interior space (41), and wherein the inner corners are formed with any surface topography, such as jagged edges (39) or rounded edges (40).

4. The soundproof enclosure (10) as claimed in claim 2, wherein the intermediate core layer (19) comprises additional vertical wall member (16) or vertical flanges (79) of at least the same height added at locations of appropriate distance from the openings (25) of the air flow passages (24) in the exterior space to further enhance the sound barrier performance, whereby the vertical flanges (79) are extended downwardly from the upper covering layer (18) and may be curved inwardly or outwardly.

5. The soundproof enclosure (10) as claimed in claim 2, wherein the air flow passage (24) for intake includes an intake opening (25) and the air flow passage (24) for exhaust includes an exhaust opening (25) in the exterior space which are on the opposite sides or substantially far apart from one another to allow for effective disposal of stale exhaust air from the interior space (41) and provide the fresh air intake into the interior space (41), and wherein the air flow passage (37) for intake includes an intake opening (43) and the air flow passage (37) for exhaust includes an exhaust opening (43) in the interior space (41) which are on the opposite sides or substantially far apart from one another to allow for effective air circulation within the interior space (41) by allowing fresh air intake to be spaced apart from the air exhaust outflow.

6. The soundproof enclosure (10) as claimed in claim 1, wherein the ceiling unit (13) includes more than one upper covering layer (18) and more than one lower suspended layer (20) which are spaced apart from one another to provide sufficient surfaces for installation of various implements such as air circulation fans, split system air conditioner components, air-filters and sound silencers within the air passages.

7. The soundproof enclosure (10) as claimed in claim 6, wherein the various implements may be disposed on top of the surface of the upper covering layer (18) in the open exterior space within the vertical wall member (16) of the ceiling unit (13).

8. The soundproof enclosure (13) as claimed in claim 6, wherein the implements of the air-filters and sound silencers within the ceiling unit (13) are sufficiently porous to allow convectional air flow through such implements so that it does not require mechanical air circulation unit for air circulation.

9. The soundproof enclosure (10) as claimed in claim 1, wherein the ceiling unit (13) further comprises a plurality of ceiling units (13) disposed on top of the plurality of acoustical wall panels (12) or a ceiling beam (80) for forming a whole ceiling unit of larger diameter.

10. The soundproof enclosure (10) as claimed in claim 1, wherein the ceiling unit (13) having the intermediate core layer (19) formed with an extended diameter portion extending over and larger than the diameter of the constructed acoustical wall panels (12) to provide additional sound proofing features, weather protection features or aesthetic features.

11. The soundproof enclosure (10) as claimed in claim 1, wherein the vertical wall member (16) of the ceiling unit (13) is formed with its height being at least substantially the same as that of the height of the upper covering layer (18) and located at an appropriate distance from the openings (25) of the air flow passages (24) in the exterior space to form a sound barrier to the openings (25).

12. The soundproof enclosure (10) as claimed in claim 11, wherein when the vertical wall member (16) of the ceiling unit (13) is not at an appropriate distance to the openings (25), additional vertical wall members are constructed at the openings (25) to form additional sound barriers (79) to the openings.

13. The soundproof enclosure (10) as claimed in claim 1, wherein the decoupling element of the ceiling unit (13) further comprises another layer of low acoustic impedance material or sound insulating material (21) provided on a portion surface or all of the surfaces of the intermediate core layer (19) such that the entire ceiling unit (13) is completely sound and electricity isolated from the entire soundproof enclosure (10).

14. The soundproof enclosure (10) as claimed in claim 1, wherein the decoupling element of the ceiling unit (13) further comprises an intersecting locking member (62) with sound and electrical insulating material (21) intersecting the intermediate core layer (19) of the ceiling unit (13) and the top flange (12*d*) at the top edge of the acoustical wall panel (12) or a horizontal wall member (16*b*) extended from the vertical wall member (16), and having the intersecting locking member (62) partially extended into the acoustical wall panel (12) or into the interior space (41) of the soundproof enclosure.

15. The soundproof enclosure (10) as claimed in claim 1, wherein each of the ceiling layers of the ceiling unit (13) further comprises a layer of low acoustic impedance material or sound insulating material on a portion surface or all of the surfaces of the ceiling layer.

16. The soundproof enclosure (10) as claimed in claim 1, wherein the multilayer decoupling ceiling unit (13) is constructed into a portion or the whole of an acoustical wall (12) to obtain any or all the performance features of the ceiling unit (13).

17. The soundproof enclosure (10) as claimed in claim 1, wherein the floor base unit (11) comprises a floor base plate (11*a*) formed of rigid material, at least one base frame (11*b*) for supporting the floor base plate (11*a*) and to allow for insertion of lifting arms of a pallet truck or forklift-vehicle below the floor base plate (11*a*) for elevating the floor base unit (11) to a level above the floor level, and a decoupling element to acoustically isolate and decouple the acoustical wall panels (12) from the floor base unit (11), and one or more layers of flooring material (55) provided on a top surface of the base frame (11a).

18. The soundproof enclosure (10) as claimed in claim 17, wherein the floor base unit (11) may comprise a plurality of floor levellers (11c) and a set of peripheral side covers (11d) which can be disassembled and removed.

19. The soundproof enclosure (10) as claimed in claim 17, wherein the floor base unit (11) further comprises a set of castors (73) attached to the floor base frame (11b) at an elevated level above the floor level to allow the soundproof enclosure (10) to be easily moved, and
wherein the soundproof enclosure (10) comprises of a plurality of floor levellers (11c) which adjusted to raise the floor base (11) above the caster levels such that the floor base (11) is subsequently resting solely on the set of casters (73) and hence the floor base (11) is secured from moving about, and
wherein in replacement of the set of casters (73) a plurality of lifting devices such as car jacks or lifting actuators (71) may perform the similar functions of the set of floor levellers (11c), and whereby lifting actuators may also be installed in the acoustical wall panels (12) or coupling poles (14).

20. The soundproof enclosure (10) as claimed in claim 17, wherein the decoupling element of the floor base unit (11) includes a set sound insulating gaskets (55) and a set of plurality of protruding rigid material (53) attached to the floor base (11) of thicknesses which are above the height level of the sound insulating gaskets (55) to elevate the acoustical wall panel bottom edge (12e) to allow for easy and smooth movement of the acoustical wall panel (12) by opposing the weight of the acoustical wall panel (12) using the reduced friction of the two opposing rigid materials of the acoustical wall panel bottom edge (12e) and the protruding rigid material (53) until the precise assembly position between the acoustical wall panel (12) and the floor base (11) is arrived, and the two assembly components will then lodge into precise position of protruding rigid material (53) matched to corresponding matching cavity in the acoustical wall panel bottom edge (12e), and
whereby instead the set sound insulating gaskets (55) and the set of plurality of protruding rigid materials (53) are attached to the acoustical wall panel bottom edge (12e) and the matching cavity is found on the decoupling surface of the floor base unit (11) to achieve the same purpose, and
whereby instead of the set of plurality of protruding rigid materials (53), the same purpose is achieved by a set of plurality of upstanding rounded tip pins of rigid material (52), and
wherein the decoupling element of the ceiling unit (13) includes a set sound insulating gaskets (55) and a set of plurality of rigid materials protruding (53) attached to the ceiling unit (13) of thicknesses which are below the height level of the sound insulating gaskets (55) to elevate the ceiling unit (13) coupling surface to allow for easy and smooth movement of the ceiling unit (13) by opposing the weight of the ceiling unit (13) using the reduced friction of the two opposing rigid materials of the acoustical wall panel top edge (12d) and the protruding rigid material (53) until the precise assembly position between the acoustical wall panel (12) and the ceiling unit (13) is arrived, and thereby the two assembly components will lodge into precise position of protruding rigid material (53) matched to corresponding matching cavity in the ceiling unit (13) coupling surface, and
whereby instead the set sound insulating gaskets (55) and the set of plurality of protruding rigid materials (53) are attached instead to the acoustical wall panel top edge (12d) and the matching cavity is found on the decoupling surface of the ceiling unit (13) to achieve the same purpose, and
whereby instead of the set of plurality of protruding rigid materials (53), the same purpose is achieved by a set of plurality of upstanding rounded tip pins of rigid material (52).

21. A method of constructing a soundproof enclosure (10), the method comprising the steps of:
prefabricating a peripheral wall by:
interconnecting a plurality of acoustical wall panels (12) each to another at opposing vertical side edges to form an assembly of interconnected acoustical wall panels for enclosing an interior space (41), where each of the acoustical wall panels (12) having a bottom edge (12e) and a top edge (12d) opposite the bottom edge (12e);
providing at least a portion of one acoustical wall panel movably connected at one vertical side edge between an open position and a closed position for providing and covering an access opening (15); and
positioning the assembly of interconnected acoustical wall panels (12) at the bottom edge (12e) on a floor or floor base unit (11);
prefabricating a multilayer decoupling ceiling unit (13) by:
providing a vertical wall member (16) extending upwardly from an outer periphery end of an intermediate core layer (19) of the ceiling unit; and
abuttingly supporting a plurality of ceiling layers on top flanges at the top edges of the acoustical wall panels (12), the ceiling layers are vertically spaced apart from one another;
disposing the multilayer decoupling ceiling unit (13) on the whole or portion of top edges (12d) of the acoustical wall panels (12); and
attaching the ceiling unit (13) to the peripheral wall by a decoupling element comprising a layer of low acoustic impedance materials or sound insulating material interposed between the contacting surfaces and the peripheral wall for isolating and decoupling the ceiling unit (13) from the peripheral wall.

22. The method of constructing a soundproof enclosure (10) as claimed in claim 21, wherein the acoustical wall panel (12) having one or both the vertical side edges coupled to the coupling pole (14) to form a single unit of acoustical wall panel (12) to replace the need of use of one or both the coupling poles (14).

23. The method of constructing a soundproof enclosure (10) as claimed in claim 21, wherein the acoustical wall panels (12) are formed of varying sizes and shapes which may comprise of curved shape on one vertical side edge or both vertical side edges to form different typological top views profiles such as rectangular, hexagonal or octagonal that can be formed by flat shaped acoustical wall panels (12).

24. The method of constructing a soundproof enclosure (10) as claimed in claim 21, wherein the method further comprises the step of providing at least a piece of handles (87) which can be releasably secured to components in the sequence of assembly needing to be carried, positioned, and assembled to form the soundproof enclosure (10) starting with releasably securing the set of handles (87) to the first component to assembly on to the floor base unit (11), and in the sequence to assemble the soundproof enclosure (10) begins with placing the floor base unit (11) onto a floor space, then installing all the acoustical wall panels (12), and finally placing the ceiling unit (13) on the top whereby the handles (87) will then be left on the ceiling unit (13) for future use.

25. The method of constructing a soundproof enclosure (10) as claimed in claim 21, wherein the method includes the step of providing a piece of interlocking shape plate (81) of rigid and strong material to be releasably secured onto a matching cavity on a top edge (12*d*) of each of the two interconnected acoustical wall panels (12) to lock the two wall panels (12) together.

26. The method of constructing a soundproof enclosure (10) as claimed in claim 21, wherein the acoustical wall panels (12) with the vertical side edges (12*f*) releasably coupled to one another or to a coupling pole (14) by conventional tongue and groove joining method or by conventional overlapping flanges joining method.

27. The method of constructing a soundproof enclosure (10) as claimed in claim 21, wherein the acoustical wall panels (12) comprise of varying sizes, and bent on the vertical axis to form varying curved shapes, are interconnected to one another on the vertical side edge or to a coupling pole (14), to form a soundproof enclosure (10) of different typological top views profiles.

* * * * *